United States Patent [19]
Costanza et al.

[11] 4,066,964
[45] Jan. 3, 1978

[54] COMMUNICATION SYSTEM

[75] Inventors: Samuel T. Costanza, Santa Ana; Peter G. Franklin, San Marino; Frank L. Gebhardt, La Habra, all of Calif.; Jack D. Israel, Fort Wayne, Ind.; Charles R. Moore, Balboa Island; Charles E. Wheatley, III, Manhattan Beach, both of Calif.

[73] Assignee: Rockwell International Corporation, El Segundo, Calif.

[21] Appl. No.: 607,854

[22] Filed: Jan. 6, 1967

[51] Int. Cl.² .............................................. H04B 7/12
[52] U.S. Cl. ........................................ 325/55; 325/33; 325/40; 325/53; 325/63; 325/58; 343/204
[58] Field of Search ...................... 325/17, 30, 31, 33, 325/35, 40, 53, 55, 58, 63, 64, 131, 154, 163; 340/351, 171 PP, 174, 171 PF, 146.1 BA; 179/15.55; 343/204

[56] References Cited
U.S. PATENT DOCUMENTS

| 2,635,228 | 4/1953 | Purington | 340/171 |
| 2,946,044 | 7/1960 | Bolgiano et al. | 340/174 |
| 3,140,468 | 7/1964 | Blaisdell et al. | 340/351 |
| 3,292,178 | 12/1966 | Magnuski | 325/55 |
| 3,310,741 | 3/1967 | Uitermark et al. | 325/53 |
| 3,493,866 | 2/1970 | Miller | 325/163 |

Primary Examiner—Howard A. Birmiel
Attorney, Agent, or Firm—L. Lee Humphries; H. Fredrick Hamann; Rolf M. Pitts

[57] ABSTRACT

This invention relates to a communication system wherein a plurality of stations can communicate with each other, without going through a central switchboard; and more particularly to such a communication system that is as private as possible — the commmunication system having, in addition, the capability of conference calls and a command-override.

54 Claims, 25 Drawing Figures

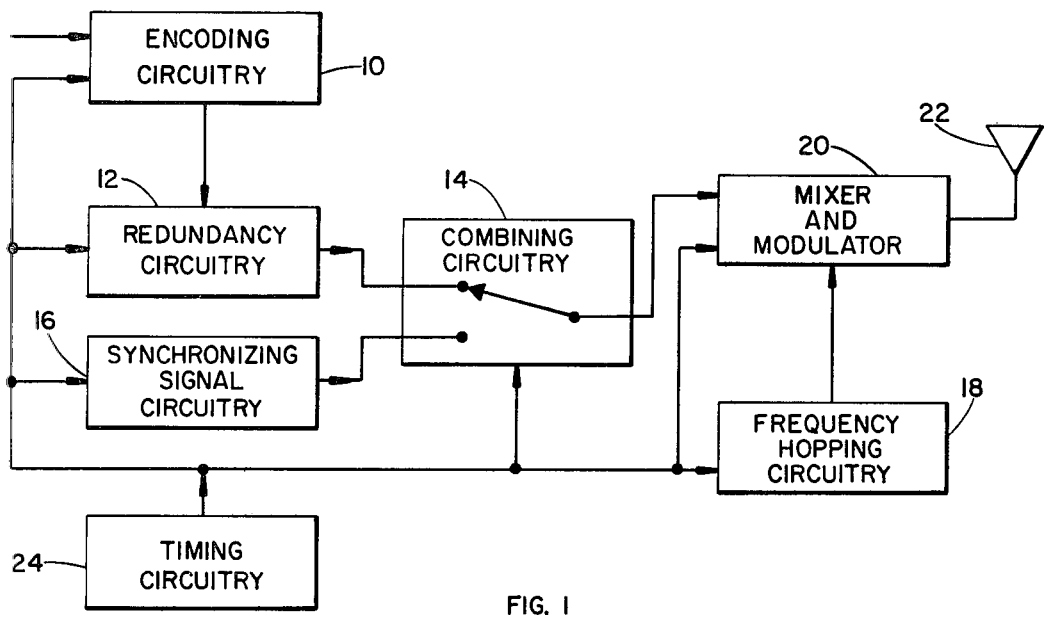
FIG. 1
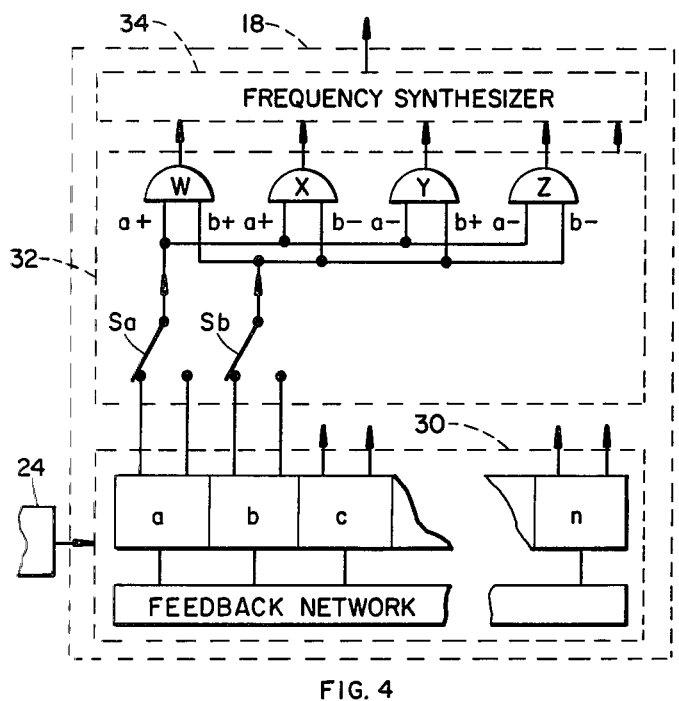
FIG. 4
FIG. 5a
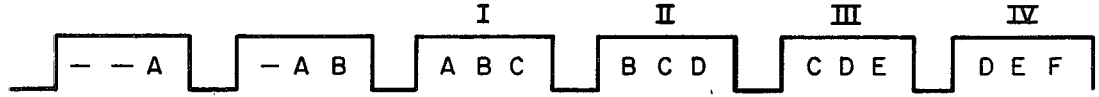
FIG. 5b
INVENTORS
SAMUEL T. COSTANZA, PETER G. FRANKLIN,
FRANK L. GEBHARDT, JACK D. ISRAEL,
CHARLES R. MOORE, CHARLES E. WHEATLEY III
Sidney Magnes   AGENT INVENTORS
SAMUEL T. COSTANZA, PETER G. FRANKLIN,
FRANK L. GEBHARDT, JACK D. ISRAEL,
CHARLES R. MOORE, CHARLES E. WHEATLEY III

*Sidney Magnes*

AGENT

INVENTORS
SAMUEL T. COSTANZA, PETER G. FRANKLIN,
FRANK L. GEBHARDT, JACK D. ISRAEL,
CHARLES R. MOORE, CHARLES E. WHEATLEY III

*Sidney Magnes*

AGENT

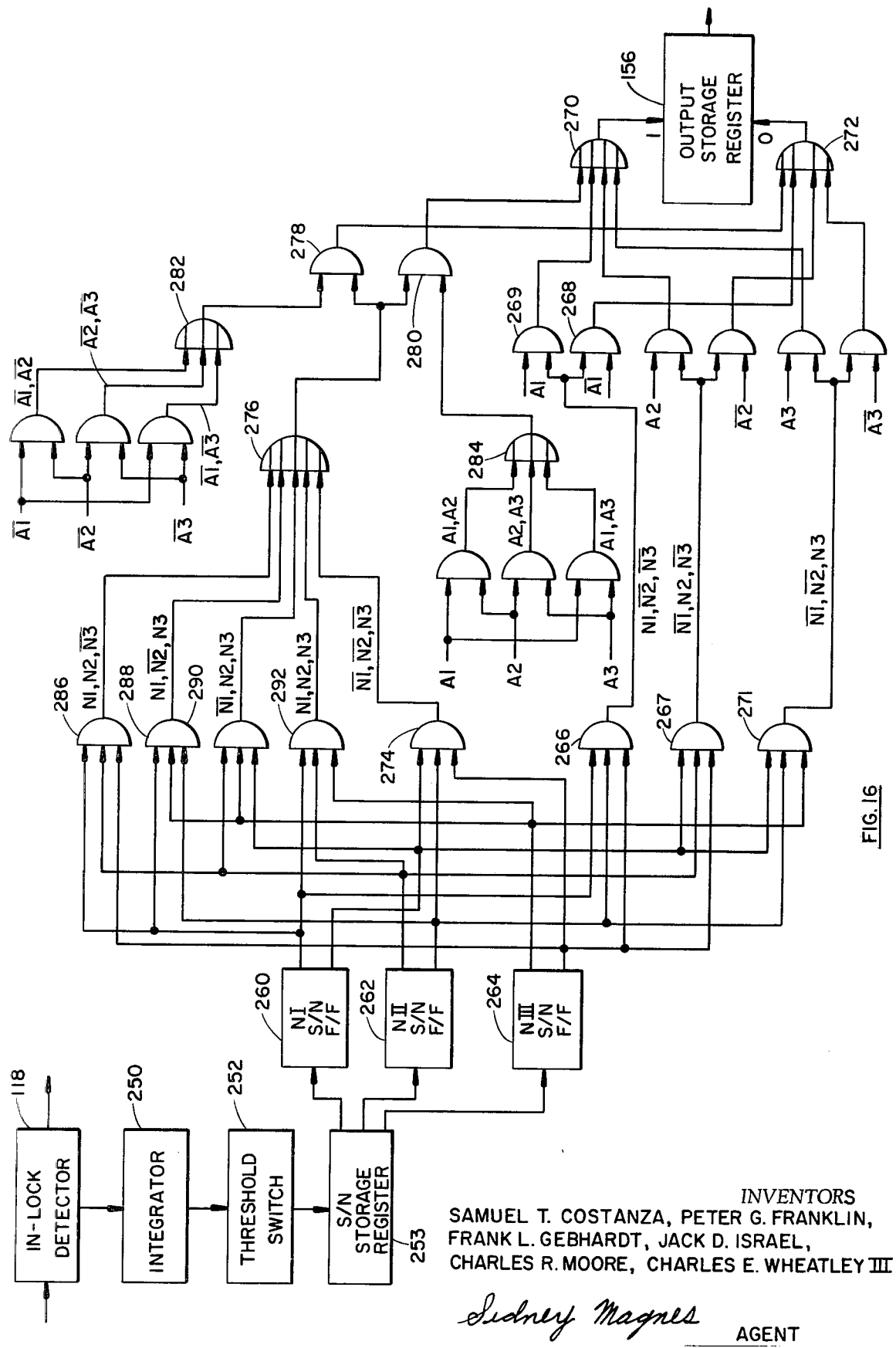

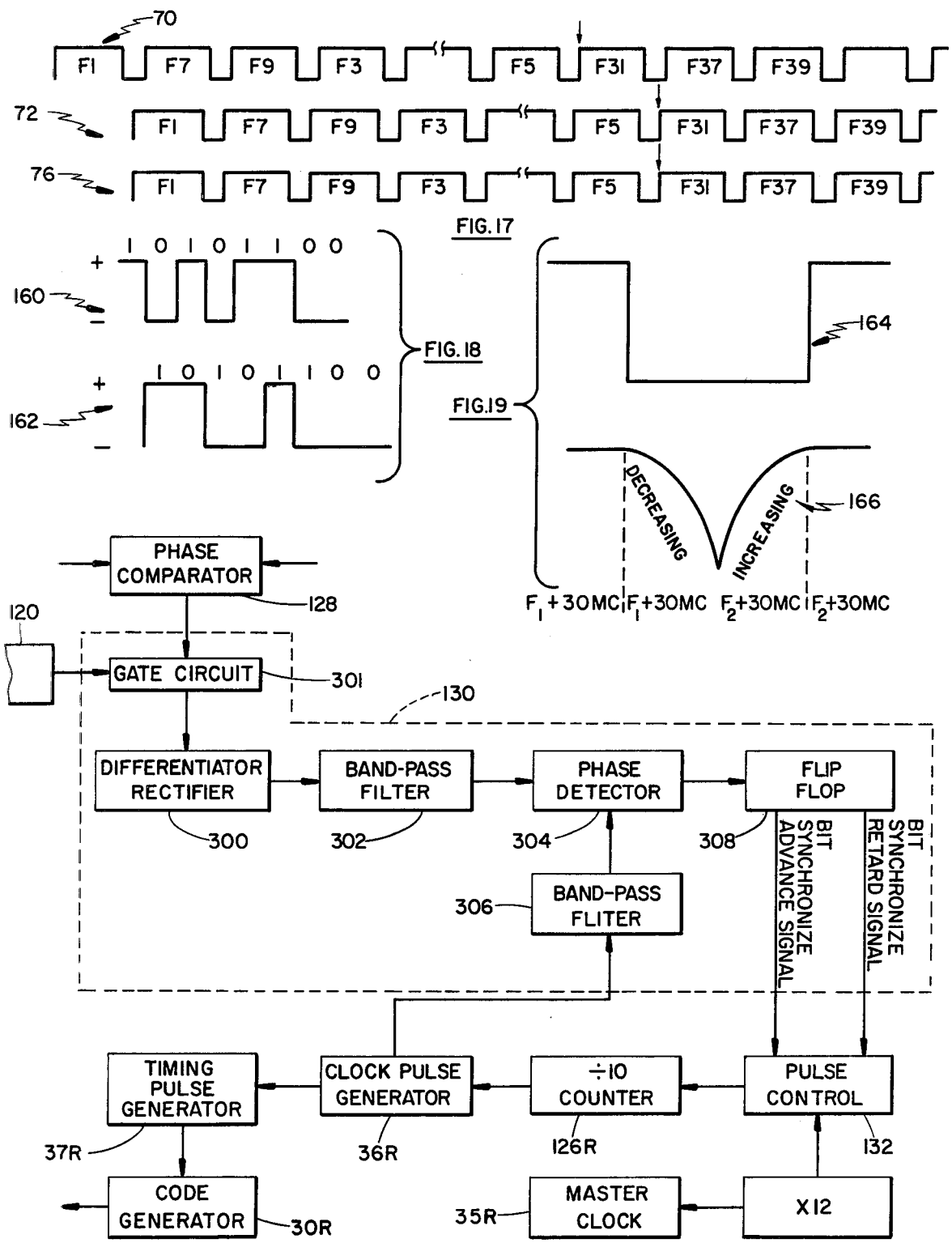

COMMUNICATION SYSTEM

BACKGROUND

It is well known that an ever-increasing number of organizations are using radio communication systems for coordinating their activities. Such organizations include — among others — fire departments, ambulance-dispatching systems, and police systems. These radio communication systems are continually exposed to the disturbing effects of other systems, as well as to the disturbing effects of devices such as radio-controlled garage-door-openers, electric razors, diathermy machines, home appliances, and the like; these systems and devices contributing a bedlam of "static" that tends to interfere with the radio communication systems. Since many of the organizations that use these radio communication systems are emergency-type organizations wherein it is essential that communications between the various stations thereof be maintained at all times, it is increasingly important to provide ever-improved communication systems.

For purposes of explanation only, the present invention will be discussed in terms of its use by police department, whose communication requirements ar extremely complex because it has personnel in helicopters, in automobiles, and on foot; it being essential that these individuals keep in touch with each other, and with certain other portions of the organization. Furthermore, the communication system is in constant use, with an ever-changing number of simultaneous communications between ever-changing stations. Moreover, there is the constant danger of one of the stations falling into the hands of a criminal. In addition, it is frequently necessary that a conference-type call be initiated to correlate the activities of a small group of individuals, without disturbing the other capabilities of the system; and that an override-command call be initiated, so that one individual can override all other communications, and cause each person in the system to hear his commands.

OBJECTS AND DRAWINGS

It is therefore an object of the present invention to provide an improved communication system.

It is another object of the present invention to provide a communication system wherein each communication is relatively free from interference.

It is a further object of the invention to provide a communication system having a conference-call and a command-override capability.

The attainment of these objects and others will be realized from the teachings of the following specification, taken in conjunction with the drawings of which FIG. 1 shows a block diagram of the transmitter;

FIG. 4 shows a block diagram of a frequency-hopping circuit;

FIGS. 5A and 5B show the operation of the redundancy shift-registers;

Figure 14A:
Figure 14B:
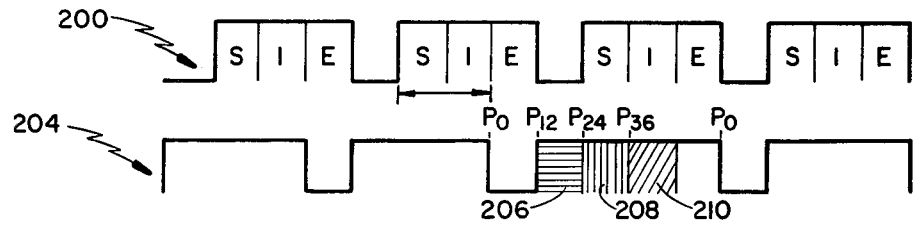
Figure 14C:
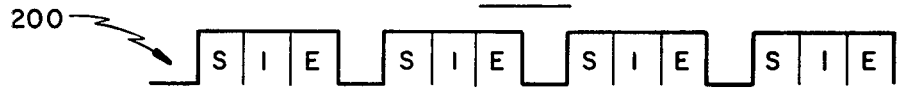
Figure 15:
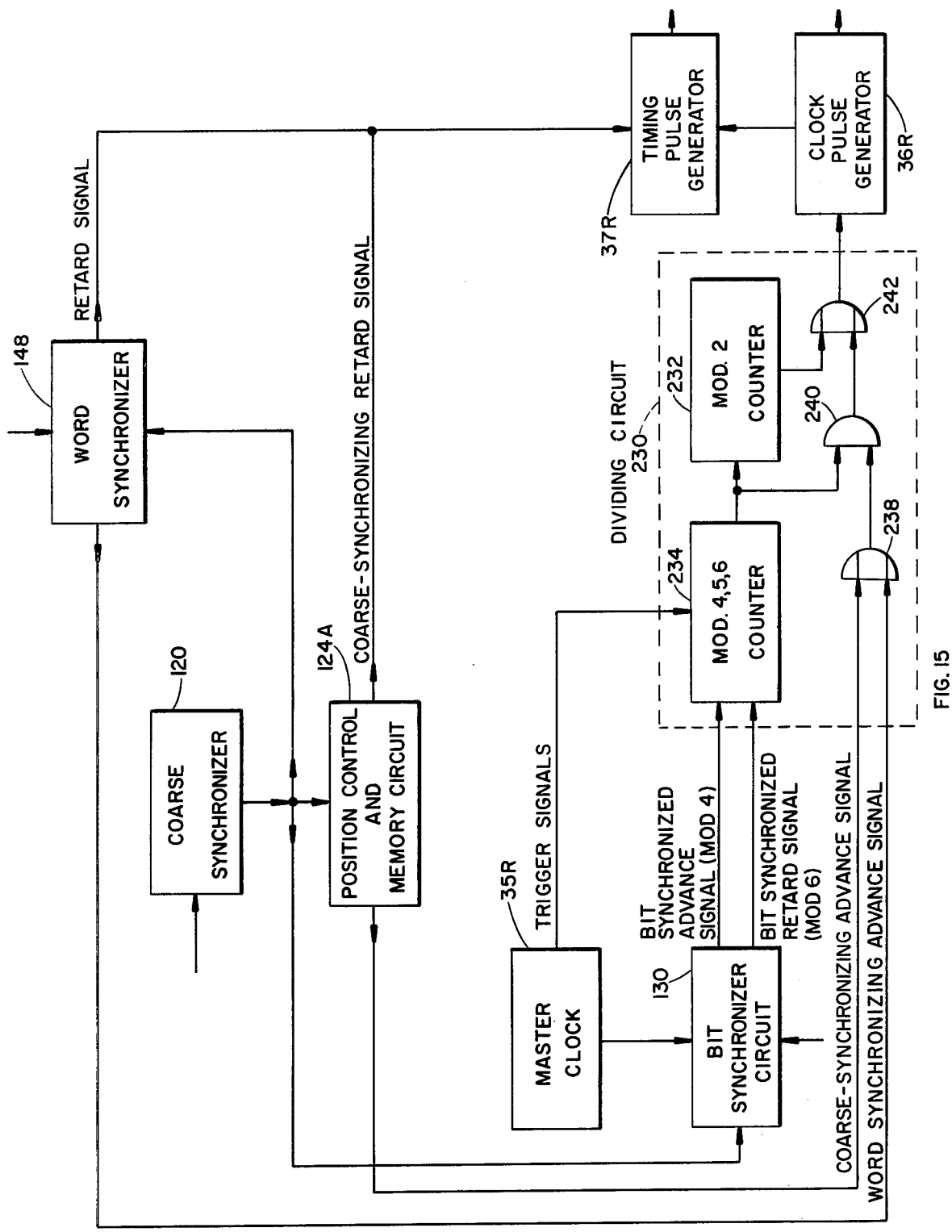
Figure 21:
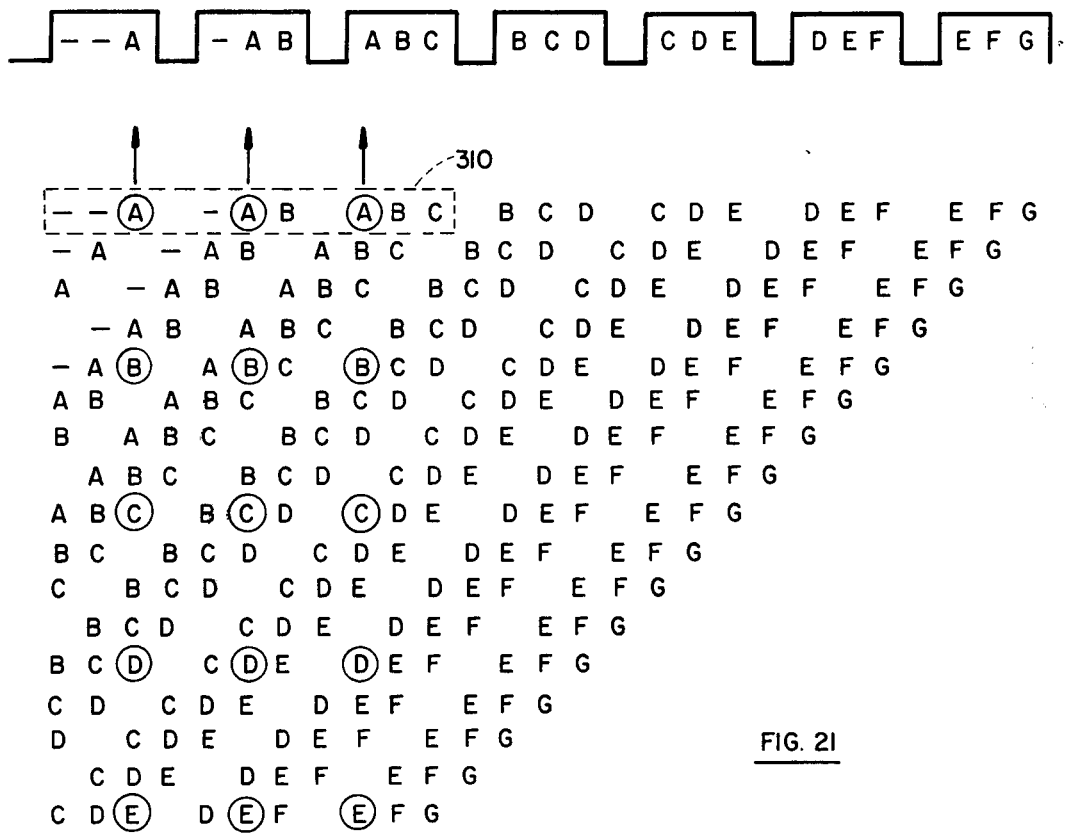

FIGS. 14A 14B and 14C show word-synchronization waveforms;

FIG. 15 shows a variable-rate clock-pulse producing circuit;

FIG. 16 shows the operation of a portion of the data-recovery circuit;

FIG. 17 shows busy-signal waveforms;

FIG. 18 shows NRZL and NRZM waveforms;

FIG. 19 shows an enlargement of the dead-time portion of a waveform;

FIG. 20 shows a block diagram of the bit-synchronizing circuit;

FIG. 21 shows a data-recovery sequence; and

Figure 22:
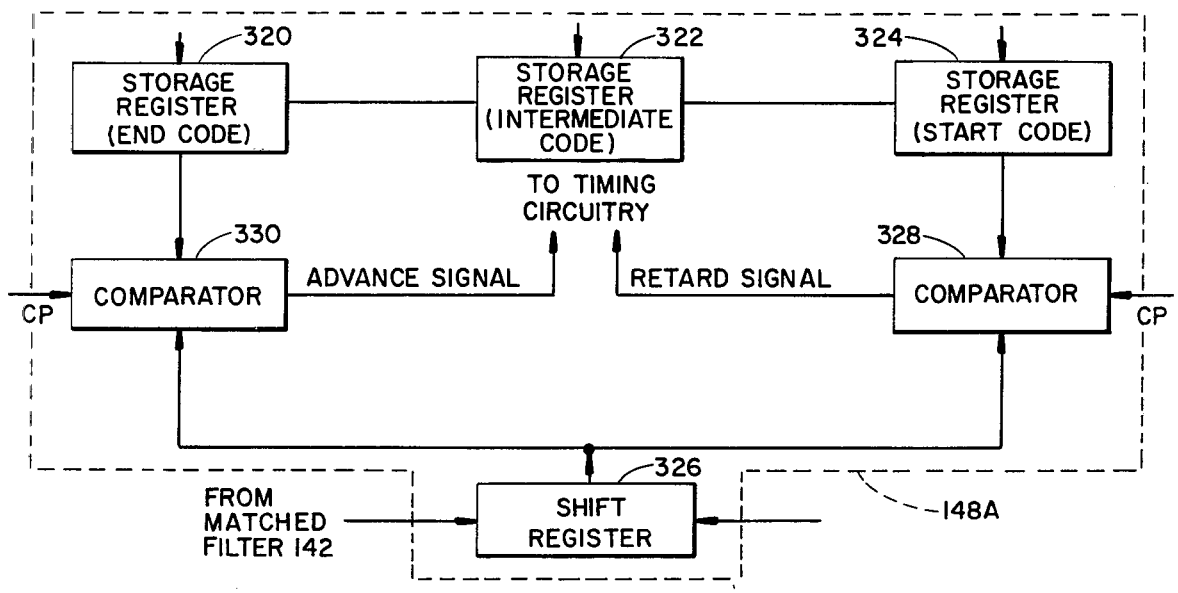

FIG. 22 shows a word-recognition circuit.

SYNOPSIS

Broadly stated, the disclosed communication system comprises a number of individual stations — each station comprising either a paired receiver-and-transmitter, or a so-called "transceiver" that is capable of transmitting and receiving. In accordance with the teachings of the present invention, each individual receiver at each individual station is continuously "frequency-hopping"; that is, it is continuously tuning its reception-sensitivity to different frequencies, in its own individual frequency-hopping-sequence that is different from the frequency-hopping-sequence of every other receiver — the individual frequency-hopping sequence being called that receiver's "address".

In order for any station to transmit a communication to a selected station, it is merely necessary for the "speaking" station to transmit in the same frequency-hopping sequence as the selected station; this procedure being called "addressing" the selected station. At a "free" station, i.e., one that is not engaged in a communication, the receiver is continuously searching for a broadcast addressed to it; and when it finds a communication addressed to it, it synchronizes its operation to this communication. In this way, any station can transmit to any other station.

As discussed above, there is a great deal of static that tends to occur randomly, both with respect to time and to frequency spectra. The frequency-hopping procedure tends to minimize the static-interference, as the communicating stations are only momentarily at a given frequency, and then quickly hop to another — presumable clear — frequency. However, despite their frequency-hopping, the two communicating stations may happen to tune in to a given frequency at a particular instant that the given frequency is being blanked-out, noisy, or unreliable; and thus the message may be badly derogated at that instant. To obviate this possibility of interference, a "redundancy" system is used; that is, each bit of information is broadcast more than once, so that if it happens to be blanked-out at one instant, the redundanced information will be repeated at a later instant.

In order to achieve the conference call and command-override capabilities, chosen frequency-hopping sequences are used; and the various receivers periodically monitor these chosen sequences. If a receiver finds a broadcast in the command-override frequency or "channel", the receiver immediately switches to this channel; whereas, if a broadcast is found on the conference-call channel, the receiver produces an indicating signal.

THE TRANSMITTER

FIG. 1 shows a simplified block diagram of the transmitter, the blocks to be discussed later in greater detail. Data to be communicated is applied from a source such as a microphone (not shown) to encoding circuitry 10 that converts the data into a different form, or "code". The now-encoded data is applied to redundancy circuitry 12 that, as previously indicated, arranges to broadcast the data a number of times. The output of redundancy circuit 12 is applied to combining circuitry 14 that also receives the output of synchronizing-signal-circuitry 16.

In operation, the transmitter first broadcasts a synchronizing signal — obtained from circuit 16, after which it broadcasts the data to be communicated — obtained from circuits 10 and 12; the combining circuitry 14 achieving this in a manner to be explained in detail later.

As indicated previously, frequency-hopping is used; and to achieve this, frequency-hopping circuitry 18 produces a periodically-changing-frequency carrier-waveform. A mixer 20 operates on the data from the combining-circuitry 14 and the frequency-hopping carrier waveform from circuit 18; and the output of mixer 20 is broadcast by an antenna 22. Timing circuitry 24 produces various "clock-pulses" and timing-signals for timing and synchronizing the operation of the various circuits, and also produces signals of various frequencies for different purposes. In this way, the synchronizing signal and the data to be communicated are all broadcast to the entire network of receivers.

It should be noted that in order to simplify the drawings, single lines have been used in some cases to represent multi-wire cables wherein individual wires branch off to specific circuits, and — in the interests of clarity of illustration some timing and synchronizing connections have been omitted.

Figure 2:
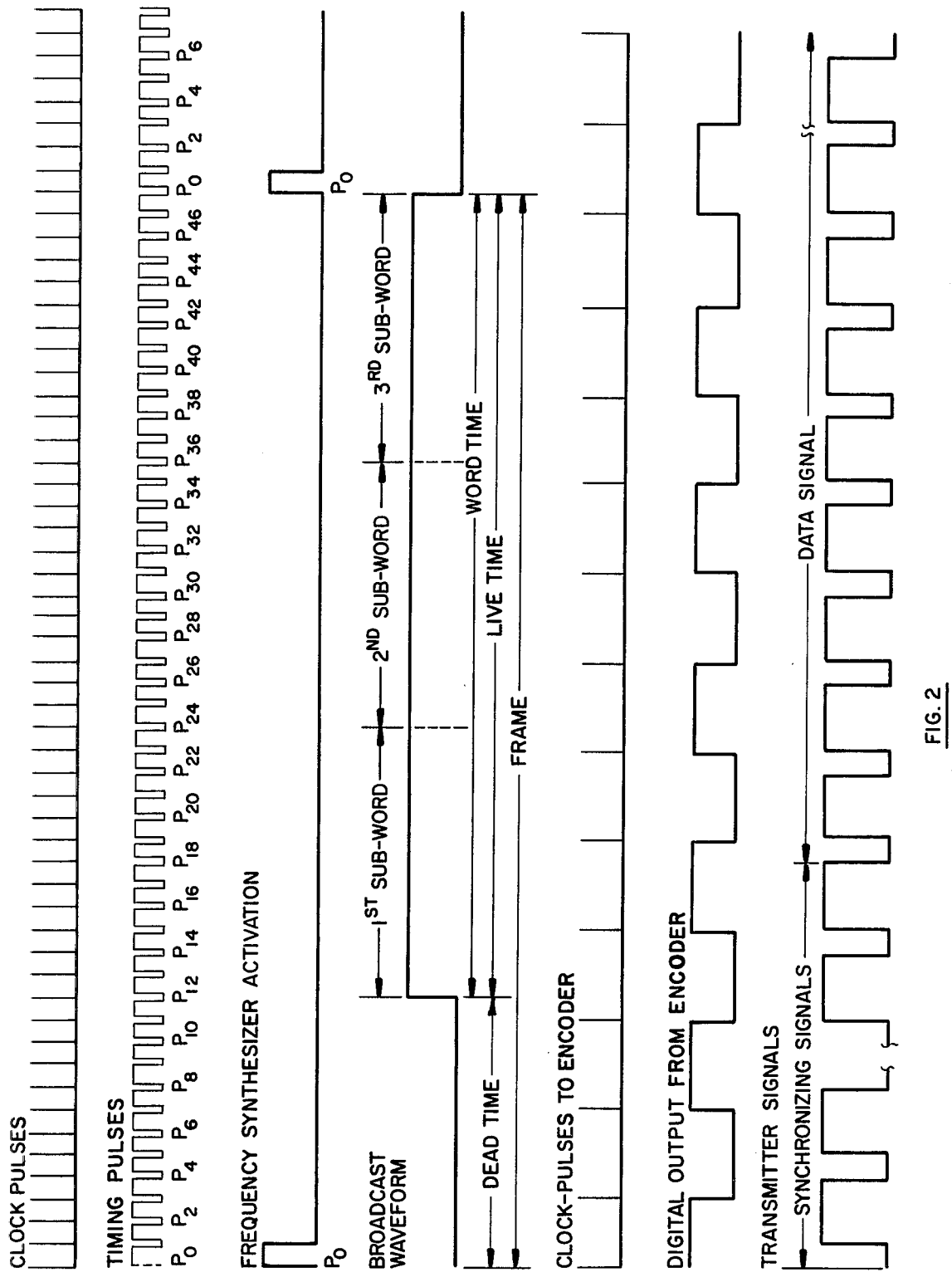
FIG. 2 shows a timing chart and various waveforms.
Figure 3:
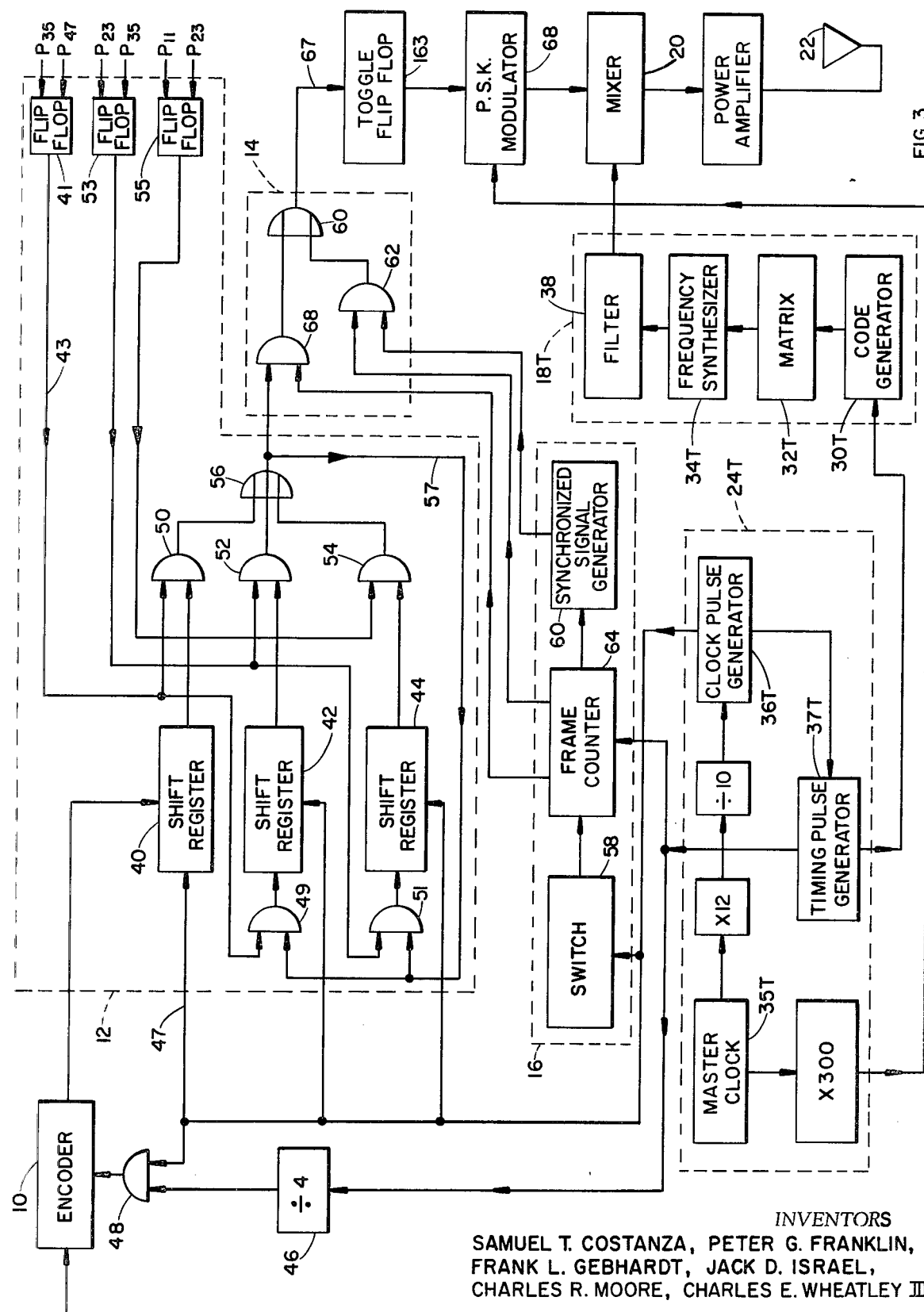
FIG. 3 shows a more-detailed block diagram of the transmitter.

FIG. 2 shows a timing chart that will be referred to in the course of the discussion; and FIG. 3 shows a more detailed block diagram of a transmitter; this block diagram including a timing circuit 24T. The "T" is used to indicate that the element associated with it appears in the transmitter. In the receiver, its reference character includes an "R".

FREQUENCY-HOPPING CIRCUITRY

It will be recalled that each receiver is to frequency-hop in its own individual sequence, i.e., each receiver is to periodically tune itself to a different frequency. From a cursory consideration, it would appear desirable that the frequency-hopping should be performed in a completely random manner; but a more intensive examination indicates that a truly-random frequency-hopping sequence would be unsatisfactory for a number of reasons. For example, a truly-random frequency-hopping sequence would include sequences wherein the same frequency was repeated a number of times. These particular frequency-hopping sequences would be unsatisfactory, as they would be equivalent to having the receiver tuned to the same frequency for an appreciable period of time — which would not satisfy the frequency hopping requirements.

Another objection to completely-random frequency-hopping may be understood from the fllowing discussion. It will be recalled that a plurality of receivers are frequency-hopping simultaneously, each hopping in its own individual sequence. When using truly-random frequency-hopping, it is possible that as one particular receiver hops to a particular frequency, that other receivers would also hop to the same frequency at the same instant; although at the next instant each receiver would hop to an entirely different frequency. However, the momentary multiple use of a single frequency would be undesirable, for if several transmitters were broadcasting to these different receivers, and all happened to be at the same frequency at the same time, each receiver would momentarily receive each broadcast; and this would produce a garbling of the transmitted information — although the above-mentioned redundancy circuitry would minimize the bad effects thus produced.

Another disadvantage of a truly-random frequency-hopping sequence arises from the condition that every station must be able to address every other station, by adopting the addressed station's frequency-hopping sequence. If each station were to have a purely-random frequency-hopping sequence, its particular sequence would be unknown and unpredictable; and therefore the station would be unaddressable.

Due to these factors, and others, it is impractical to have the receivers frequency-hop in a purely random manner. Therefore, the frequency-hopping sequence cannot be of the purely random type, but instead must be a controlled, preferably of a "pseudo-random", sequence. A controlled pseudo-random sequence is a planned sequence that periodically repeats itself — unlike a purely random sequence — but the repetition may occur every hour, day, year, or other time interval, depending upon the length of the specific sequence. Moreover, between repetitions the pseudo-random sequence is controlled, rather than being purely random, but — due to its makeup, composition, and length — it appears to be random.

As is well known, a psuedo-random sequence may be obtained by the use of a so-called pseudo-random code-generator; these being well known, and described in a number of publications, such as *A Radar System Based on Statistical Estimation and Resolution Considerations*, Technical Report No. 361-1, Stanford Electronics Laboratories, Stanford University, Reprinted 12/5/58. Broadly stated, one form of pseudo-random code-generator is a device that produces a controlled code that preferably comprises ones-and-zeros, positive-and-negative pulses, or the like. One widely-used form of pseudo-random code-generator comprises a binary shift-register that comprises a plurality of flip-flop circuits, an input terminal, one or more output terminals, a shifting-signal terminal, and a plurality of feedback connections between various stages of the generator and/or the input. In operation, every shifting-signal causes every stage of the generator to produce a "one" or a "zero"; the particular state of each stage depending on the instantaneous input, the previous inputs, and the type and number of feedback connections, etc. Simultaneous or sequential signals from selected ones of the stages ae used as the coded output signal; and the composition of the coded output signal changes with each shifting signal. In this way the output of the pseudo-random code-generator is a sequence, or code, of binary signals that appear to be random — but is actually disignedly controlled by the input and the feedback signals.

Attention is now directed to FIG. 4, which shows, in block diagram form, a circuit 18 for producing a frequency-hopping carrier-waveform. As indicated previously, a frequency-hopping circuit is required for both transmitting and receiving, and FIG. 4, and the following explanation will serve as a basis for understanding the operation of one form of a frequency-hopping circuit. In FIG. 4, clock-pulses from timing-circuit 24 act as shifting signals for a simplified pseudo-random code generator 30, which produces a sequence of pseudo-random signals as discussed above. It was previously pointed out that the frequency-hopping sequence is to be controllable, and this result is achieved — as shown in FIG. 4 — by applying the output of the pseudo-random code-generator 30 to a matrix 32.

In FIG. 4, simplified code-generator 30 is shown as comprising a plurality of flip-flops $a, b, c, \ldots n$; each having two output terminals. The various input and feedback connections have been omitted for clarity. Basically, matrix 32 comprises a combination of input-output paths, so that certain values of the instantaneous pseudo-random-code traverse selected paths through the matrix to selected output terminals, as explained in Digital Computer Technology and Design, Volume II — Willis H. Ware.

The operation of the illustrated matrix is as follows; for simplicity of explanation, only the outputs of flip-flops $a$ and $b$ being considered. It is known that a flip-flop has two stable states, one corresponding to a "one", and the other corresponding to a "zero". In the "one" state, one output of the flip-flop is a "+" and the other output is a "−"; whereas in the "zero" state the outputs are reversed. As shown in FIG. 4, the outputs of flip-flops $a$ and $b$ may be selected by switches $S_a$ and $S_b$ respectively; the outputs of the switches being applied to AND circuits W, X, Y, and Z. As indicated in FIG. 4, AND circuits W, X, Y, and Z require inputs $a+, b+; a+, b-; a-, b+;$ and $a-, b-$ respectively to produce an output signal. Since flip-flops $a$ and $b$ may be either in a "one" or in a "zero" state, the following table indicates the output sequence from the AND circuits W, X, Y, Z, as the states of the flip-flops $a$ and $b$ change in the following code 11, 10, 01, 00, and as the switches are reset from their "left" position to their "right" position.

| a | b | $S_a$ | $S_b$ | Active Circuit |
|---|---|-------|-------|----------------|
|   |   | left  | left  |                |
| 1 | 1 | a+    | b+    | W              |
| 1 | 0 | a+    | b−    | X              |
| 0 | 1 | a−    | b+    | Y              |
| 0 | 0 | a−    | b−    | Z              |
|   |   | right | left  |                |
| 1 | 1 | a−    | b+    | Y              |
| 1 | 0 | a−    | b−    | Z              |
| 0 | 1 | a+    | b+    | W              |
| 0 | 0 | a+    | b−    | X              |
|   |   | left  | right |                |
| 1 | 1 | a+    | b−    | X              |
| 1 | 0 | a+    | b+    | W              |
| 0 | 1 | a−    | b−    | Z              |
| 0 | 0 | a−    | b+    | Y              |
|   |   | right | right |                |
| 1 | 1 | a−    | b−    | Z              |
| 1 | 0 | a−    | b+    | Y              |
| 0 | 1 | a+    | b−    | X              |
| 0 | 0 | a+    | b+    | W              |

It may thus be seen that for the same sequency (11, 10, 01, 00) from the code-generator 30, resetting the switches produces a different sequence from the W, X, Y, Z circuits of matrix 32. If desired, the switches may be double-poled rather single-poled, and this modification would provide an additional grouping of $a+, a-, b+, b-, c+, c- \ldots n+, n-$ output signals that may be applied to another set of AND circuits to produce additional matrix output signals. Moreover, switches $S_a, S_b, S_c \ldots S_n$ may be reversing double-poled switches to provide an even greater variety of matrix output signals. Obviously, therefore, a more complex code-generator and a larger number of switches will produce a much more varied sequence of matrix output signals.

As shown in FIG. 4, the output of matrix 32 is applied to a frequency-synthesizer 34; the output of matrix 32 being either sequential signals, or a plurality of simultaneous signals, depending on the requirements of the frequency synthesizer.

Frequency-synthesizers are well known, and are designed to produce (synthesize) a plurality of frequencies, one type being described by R. R. Stone, Jr. and H. F. Hastings in "A Novel Approach to Frequency Synthesis" Frequency September-October 1963, pp. 24–27. A simpler type of frequency-synthesizer has a plurality of oscillators that inherently produce different frequencies; and still another type of frequency-synthesizer has a master oscillator and circuits for multiplying, dividing, adding, and subtracting frequencies to produce different frequencies. In any case, sequential inputs to the frequency-synthesizer either activate specific frequency-producing circuits, or complete specific frequency-output circuits to provide sequential output frequencies that cover the desired frequency-hopping spectrum in a desired frequency-hopping sequence that is determined by the manually selected positions of the matrix switches.

To recapitulate the operation of FIG. 4, a signal from timing-circuit 24 shifts pseudo-random code-generator 30 to produce a particular coded signal, which is applied to matrix 32 that directs the signals to frequency-synthesizer 34, which in turn produces a signal of a particular frequency. When a shifting signal is applied, pseudo-random code-generator 30 produces a different coded signal, and matrix 32 directs the new coded-signal to frequency-synthesizer 34, which thereupon produces an output signal of a different frequency. In this way the frequency-hopping sequence from frequency-synthesizer 34 depends primarily on the pseudo-random code from generator 30, but may be modified by the switch settings of matrix 32.

It is of course possible to have every successive signal from the timing circuitry act as a shifting signal for the pseudo-random code-generator, and to have every output signal from the pseudo-random code-generator applied to the frequency-synthesizer; but this would mean that the frequency-hopping rate would be quite fast, and that successive coded signals would be closely related. It has been found preferable to apply every eighth timing-pulse to the pseudo-random code-generator, and to apply every sixth code-signal to the frequency-synthesizer; in this way providing a slower frequency-hopping rate, and less-related output frequencies. Thus, the frequency-synthesizer is activated to shift frequency during every $P_0$ time-interval, as indicated in line 3 of FIG. 2 — which will be more fully discussed later.

As an illustration of the frequency-hopping operation of FIG. 4, assume that the pseudo-random signals from generator 30 were — for example — 11, 10, 01, 00 . . . A particular switch-setting of matrix 32 might cause frequency-synthesizer circuit 34 to produce sequential frequencies F2, F6, F1, F9, . . . If the switches of matrix 32 were reset to a different arrangement, the same 11, 10, 01, 00 . . . sequence of pseudo-random signals might cause the frequency-hopping sequence from frequency-synthesizer 34 to be F1, F7, F3, F6 . . . Thus, the same psuedo-random signal sequence can produce a variety of frequency-hopping sequences, by using different matrices; or equivalently by resetting the switches of an adjustable matrix.

It is preferable that the matrix — instead of having mechanical switches — have electronic switches such as diodes, electronic tubes, transistors, or the like; whereupon suitable biasing signals can then cutoff or conductivate these devices to form the desired input-output paths through the matrix. This latter arrangement has the advantage that the matrix may be adjusted electrically by signals from a suitable source.

In actuality, every receiver in the network has — for reasons to be explained later — an identical pseudo-random code-generator, frequency-synthesizer, and matrix; but each receiver has its own individual setting for its matrix. Thus, every station is controlled by an identical pseudo-random code-signal; but each individual receiver — having its own individual matrix — frequency-hops in its own individual sequence; its own individual matrix-setting determining its individual hopping-sequence; so that each receiver's matrix setting establishes an individual "address" for that station.

As previously indicated, when a station desires to communicate with a selected station, the transmitting station modifies its own matrix, as described above, to match that of the selected station, so that its frequencies, frequency-hopping sequence, and frequency-hopping rate are the same as the frequencies, frequency-hopping sequence, and frequency-hopping rate of the selected station; this matrix-modifying being called "addressing the selected station". Since every station must have a frequency-hopping circuitry for transmitting and for receiving, the frequency-hopping circuit of FIG. 4 can be used as the basis for both transmitting and receiving; and the use of identical pseudo-random code-generators and frequency-synthesizers assures that the frequency-hopping sequences are similarly timed, and contain the desired frequencies. The necessity of being able to match the matrix of every other station in the network is, in part, the reason that all stations have identical — but independently adjustable — matrices.

In this way, frequency-hopping circuitry — such as that shown in FIG. 4 — causes the various receivers to frequency-hop to their various frequencies by using individually set matrices; and causes the transmitters to frequency-hop in accordance with the sequence of a selected station by resetting the transmitter's matrix to match that of the addressed station.

Referring now to the transmitter block-diagram of FIG. 3, and more specifically to the frequency-hopping circuit 18T, the frequency-hopping output from frequency-synthesizer 34T is passed through a suitable bandpass filter 38, after which — in a manner to be discussed later — the frequency-hopping waveform has the information to be broadcast impressed thereon, and is broadcast by antenna 22.

It was previously pointed out that each station had either a paired receiver-and-transmitter, or a transceiver. Since a frequency-hopping circuit is required for both transmitting and receiving, the transmitter and the receiver may (1) each have its own frequency-hopping circuit, or may (2) use a common frequency-hopping circuit that is used (with minor modifications) for either receiving or for transmitting — depending upon the instantaneous requirement. The transceiver would of course have a single frequency-hopping circuit.

When one station desires to communicate with a selected station, the frequency-hopping circuitry of the speaking-station becomes part of the transmitting circuitry. As discussed above, its matrix is matched to the matrix of the selected station with which it is desired to communicate, by setting the input-output paths in either an electronic or a manual manner. When the matrix is suitably set, the frequencies and frequency-sequence produced by the transmitting station are exactly the same as the frequencies and frequency-sequence of the selected station; and the transmitter has been "addressed" to the selected station.

In FIG. 3, a typical timing-circuitry — 24T — has a very precise master-clock, or oscillator, 35T, having a typical frequency of 100KC. The output of the master-clock is frequency-multipled — typically by a multiply-by-twelve circuit, and frequency-divided — typically by a divide-by-ten circuit, to cause the clock-pulse generator, 36T, to provide suitable trigger-like clock-pulses, having a typical duration of 0.02 microseconds, and a typical frequency of 120KC; and to also cause a timing-pulse generator, 37T, to produce suitable pulse-like timing signals having a typical duration of 8.3 microsecond, and a typical frequency of 120KC.

The clock-pulses and timing-pulses are shown in (lines 1 and 2 respectively of) FIG. 2. Although the clock-pulses and the timing-pulses have the same frequency, the basic difference is as follows. The clock-pulses are short trigger-like pulses that appear sequentially at the same output terminal, and therefore a clock-pulse receiving terminal receives a train of the clock-pulses, which are primarily used for synchronization purposes throughout the transmitter. On the other hand, the timing-pulses have a duration, typically 8.3 microseconds, equal to the interval between adjacent clock-pulses, and are grouped into repetitive groups of 48 — the individual timing-pulses being identified for convenience as $P_0$, $P_1$, $P_2$. . . $P_{47}$. To achieve this grouping, the timing-pulse generator 37T of FIG. 1 may be a so-called "Mod-48" counter that is driven by the clock-pulses, the outputs $P_0$, $P_1$, $P_2$. . . $P_{47}$ of the timing generator — corresponding to the 48 different states of the Mod-48 counter — appearing at its own individual output terminal. Therefore, a given timing-pulse receiving terminal may receive only timing pulse $P_0$; another timing-pulse receiving terminal may receive every fourth timing pulse $P_0$, $P_3$, $P_7$ . . . ; and still another timing-pulse receiving terminal may receive only $P_{12}$. By the use of specific timing pulses, selected circuitry may be activated and de-activated at selected times — which may be precisely synchronized with other circuitry by "ANDING" the timing-pulse with a clock-pulse.

For convenience, some of the circuitry will have inputs identified as "CP", which is to be construed as meaning that the clock-pulses are applied to these circuits; and similarly "TP" means that selected timing pulses are applied to the indicated circuits.

THE ENCODER

The data to be transmitted is generally a vocal message, whose electrical form — as obtained from a microphone — is known to those skilled in the art as an "analog" signal. While an analog signal may be broadcast, as is done in commercial radio and television, it is frequently advantageous to broadcast the data in some other form. As an intermediate step, the analog input signal is converted into a so-called digital signal; and this conversion may be accomplished by an encoding circuit 10, as indicated in FIGS. 1 and 3. Encoder 10 may be of any of the well known analog-to-digital converters; present equipment using a converter of the type known as a "delta modulator". This circuit is well known, and is described in a number of articles, such as "Single-Bit Delta Modulating Systems" — Lender and Kozuch, *Electronics* (Nov. 17, 1961) pp. 125-129. Alternatively, rather than using delta-modulation, the well-known pulse code modulation (PCM) may be used.

As will be explained later, under the control of signals from timing circuit 24T of FIG. 3, encoding circuit 10 "samples" the input analog signal at a sampling-rate (or bit-rate) that produces, typically, 30 kilo-bits of data per second; and converts the samples to binary-code "bits" that are applied to redundancy circuitry 12 of FIG. 3. For convenience of explanation, the input signals — regardless of their form — will be called "data".

To recapitulate, analog input data is provided continuously, by means such as a microphone, to encoding-circuitry 10; is being withdrawn from encoding-circuitry 10 in the form of binary bits to be applied to redundancy-circuit 12; and is withdrawn from redundancy-circuitry 12 to be broadcast. It should be recalled that the data is to be broadcast three times, for triple-redundancy.

The broadcast waveform is shown in (line four) of FIG. 2. It will be noted that there is a "dead-time" interval (typically 100 microseconds) followed by the live-time interval (typically 300 microseconds). As previously explained, during time-interval $P_0$, (line three of FIG. 2) the code-generator's coded signal is applied through the matrix to the frequency-synthesizer; and as a result, the frequency-synthesizer now begins to produce an output signal of a different frequency. Thus, the original frequency-signal from the frequency-synthesizer is diminishing, and a new frequency-signal is appearing; and a time-interval $P_0$–$P_{11}$ is allocated for this transition. Therefore, no information is transmitted during this transition interval; resulting in the dead-time interval. By time $P_{12}$, the frequency-synthesizer's output signal is sufficiently stabilized to be used. During the live-time interval $P_{12}$–$P_{47}$, a "word" of information — comprising three subwords — is modulated onto the frequency-hopping carrier waveform, as is shown in line 4 of FIG. 2. Thus, the dead-time and the live-time form a frame that contains three sub-words; the live-time portion of each frame being broadcast at a different frequency than every other frame — in accordance with the frequency-hopping concept.

Information is withdrawn from encoder 10 of FIG. 3, as follows. Timing circuit 24, it will be recalled, produces timing-pulses at a 120 KC rate; and these are applied to a divide-by-four circuit 46, which coacts with an AND circuit 48 that "ANDS" the clock-pulses and every fourth timing-pulse. Thus, the output signals from the divide-by-four circuit 46 and AND circuit 48 are clock-pulses that, as shown in line five of FIG. 2, occur at a 120/4 = 30 kilo-cycle rate; and these cause the encoding circuitry 10 to produce binary samples of the input analog signal at a 30 KC bit-rate. Thus, the output of encoding circuitry is at a 30 kilo-bit rate — or at one-fourth the clock-pulse rate; and the binary data from encoder 10 is inserted into the redundancy circuit 12 at this rate. Line six of FIG. 2 shows a 1, 0, 1, 0, 1, 0 . . . binary output from decoder circuit 10.

REDUNDANCY CIRCUITRY

It was previously pointed out that the data is redundancy-broadcast a number of times, to minimize the possibility of static or other interference preventing the receiver from receiving the transmitted message. A triple-redundancy citcuit 12 for achieving this result is also shown in FIG. 3. As will be explained later in greater detail, three shift-registers 40, 42, and 44 are interconnected in such a manner that clock-pulses and timing-pulses from timing circuit 24T cause each input data-bit from encoder 10 to shift sequentially to the three registers at the clock-pulse rate.

This operation will be more clearly understood from symbollic illustration of FIG. 5a which indicates the three registers 40, 42, and 44; and indicates their contents at sequential arbitrary instants as new information is added and shifted. For example, at an arbitrary time $T_0$, register 40 contains a data sub-word identified as a. At the next instant, $T_1$, register 40 has received a new data sub-word identified as B; and data A has been shifted to register 42. At time $T_2$, register 40 contains a new data sub-word C, register 42 contains data sub-word B, and register 44 contains data sub-word A. The triad of data sub-words A, B, and C, is broadcast as frame I. At the next instant, $T_3$, new data sub-word D is in register 40, data sub-word C has been shifted to register 42, and data sub-word B has been shifted to register 44; this triad of data sub-words now being broadcast as frame II. At time $T_4$, the data sub-words contained in the registers are E, D, and C; and these are broadcast as frame III. At time $T_5$, the data sub-words contained are F, E, and D; which are broadcast as frame IV; etc.

In broadcasting frame I, data sub-word C is broadcast as the last third, or third sub-word of the frame; in frame II, data sub-word C is broadcast as the second third, or second sub-word; and in frame III, data sub-word C is broadcast first third, or first sub-word, of the frame — data sub-word C not being broadcast at all in frame IV. It may thus be seen from FIG. 5b that each sub-word of data (A, B, C, D, etc.) is broadcast three times, thus providing triple redundancy; and at each broadcast, a particular sub-word of data is in a different frame-portion than in the preceding and subsequent frames.

It is of course not essential that each item of data occupy different portions of sequential frames, or that triple-redundancy be used.

As previously indicated, if a portion of frame I should be blanked out by interference or some other mechanism, the lost data will appear twice more.

The result of this redundancing operation is that the first sub-word is obtained from register 44; the second sub-word is obtained from register 42, and the third sub-word is obtained from register 40 — these three sub-words being passed to sequential circuitry to be broadcast. In this way, the data is triple "redundanced"; that is, broadcast three times.

While various redundancy-circuits may be used, the redundancy circuit 12 illustrated in FIG. 3 operates as follows. Assume that shift registers 40, 42, and 44 are empty. It may be seen that, as previously described, data and shifting signals from encoding circuit 10 are applied continuously, at a 30KC bit-rate, for data and at clockrate for shifting to register 40; so that, at a given instant, this register will contain A data. Timing-pulse $P_{35}$ triggers flip-flop 41, so that its output signal traverses wire 43, and "enables" output AND circuits 49 and 50; the latter permitting data bits of the A data in register 40 to exit at a 120KC rate through activated output AND circuit 50. This operation continues for twelve timing-pulse intervals, timing pulse $P_{47}$ being used to trigger flip-flop 41 so that its output signal disables AND circuits 49 and 50. During this 12 timing-pulse interval, the A data-bits from register 40 traverse OR circuit 56, to be transmitted as the third sub-word of a frame. Meanwhile, wire 57 permits a portion of the output from OR circuit 56 to be "circulated", i.e., applied through input AND circuit 49 to register 42. It should be noted that input AND circuit 49 has also been enabled by flip-flop 41 during this same twelve timing-pulse interval, so that register 42 accepts the "circulated" A data. At the occurrence of $P_{47}$, register 42 contains the circulated A data-bits, and when its input AND circuit 49 is disabled, register 42 ceases to accept the circulated data.

It should also be noted that the circulated A data from OR circuit 56 has also been applied to input AND circuit 51, but that input AND circuit 51 has not been enabled; so that register 44 does not accept the A data. Thus, at time $P_{47}$, register 42 contains A data, and register 40 is filling up with B data from the encoder.

The next $P_{23}$ timing-pulse triggers flip-flop 53, so that its output enables output AND circuit 52 and input AND circuit 51. Clock-pulses from wire 47 are now applied to register 42, so that the A data stored in register 42 now traverses enabled output AND circuit 52 OR circuit 56; a portion of the output from OR circuit 56 being circulated over wire 57 to input AND circuit 51, where enabled input AND circuit 51 permits the circulated A data to enter register 44. At the occurrence of timing-pulse $P_{35}$, flip-flop 53 is triggered so that its output signal disables AND circuits 52 and 51. Thus, during the $P_{23}$–$P_{35}$ time-interval, the A data has been transmitted as the second third of a second frame, and has been circulated to storage register 44.

Timing-pulses $P_{11}$ and $P_{23}$ trigger flip-flop so that its output enables output AND circuit 54 during this time interval. In the same manner as described above, clock-pulses from wire 47 are applied to register 44, and data A is now transmitted as the first sub-word, but is not circulated.

The overall operation of the redundancy circuit may be summarized as follows. Data-bits enter register 40 continuously; the contents of register 40 always being transmitted during time-interval $P_{36}$–$P_{47}$ as the third sub-word of a frame, and being simultaneously circulated to register 42. The data in register 42 is always transmitted during time interval $P_{24}$–$P_{35}$ as the second sub-word of a frame, and is simultaneously circulated to register 44. The data in register 44 is always transmitted during time interval $P_{12}$–$P_{23}$ as the first sub-word of a frame, and is not circulated. Since time interval $P_0$–$P_{11}$ is dead time, no data is transmitted during this time interval.

The broadcasting sequence is shown, to a different time-scale, in line one of FIG. 2 — which may be compared with FIG. 5. In this way, the data bits forming the sub-words of each live-portion of the frame are broadcast three times; and the data-bits are broadcast at the clock-pulse rate (120KC) which is four times as fast as the bit-rate (30KC) at which data is withdrawn from the encoding circuit. It should be noted in line one of FIG. 5b, that the three different sub-words of a given frame are transmitted on the same frequency; and that the three sub-words of the next frame are transmitted on a different frequency, in accordance with the frequency-hopping sequence of the transmitter.

COMBINING CIRCUITRY

It is of course necessary to synchronize the operation of the transmitter and the receiver to which it is addressed. To achieve this result, the transmitter first transmits a synchronizing-signal —to which the addressed receiver locks its operation— and then transmits the data-signal — the train of transmit signals being shown to a different scale in line seven of FIG. 2.

FIG. 3 shows a combining circuit 14 that combines the data-signal from redundancy circuit 12 with a synchronizing-signal from a synchronizing-circuitry 16. The synchronizing-signal will be discussed later, but suffice it to say that it is also a binary-coded signal, of the same general form as the encoded data signal; and it occupies the entire live-time portion of a frame, and is not redundanced.

The synchronizing signal is used as follows. Upon a "transmit" command, transmit-command switch 58 of FIG. 3 energizes a framecounter 64 for a predetermined interval of time —typically 128 frame-times. During this time-interval, synchronizing-signal generator 60 applies the synchronizing-signal to AND circuit 62 for 128 frame-times. From here, it is eventually broadcast; frame-counter 64 being a Mod 128 counter that is energized by a particular timing-pulse such as $P_0$. Meanwhile, another signal from frame-counter 64 disables AND circuit 68 so that data-signals from OR circuit 56 cannot be applied to OR circuit 66 and broadcast during this 128-frame interval. It should be noted that the synchronizing signal is such that its meaningful portion occurs during the live-time interval of each frame.

At the end of the 128 frame-time synchronizing-signal interval of time, the output from frame-counter 64 disables AND circuit 62, and enables AND circuit 68; which now permits the data-signals from OR circuit 56 to be applied to OR circuit 66, and to be broadcast — and prevents the synchronizing-signal from being broadcast. Thus, the synchronizing-signal is first passed through combining-circuit 14 for a predetermined synchronizing-signal interval, after which the data-signals are passed through combining-circuit 14; the instantaneous output of OR circuit 66 being broadcast. In this way, the output of combining-circuit 14 is a multiplexed signal, comprising a train of identical 128 binary-coded synchronizing-signals, followed by a train of binary-coded data-signals — the composition of the data-signals depending upon the input signals, and the length of the data-signal train depending upon the amount of data to be transmitted. The overall transmitted waveform is indicated, in a different time-scale, in line two of FIG. 2.

THE BROADCAST SIGNAL

As previously indicated, the data-signal may be broadcast in any one of a number of forms, and the present equipment uses the so-called "bi-phase" form. The foregoing explanation of the encoding circuit showed how the analog input signal was converted to a binary digital form, and the explanation of the combining circuit indicated that the synchronizing-signal is also of a binary digital form. FIG. 3 indicates how these signals are converted to the bi-phase form for transmission.

It will be recalled that the binary synchronizing-signal and the binary triple-redundancy data-signal were sequentially applied to OR circuit 66. These binary-coded signals are applied over wire 67 of FIG. 3, and (ignoring, for the present, the toggle flip-flop 163) the signals reach phase-shift-key modulator 68. This also receives a basic frequency — typically 30 MC — from timing circuit 24T. The operation of phase-shift-key modulator 68 is such that a "one" state of a binary-coded signal (either data-signal or synchronizing-signal) produces an output of the basic 30 MC frequency having a given phase; and a "zero" state of a binary-coded signal produces an output of the basic 30 MC frequency having the opposite phase. This phase-reversal, or bi-phase technique is well known, and is also discussed in the previously-cited Stanford and Frequency publications; the Stanford publication also illustrating a suitable modulator circuit. Thus, 128 bi-phase synchronizing-signals, followed by bi-phase data-signals, are applied from phase-shift modulator 68 to mixer 20, where they are mixed with the frequency-hopping waveform from frequency-hopping circuitry 18T, to be broadcast in a bi-phase mode. Thus, the transmitted waveform is actually an (F + 30MC) frequency-hopping carrier-waveform having a changing frequency F, modulated by a changing bi-phase modulation of 30 MC frequency; where F changes for every frame, and the phase of the 30 MC frequency depends on the information-bit. However, for convenience the broadcast waveform will be designated as having a frequency "F".

It has been pointed out that the broadcast waveform may comprise synchronizing-signals or data-signals; and for ease of explanation the term "information-signal" will be used to refer to the content of the broadcast waveform, — regardless of whether the instantaneous content comprises synchronization or data information.

THE RECEIVING OPERATION

A slight digression is necessary at this point. It has been stated that the transmitter generates frequencies that change in a given manner, and this has been called "frequency-hopping." It has also been stated that each receiver "frequency-hops" in its own individual sequence; but the "frequency-hopping" of the receiver should be construed as a hopping of the frequencies to which the receiver is receptive. An analogy would be the condition wherein a person continually changes the dial-setting of a radio, so that the radio reception continually "hops" to different stations, or frequencies. With this clarification in mind, the term frequency-hopping — as applied to the transmitter — is to be construed as the actual frequencies and frequency-sequences broadcast by the transmitter; and — as applied to the receiver — is to be construed as the frequencies and frequency-sequences to which the receiver is sequentially tuned. In order to simplify the following explanation, however, the receiver's operation will be explained in terms of a "receiver-waveform" that comprises frequencies and frequency-sequences; and this receiver waveform will be compared to the frequencies and frequency-sequences of the transmitted and received waveforms from the transmitting station. A later explanation will clarify the relation between the receiver's frequency-hopping waveform and the receiver's circuitry.

It was previously pointed out that each receiver continously frequency-hops in its own individual frequency-hopping sequence, and that in order for a transmitter to communicate with a selected station, the matrix in the transmitter is set (addressed) to that of a selected station. Ignoring, for the moment, the bi-phase information-bearing modulation, the carrier-wave from the transmitting station now frequency-hops to the same frequencies, and in the same frequency-hopping sequence as the addressed station. However, even though the transmitter and the receiver are now frequency-hopping in the same manner, the instantaneous received-frequencies and the instantaneous receiver-frequencies at the receiver are — in all probability — somewhat different. This difference is due to the facts that (1) the frequency-hopping circuits in the transmitter and in the receiver can never operate exactly alike, (2) the two stations may have been turned on or may have started their frequency-hopping at different times, (3) the two stations may "drift" to different extents, and (4) the two stations have different communication histories, etc.

Another factor enters into the situation, when it is realized that an appreciable distance separates the transmitting station and the addressed station; and in those instances where one or both of the stations are mobile, as when they are in automobiles or helicopters, the distance between them is changing from instant to instant. Thus, even if the transmitter is broadcasting the same frequencies in the same frequency-hopping sequence as required by the addressed station, by the time that a particular frequency arrives at the receiver, the receiver — in all probability — has already hopped to a different frequency; and it is not receptive to, and therefore cannot utilize, the received frequency.

In order to illustrate this situation, assume that a transmitter is addressed to a selected station, and is frequency-hopping in the same manner as the addressed station. Assume further, that the addressed station is "free," that is, it is not engaged in a communication. The situation can be understood from FIG. 6. Here, waveform 70 represents a frequency-hopping carrier-wave that is being broadcast by a transmitting station that has had its matrix set to achieve the frequency-hopping sequence of the addressed station.

A number of things should be noted about waveform 70, and subsequent waveforms. First of all, each frame of these waveforms comprises the previously-discussed "live-time" portion and "dead-time" portion. Secondly, the live-time frame portion of these waveforms is the information-bearing portion, and these live-time portions contain either the synchronizing signal or the various data-bearing sub-words of the frame. Thirdly, these waveforms represent only frequency-hopping carrier-wave frequencies, and do not show the contained synchronizing-signal or data that is contained in the live-time portions. Moreover, the live-time portions of the various frames of the transmitted waveform are designated as being frequency $F_1$, $F_7$, etc., but it should be noted that, because of their modulation, their frequencies are actually ($F_1$ + 30 MC), ($F_7$ + 30 MC), etc.

Figure 6:
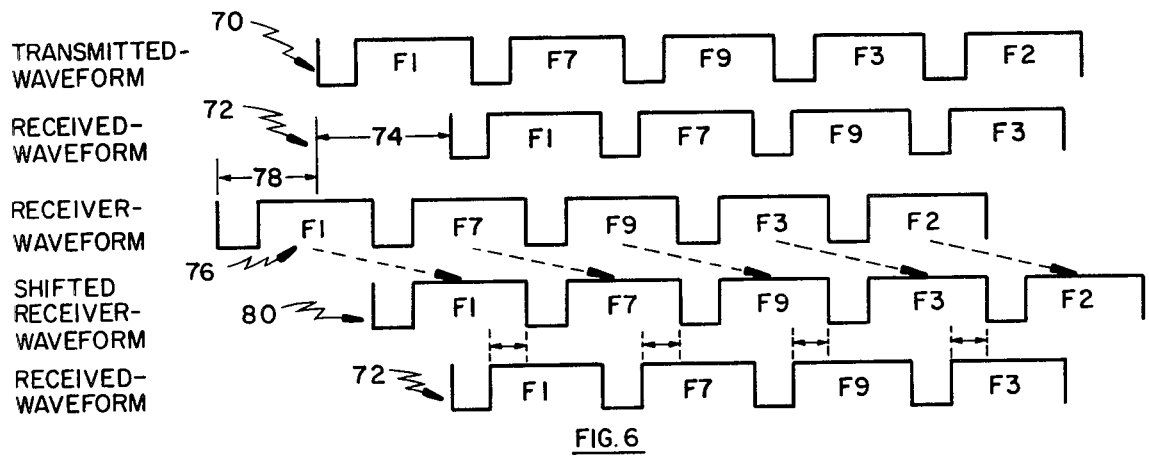
FIG. 6 shows a relation between the transmitted, received, receiver, and shifted waveforms.

As previously explained, there may be an appreciable distance between the transmitter and the receiver; and therefore and appreciable "propagation-time" is required for the signals from the transmitter to reach the receiver. FIG. 6 shows a typical time-relation between the transmitted-waveform 70 and the received-waveform 72; the propagation time-interval 74 — measured from an arbitrary reference instant — offsetting the received-waveform 72 from the transmitted-waveform 70. Of course, the offset propagation-time-interval 74 depends upon the distance between the transmitter and the receiver.

The frequency-hopping sequence of the receiver is shown by receiver-waveform 76 of FIG. 6; this frequency-hopping sequence being in actuality the instantaneous frequencies to which the receiver is receptive, as discussed earlier. Offset time-interval 78, which is a function of the differences in the electronic circuitry in the transmitter and the receiver, their turn-on time, their drift-rate, etc., may be either in the same or in the opposite sense compared to offset 74; the combination of the extremes of time-intervals 74 and 78 being known as the maximum "time-uncertainty."

It may be seen by studying the relation between received-waveform 72 and the receiver-waveform 76 in the illustrated example of FIG. 6 that — despite the fact that they are frequency-hopping in the same manner — at no time is the receiver receptive to the received-waveform; i.e., at no time is the frequency to which the receiver is tuned, the same as the frequency it is receiving. Specifically, while the receiver is sensitive to frequency $F_7$, it is receiving frequency $F_1$; while the receiver is tuned to frequency $F_9$, it is receiving frequency $F_1$ and frequency $F_7$; while the receiver is tuned to frequency $F_3$, it is receiving frequencies $F_7$ and $F_9$, etc. As a result, even though the received-waveform 72 is frequency-hopping in the same sequence as the receiver-waveform 76, the offsets 74 and 78 prevent the receiver from receiving the broadcast.

This condition may be resolved as follows. By means to be described later, the receiver-waveform 76 of the receiver is shifted — by a procedure called "searching" — to a time-relation shown in FIG. 6 by the "shifted" receiver-waveform 80; the diagonal dotted arrows indicating the shift. For ease of comparison, the received-waveform 72 is reproduced below shifted-waveform 80. It may be seen that now — as a result of shifting the receiver-waveform — while the receiver is receptive to frequency $F_1$, frequency $F_1$ is being received; and that while the receiver is receptive to frequency $F_7$, frequencies $F_1$ and $F_7$ are being received from the transmitter, etc.; the interval of frequency coincidence between the received-waveform and the receiver-waveform being indicated by the double-ended arrows. Even though the coincidence-interval may, under some conditions, be quite short, there is a finite reception interval; and, during this, the receiver can utilize the received-waveform. Thus, under the described conditions of coincidence, or partial coincidence, wherein a transmitter has been properly addressed, the receiver's searching operation will produce reception intervals as indicated by the double-ended arrows. Of course, several shifting operating (to be described later) may be necessary to achieve coincidence.

Satisfactory coincidence, to be discussed later, is called "coarse-synchronization;" and requires that the received and receiver-waveforms be "matched" both frequency-wise and time-wise for at least one-third of the live-time interval. Circuitry to be described later uses the state of coarse-synchronization to initiate complete synchronization between the received and the receiver-waveforms.

It was previously indicated that the frequency-hopping sequences are established in such a way that, ideally, no two receivers are ever receptive to the same frequency at the same time. However, under certain conditions — such as when it is necessary to accommodate a large number of receivers — this exclusion of frequencies is impossible to achieve. Also, due to the previously discussed propagation-time, a searching receiver may receive an instantaneous frequency from a transmitter that is addressed to another receiver. Under either of the above conditions, a receiver that is searching for a message addressed to it, will achieve momentary coincidence with this instantaneous frequency. There will be a single, or possibly a few, coincident reception-intervals; but — since the receiver is frequency-hopping in one sequence, and the transmitter is frequency-hopping in another sequence — at a moment later, coincidence will be lost.

THE SEARCHING OPERATION

It will now be shown how a receiver is able to search for, and find a transmission addressed to it. When the receiver is "free," i.e., is not being used for immediate communication, it is "searching" for a transmission addressed to it. Referring back to FIG. 6 and the discussion given in connection therewith, it will be recalled that the searching operation comprised shifting the receiver-waveform in an attempt to achieve coincidence. Specifically, during the receiver's free intervals, it is continually searching, which may be achieved by shifting (advancing or retarding) the receiver-waveform, and then shifting this waveform in the opposite direction; and then repeating the searching procedure in order to find a transmission addressed to that station.

Figure 7:
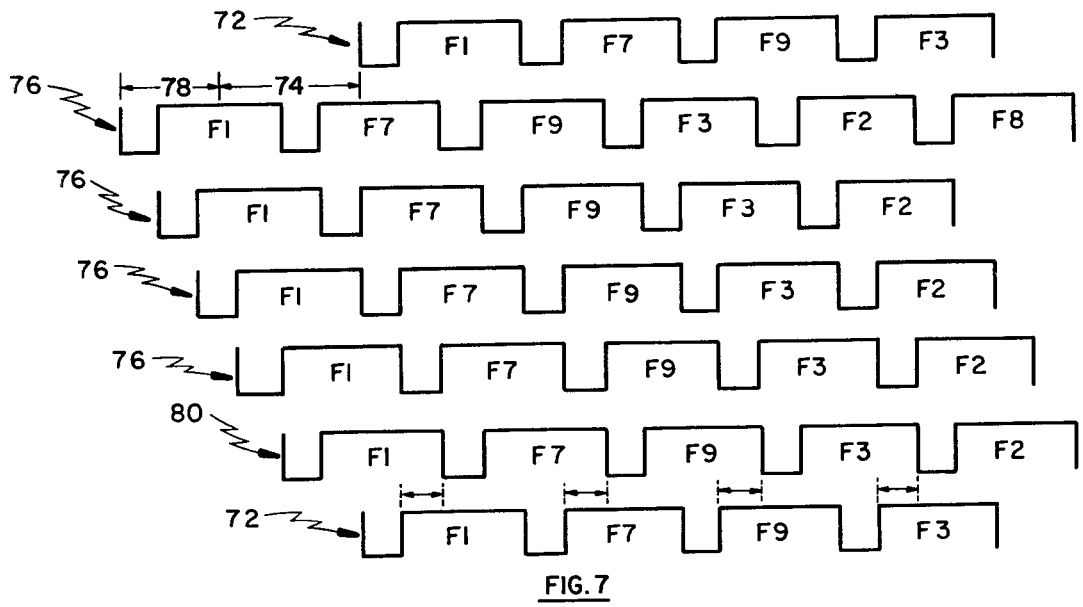
FIG. 7 shows one searching operation.

One type of searching procedure will be understood from FIG. 7, which shows the previously-discussed received-waveform 72, and fully-advanced receiver-waveform 76; i.e., a receiver-waveform that has been advanced (moved to the left) to the maximum time-uncertainty (time-interval 74 plus time-interval 78) as discussed previously. As shown in FIG. 7, the advanced receiver-waveform 76 is gradually and continuously retarded (shifted to the right), until a suitable shifted receiver-waveform 80 is eventually in partial coincidence with the received-waveform 72, which is reproduced for convenience — the time interval of coincidence again being indicated by the double-ended arrows. When coincidence of at least one-third of a frame is achieved, the searching mode is terminated. This searching mode may be called "progressive," because the receiver-waveform is displaced its maximum time-uncertainty, and then progressively and continuously shifted. If coincidence is not achieved, i.e., no addressed communication is received, the search is continued, i.e, the receiver-waveform is again advanced, and is retarded progressively and continuously.

Another searching mode may be used. It will be recalled that a properly addressed received-waveform and the receiver-waveform are frequency-hopping in the same sequence, but are out of step. This situation is again shown, in FIG. 8, by the received-waveform 72 and the typical receiver-waveform 76, wherein there is no coincidence at any time. In this particular searching mode, the fully-advanced receiver-waveform 76 is not retarded progressively and continuously as previously discussed, but instead — in the absence of coincidence — a specific frame is repeated; and the frequency-hopping sequence is then continued from that point.

Figure 8:
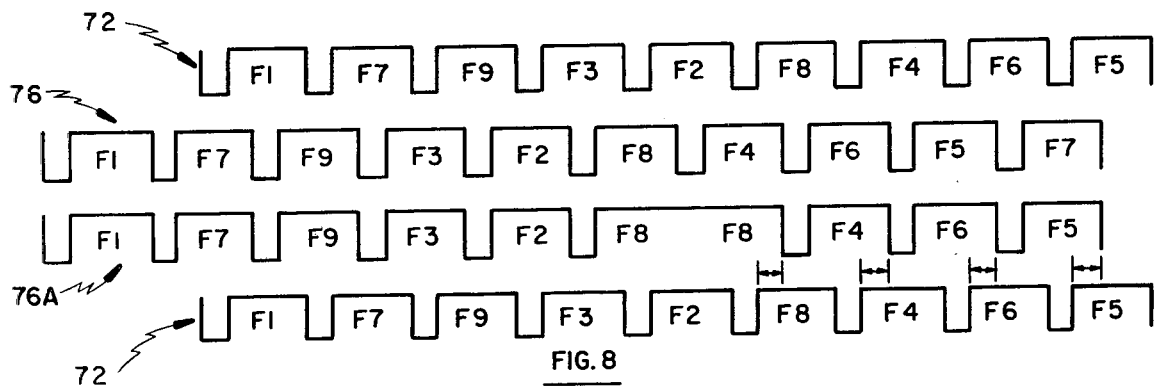
FIG. 8 shows another searching operation.

In FIG. 8, which illustrates this searching operation, there is no coincidence between the received-waveform 72 (reproduced as the last line) and the receiver-waveform 76A for the first six frames — $F_1$ through $F_8$ of receiver-waveform 76A. At this time, the sixth frequency, $F_8$ of receiver-waveform 76A is repeated; and the normal frequency-hopping sequence ($F_4$, $F_6$, $F_5$, etc.) of waveform 76A is then resumed. It should be noted, in passing, that the repetition of frequency $F_8$ does not produce a dead-time interval, since the frequency-synthesizer does not switch to a new frequency, but merely continues to generate the same frequency $F_8$. It will be noted that after the repetition of $F_8$ of waveform 76A, there is now coincidence between the received-waveform 72 and receiver-waveform 76A; the intervals of coincidence again being indicated by the double-ended arrows. This searching mode is called "intermittent," since the receiver-waveform is displaced intermittently. Of course, several such intermittent shifts may be required to product coincidence; and if coincidence is not achieved, the searching mode is continued, i.e., the receiver-waveform is again advanced, and retarded intermittently.

RECEIVER CIRCUITRY

Figure 9:
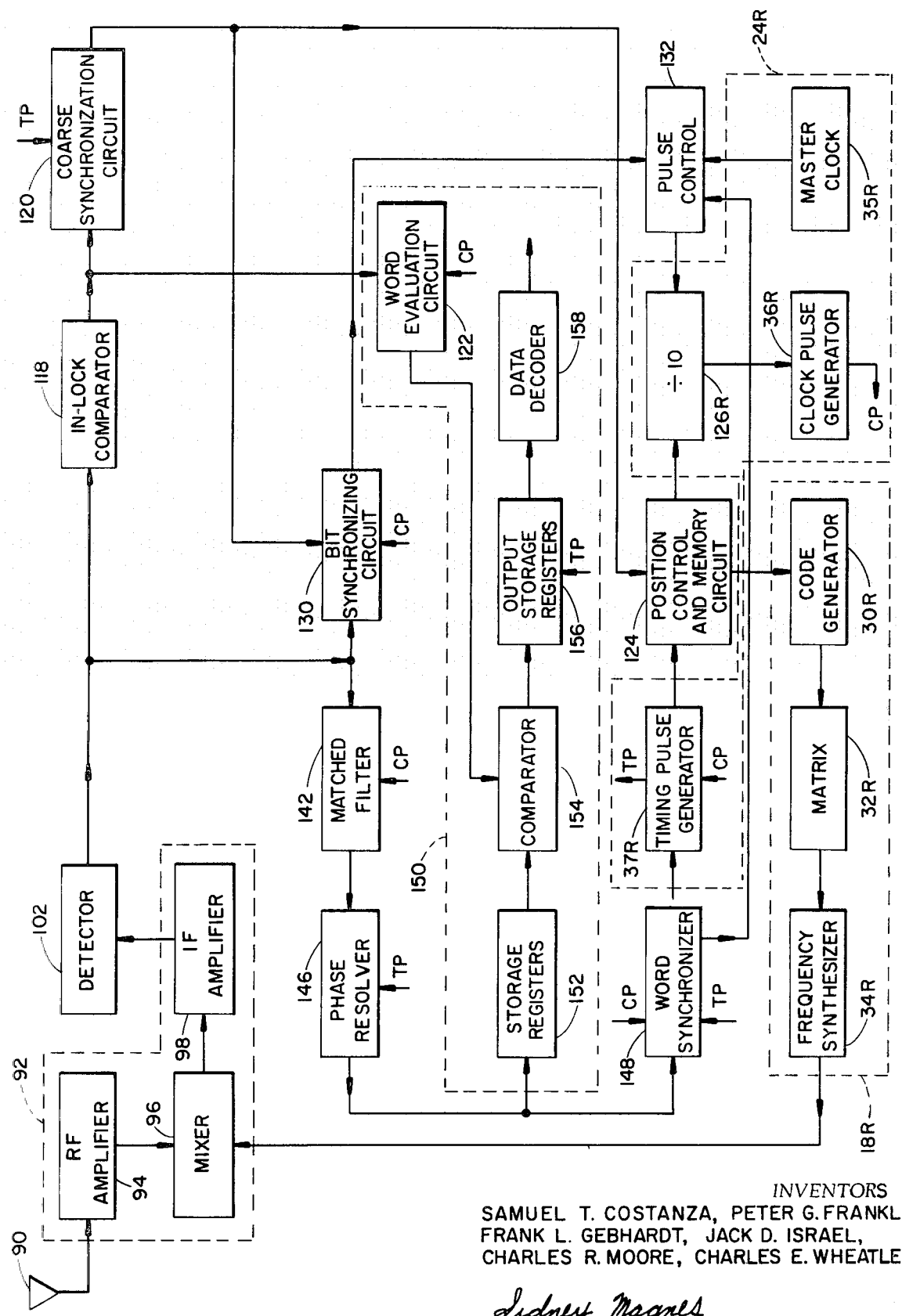
FIG. 9 shows a simplified block diagram of the receiver.

FIG. 9 shows a simplified block diagram of a receiver, and it should be noted that the receiver has a frequency-hopping circuit 18R, corresponding to the frequency-hopping circuit 18T of the transmitter; and also has a timing circuit 24R corresponding to the timing circuit 24T of the transmitter — certain blocks being omitted or repositioned for convenience of illustration and explanation. For simplicity of illustration, the application of clock-pulses (CP) and timing-pulses (TP) is shown only where required by the detailed explanation; other components requiring synchronization being known to those skilled in the electronics art.

In operation, incoming signals impinge onto the receiver's antenna 90, and are then directed to receptor circuitry 92, which may comprise the wellknown combination of a radio-frequency amplifier 94, a mixer 96, and an intermediate frequency amplifier 98. As is well known, this type of receptor circuit uses a technique known as "hetrodyning;" in this case, the amplified antenna signal from radio-frequency amplifier 94, and the signal from frequency-synthesizer 34R of frequency-hopping circuitry 18R, both being applied to mixer 96. In the hetrodyning technique, if these two signals have a specific frequency-difference, the output of mixer 96 is an intermediate-frequency signal that is amplified by the intermediate-frequency amplifier 98.

It should be recalled that the received-waveform has a basic carrier-frequencies $F_1$, $F_2$, etc. that are bi-phase modulated with a 30 MC signal, so that the received-waveforms have frequencies of ($F_1$ + 30 MC), ($F_2$ + 30 MC), etc.; and that the receiver's frequency-synthesizer 34R produces frequencies $F_1$, $F_2$, etc. When the bi-phase modulated "F + 30 MC" received-waveform and the "F" receiver-waveform are hetrodyned in mixer 96, the result is a bi-phase modulated IF frequency of 30 MC; and this is amplified by the IF amplifier 98.

If, however, the frequency-difference between the incoming antenna signal and the frequency-synthesizer signal is not correct, i.e., ($F_7$ + 30 MC) and ($F_1$ + MC), the output of mixer 96 is of such a frequency that it cannot be amplified by intermediate-frequency amplifier 98; and no appreciable output is produced by intermediate amplifier 98. In other words, if portions of the received-waveform (antenna-signal) and the receiver-waveform (frequency-hopping signal) are coincident as defined above, intermediate-frequency amplifier 98 will produce an output. If, on the other hand, the received-waveform and receiver-waveform are not coincident, intermediate-amplifier 98 will not produce any appreciable output. In summary, an output signal appears at IF amplifier during intervals of coincidence.

Since the output of frequency-synthesizer 34R is applied to mixer 96 of receptor-circuit 92, the frequency-synthesizer controls the frequency to which the receiver is receptive. Moreover, a previous statement may now be modified, without danger of misinterpretation. It was previously stated that the receiver's frequency-hopping was to be construed as the frequencies to which the receiver was receptive; but it can now be stated that the receiver's frequency-synthesizer actually produces frequency-hopping frequencies — although, as shown — these are used in the receiver's hetrodyning operation.

COARSE SYNCHRONIZATION

It will be recalled that a free receiver searches for a transmission addressed to it. Assume for the moment that it does not find any such transmission. Under this condition there is no coincidence between the received and receiver-waveforms, and there is no usable output signal from receptor circuitry 92 of FIG. 9. In the absence of such an output signal, the receiver continues its search.

Assume now that the search does find a transmission addressed to that station, and achieves coincidence between the received and receiver waveforms. As explained above, the output of mixer 96 is a 30 MC bi-phase-modulated intermediate-frequency signal that can be amplified by intermediate-frequency-amplifier 98 indicates that there is coincidence between the received and receiver signals; and this output is applied to detector-circuit 102 of FIG. 9, which circuit may take the form of a well-known phase-lock loop, which is also discussed in the above-cited FREQUENCY publication.

Figure 10:
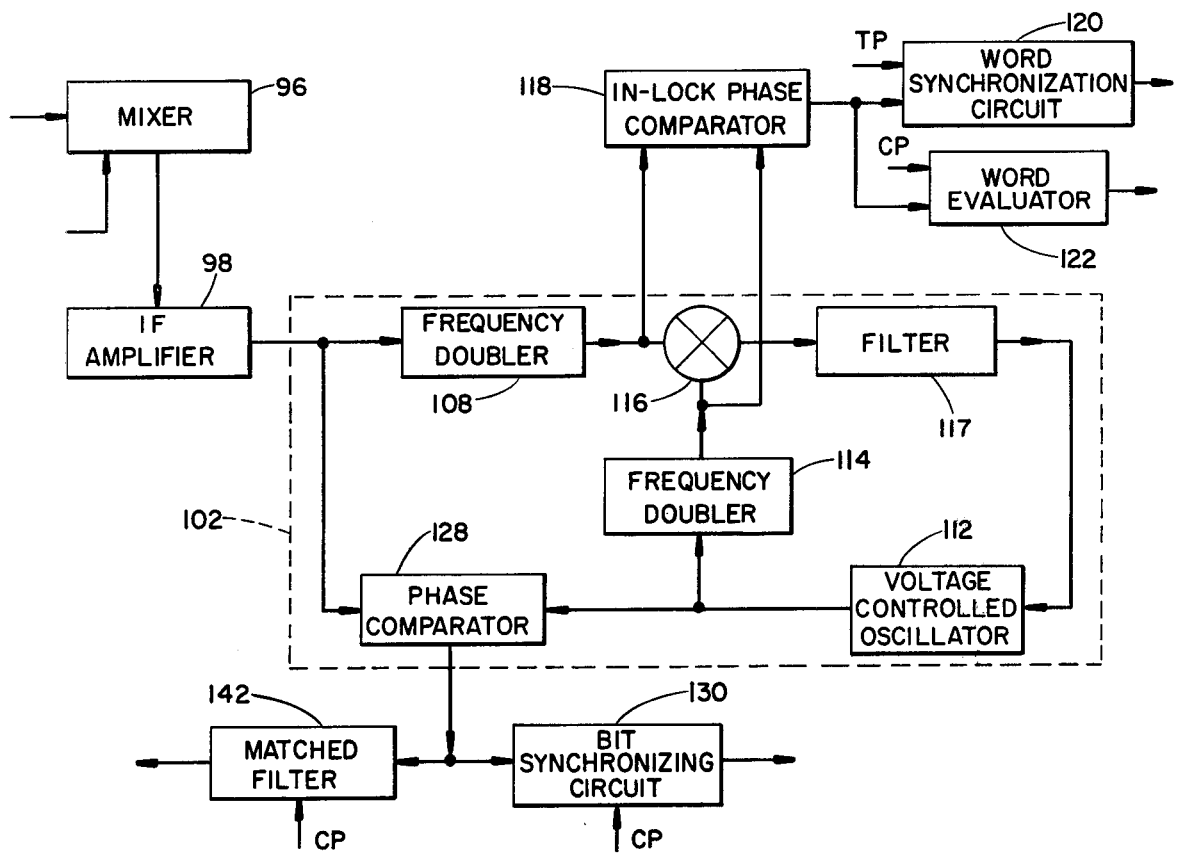
FIG. 10 shows a block diagram of the detector and its associated circuitry.

The operation of detector circuit 102 and its phase-lock loop may be better understood from FIG. 10. When the searching operation has caused the receiver to achieve coincidence between the received and the receiver-waveforms, there is a bi-phase-modulated IF output signal from IF amplifier 98; and this output signal is applied to detector 102.

Figure 11:
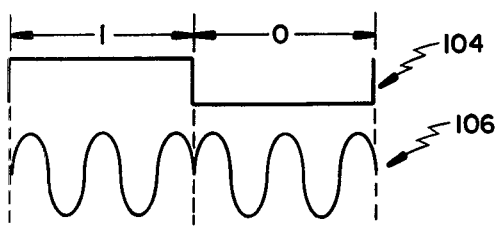
FIG. 11 shows various waveforms at the detector.

Digressing for a moment, it will be recalled that — at the transmitter (FIG. 3) — the encoder 10 encoded the incoming analog signal to a "one-zero" binary code, and that — at phase switch key 68 — the "one-zero" binary code was converted to a bi-phase modulation wherein the "ones" were converted to a given phase, and the "zero's" were converted to an opposite phase. Specifically, FIG. 11 shows an exemplary "one-zero" binary signal 104 converted to a bi-phase waveform 106; the "one" portion and the "zero" portion of waveform 106 having opposite phases, with an indeterminate transition between them; and this information-bearing bi-phase signal 106 modulates the frequency-hopping carrier waveform.

At the receiver, FIG. 9, a bi-phase-modulated intermediate-frequency signal appears at the output of the IF amplifier 98 — also shown in FIG. 10. Here in detector 102, the output signal from IF amplifier 98 has its frequency doubled by frequency-doubler 108; this frequency-doubling operation producing a sinewave of twice the IF frequency — but without the bi-phase modulation, which is lost in the frequency-doubling operation.

Detector 102 of FIG. 10 also comprises a voltage-controlled oscillator 112 that has its nominal frequency equal to the IF frequency; and the oscillator's output is also doubled in a frequency-doubler 114. The two double-frequencies, which are the same frequency, are applied to mixer 116; and any phase-difference between the two doubled-frequency signals causes mixer 116 to produce an error signal traverses a filter 117, and is applied to, and varies the phase of the oscillator's output. Therefore, the oscillator's output is of the IF frequency; is locked to the phase of the frequency-doubled signal from IF amplifier 98; and may therefore be used as a reference signal.

As shown in FIG. 10, the doubled IF frequency from frequency-doubler 108, and the doubled-oscillator-frequency from frequency-doubler 114 are also applied to an in-lock phase-comparator 118 that produces an output signal when the two input signals are present and locked together in-phase. Under this condition, which occurs during coincidence of the received and the receiver waveforms, the two doubled-frequency signals are locked together; and the output of the in-lock phase comparator 118 is maximum. Thus, the output of in-lock phase-comparator 118 indicates whether or not coincidence has been achieved; a large output indicating coincidence, and a minimal — or no output — indicating lack of coincidence.

Figure 12:
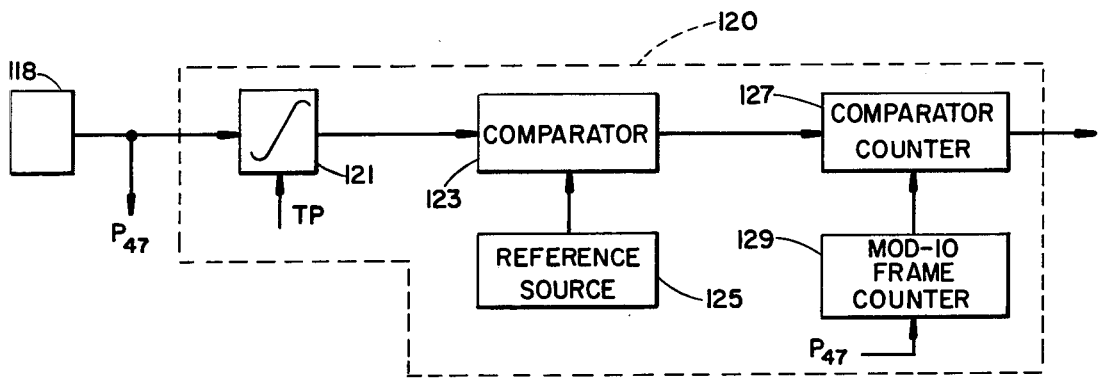
FIG. 12 shows a coarse-synchronization circuit.

The output of the in-lock phase-comparator 118 is applied to a coarse-synchronization circuit 120, which operates as follows. Referring to FIG. 12, the output of the in-lock phase-comparator 118 is applied to an integrating circuit 121 that integrates the applied signal for a complete frame, the contents of integrator 121 being "dumped" — by timing-pulse $P_{47}$ — at the end of each frame. The signal from integrator 121 is applied to a comparator 123, which also receives a reference signal from a reference source 125 — the reference signal being of a value that integrator 121 would produce for a coincidence of one-third of a frame. Thus, if one-third or more of a frame is in coincidence, comparator 123 applies a signal to a comparator-counter 127. In this way, the comparator-counter counts every frame that has at least a one-third coincidence. A Mod-10 frame-counter 129 produces a signal every tenth frame, at which time comparator-counter 127 compares the number of input pulses from comparator 123 with the pulse from Mod-10 counter 129; and dumps its count. If, at the count of 10 from Mod-10 counter 129, 7 or more pulses have been received from comparator-counter 127, this indicates that at least seven of ten frames had coincidence of one-third or more; and a "satisfactory" coarse-synchronization signal is produced, to terminate the search mode in a manner to be explained later.

If, however, the coincidence happened to be less than one-third of a frame; or the number of coincidences happened to be less than seven out of ten, an "unsatisfactory," coarse-synchronization signal would have been produced. Thus, coarse-synchronizing circuit 120 produces a "satisfactory," or an "unsatisfactory," output signal at every tenth frame; and these output signals determine whether the receiver operates in its search mode.

To summarize, coincidence for at least one-third frame for seven out of ten frames between the received and receiver waveforms produces a "satisfactory" coarse-synchronization signal, which is used to terminate the search operation; whereas failure to achieve this coincidence causes the receiver to continue its searching.

It will be noted that the output of in-lock comparator 118 of FIGS. 9 and 10 is also applied to a word-evaluation circuit 122, whose function will be discussed later.

Digressing for a moment, the searching mode of operation is achieved as follows. Referring to the receiver block-diagram of FIG. 9, it will be recalled that frequency-hopping circuit 18R causes the receiver to frequency-hop under the control of pseudo-random code-generator 30R. Anything that affects the operation of the pseudo-random code-generator will affect the frequency-hopping; and the searching operation is achieved by changing the frequency-hopping rate, by controlling the application of the shifting signals applied to the pseudo-random code-generator 30R. However, there is no change in the frequency-hopping sequence, which is controlled primarily by the matrix and the generator's feedback connections.

It will be recalled that each shifting pulse applied to the pseudo-random code-generator causes the pseudo-random code-generator to "advance," to produce a new code-signal. Thus, accelerating the clock-pulse generator 36R will accelerate the operation of the pseudo-random code-generator 36R. Moreover, applying a single additional shifting-pulse to the pseudo-random code-generator will cause it to accelerate momentarily.

In the first case, the continuous accelerated operation of the code-generator will cause the frequency-synthesizer 34R to accelerate its operation to produce the various frequencies at a faster rate. In the second case, the momentary accelerated operation of the code-generator will cause the frequency-synthesizer to accelerate momentarily, and then resume its normal frequency production.

In a similar manner, deceleration of the clock-pulse generator will produce frequencies at a slower rate; and inhibiting one shifting-pulse from application to the code-generator will cause repetition (or continuation) of a given frequency.

The above-described accelerated and decelerated operations are desired for the search mode of operation. In order to advance the receiver-waveform through its maximum-uncertainty interval, the pseudo-random code-generator operation must be accelerated; in order to continuously and progressively retard the receiver-waveform, the code-generator must be operated more slowly or must have selected clock-pulses inhibited; and in order to intermittently retard the receiver-waveform by one frame-time, selected timing-pulses must be inhibited.

Referring to the receiver timing-circuit 24R of FIG. 9, it will be realized that the receiver-waveform may be advanced through its maximum time-uncertainty interval by accelerating the operation of clock-pulse generator 36R for a given length of time. This result is achieved by by-passing a portion of the divide-by-ten counter 126R, so that the clock-pulse generator 36R receives its shifting signals at a faster rate. Specifically, an "unsatisfactory" coarse-synchronization signal from circuit 120 is applied to a position-control-and-memory circuit 124 (to be described later), whose output signal is applied to divide-by-ten circuit 126R. Here, an AND circuit that is enabled by the signal from circuit 124, by-passes a portion of the counting circuit, and permits the system trigger pulses — from master clock 35R and pulse-control circuit 132 — to be applied via the now modified dividing circuit 126R at a faster rate to the clock-pulse generator, for a given length of time controlled by circuit 124. Thus, for the desired time interval, the clock-pulse generator 36R, the timing generator 37R, and the pseudo-random code-generator 30R have their operations accelerated; so that the receiver-waveform is advanced to the position shown in line three of FIG. 6, and in line two of FIGS. 7 and 8. At the end of a predetermined time-interval controlled by a counter in circuit 124, the accelerated operation is terminated; at which time the receiver-waveform is in its advanced position, and is ready to be retarded either intermittently or continuously.

For the intermittent search mode of operation, position control circuit 124 — under control of its counter — periodically inhibits selected timing pulses — from timing-generator 37R — from being applied to pseudo-random code-generator 30R; thus producing the intermittent retardation of the receiver-waveform discussed in connection with FIG. 8; after a given number of retardations, the counter of circuit 124 again advances the receiver-waveform. For the continuous search mode of operation, circuit 124 produces an output signal that modifies the divide-by-ten counter, 126R, so that the clock-pulse generator 36R is decelerated for a given interval as controlled by the counter of circuit 124. After which the counter again advances the receiver waveform. In this way the receiver-waveform is continuously and progressively retarded as discussed in connection with FIG. 7.

Thus, as long as an "unsatisfactory" coarse-synchronization signal is present from circuit 120, the receiver operates in a search mode; i.e., the receiver-waveform is advanced, and then retarded. It should be pointed out that, during the search mode of operation, no information capable of being used by the receiver is being received, so that the changing rate of the clock-pulses, the timing-pulses, the code-signals, etc., does not have any detrimental effect in the receiver.

As soon as a "satisfactory" coarse-synchronization signal is produced by coarse-synchronizing circuit 120, and is applied to circuit 124, the search mode of operation is terminated; and the clock-pulse generator 36R and pseudo-random code-generator 30R resume their normal-rate operations.

One thing should be noted about the search and coarse-synchronization operation. During the interval when the receiver is free, it searches for a transmission addressed to it — and not finding one — goes repeatedly through the above-described searching operation. When the searching operation has found a broadcast addressed to the receiver, and when at least one-third live-portion coincidence has been achieved for seven out of ten frames, the searching and coarse-synchronization operations are terminated. At that time, there is an at-least one-third live-time coincidence; the one-third factor being the predetermined level to be reached by the integrated signals in coarse-synchronization circuit 120. This one-third factor will be used later.

BIT SYNCHRONIZATION

Figure 13:
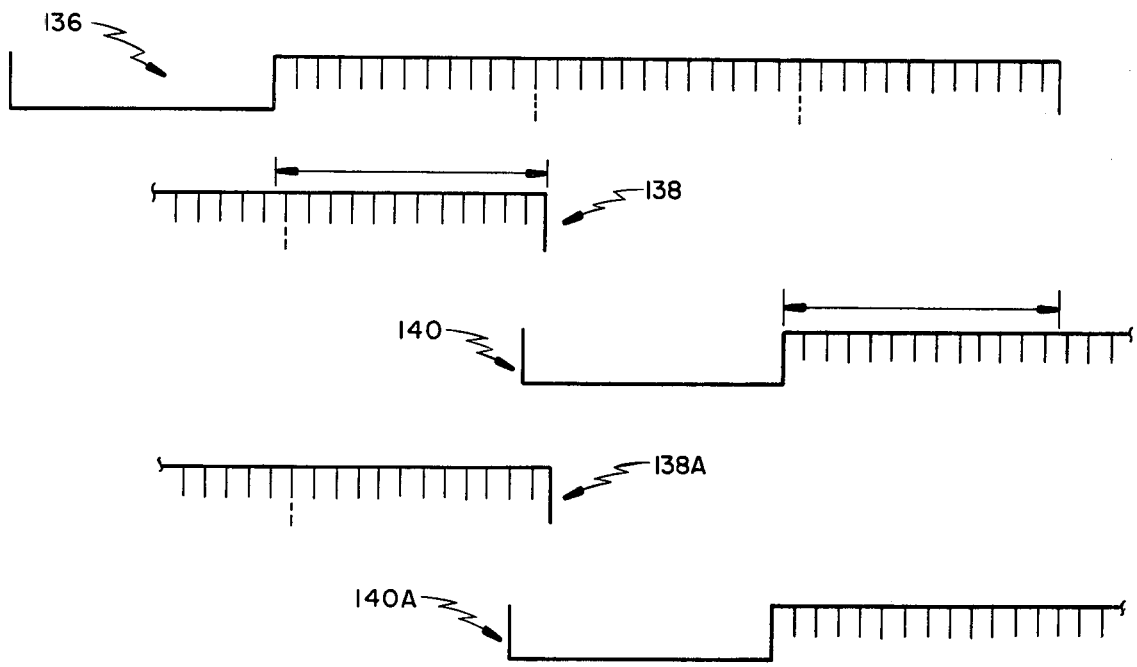
FIG. 13 shows bit-synchronization waveforms.

Once coarse-synchronization has been achieved, it is necessary to improve the synchronization, and this "bit-synchronization" procedure may be understood from FIG. 13. Here, one frame of the received-waveform is indicated by reference character 136, and the last third of the live-time portion of a receiver-waveform is indicated by reference character 138. In accordance with the previous discussion of searching, it can be assumed that receiver-waveform 138 has been shifted to the right — as shown in FIGS. 7 or 8 — until one-third coincidence, indicated by the double-ended arrow, has been achieved; whereupon the shifting was terminated by a satisfactory signal from the coarse-synchronizing circuit 120. However, it will be noted that the timing-signals of receiver-waveform 138 are not necessarily aligned with corresponding portions of received-waveform 136.

FIG. 13 also shows the first-third of the live-portion of a receiver-waveform 140 having a one-third coincidence with received-waveform 136; in this case also, the timing signals being out of alignment. This first-third type of coincidence can be produced by the intermittent searching mode, or by happening to begin transmission at a given instant. In each case of coincidence, there is satisfactory one-third coarse-synchronization, but the timing signals — or the "bit-intervals" between the timing-signals of the received waveform and the receiver-waveform — are not aligned. Bit-synchronization requires that the receiver-waveform be shifted slightly, so that each received bit of information fits into the time interval between adjacent timing signals of the receiver-waveform; that is, the receiver-waveforms 138, 140 must be shifted so that their timing signals are aligned with corresponding portions of received waveform 136.

Referring back to FIG. 10, it was previously pointed out that oscillator 112 produces a reference signal whose phase follows the phase of the incoming signal. For bit-synchronization, the incoming bi-phase-modulated signal from IF amplifier 98, representing sequential bits of information, is applied to phase-comparator 128; where it is compared with the reference signal from oscillator 112.

If the IF signal from amplifier 98 has the same phase as the reference signal from oscillator 112, phase-comparator 128 produces a signal of a given value — such as a "one;" whereas if the IF signal has an opposite phase compared to the reference signal, phase-comparator 128 produces a signal of another value — such as a "zero." In this way, by comparing the phase of the incoming signal with the phase of the reference signal, the phase of the incoming signal is converted to binary "ones" and "zeros." It should be noted that the binary output of phase-comparator 128 is at the received 120 KC bit-rate. (This is, in effect, a decoding of the binary to bi-phase coding operation produced by the phase-shift-key modulator 70 of the transmitter shown in FIG. 3). Referring back to FIG. 10, the now-binary coded information-signal from phase-comparator 128 is applied to bit-synchronization circuitry 130.

It will be recalled that the bit-synchronization circuit 130 of FIGS. 10 and 9 has to provide signals that slightly advance or retard the receiver-waveform, as explained in connection with FIG. 13; and FIG. 20 shows in block-diagram from how bit-synchronizing circuit 130 achieves this result. Here the binary information-bits from phase-comparator 128 (of FIG. 10) are applied through a gate circuit 301 — under the control of coarse synchronizing circuit 120 — to a differentiator and rectifier 300 that differentiates the one-zero binary bit-pulses to provide a positive-going and a negative-going "pip" for each incoming binary bit, and then inverts the negative-going "pips" to produce a series of positive-going pips.

A slight digression is necessary at this point. If the binary-coded signal from phase comparator 128 happened to be a regularly-reversing 1, 0, 1, 0, 1, 0 . . . information-signal, occurring at 120 kilobits per second, circuit 300 of FIG. 20 would produce a series of positive-negative-positive-negative . . . pips that would be converted to a series of positive-going pips occurring at a frequency of 120 KC per second. However, such a regularly-reversing 1, 0, 1, 0, 1, 0 . . . signal is very unlikely, but the actual coded-information produces many pips that do occur at the 120 KC frequency.

These pips are fed to a circuit 302, such as a band-pass filter, to produce a 120 KC sinewave that is applied to a phase-detector 304. It should be noted that this sinewave has a fixed 120 KC frequency; and that the actual time-occurrence of its peaks (phase) depends upon the incoming signal (the binary output from phase-comparator 128). Meanwhile, in FIG. 20, a train of 120 KC signals from clock-pulse generator 36R is applied to another device 306, such as a band-pass filter, to produce a second 120 KC sinewave; which is also applied to phase-detector 304. It should be noted that this second sinewave is also normally of a 120 KC frequency, and results from the operation of the clock-pulse generator. Phase-comparator 304 compares the phase of the two above-discussed sinewaves, and produces an error signal indicative of their phase-difference; the error signal controlling the state of a flip-flop 308.

Thus, if the second sinewave from the clock-pulse generator 36R is advanced relative to the first sinewave, flip-flop 308 assumes a state that produces a bit synchronization "retard" signal; which is used to decelerate the operation of the clock-pulse generator — this deceleration gradually retarding the receiver-waveform until the two sinewaves applied to phase-detector 304 are in phase. Similarly, if the second sinewave is retarded relative to the first sinewave, flip-flop 308 assumes a state that produces a bit-synchronization "advance" signal; which is used to accelerate the operation of the clock-pulse generator — this acceleration gradually advancing the receiver-waveform until the two sinewaves applied to phase-detector 304 are in phase. In this way, bit-synchronization circuit 130 slightly advances or retards the receiver-waveform until it is bit-synchronized synchronized with the received waveform.

Assume for the moment that the two sinewaves at phase-detector 304 are in-phase. This would mean that the bit-intervals of the received-waveform are occurring at exactly the same times as the bit-intervals of the receiver-waveform. Under the identical-frequency in-phase condition, bit-synchronizing circuit 130 of FIG. 20 permits the pulse-control circuit 132 to transmit trigger pulses from the master clock 35R to clock-pulse-generator 36R at a normal rate; these pulses being applied through the normally-operating divide-by-ten counter 126R. Under the assumed in-phase condition, each tenth output of divide-by-ten counter 126 causes the clock-pulse generator 36R to produce clock-pulses at its normal rate, which causes the pseudo-random-code generator and the frequency synthesizer to produce a receiver-waveform that does not advance or retard. Thus, under this in-phase condition, the receiver-waveform's bit-intervals continue to match the received-waveform's bit intervals.

Assume now that the receiver-waveform's bit-interval happens to be retarded (to the right) relative to the bit-interval of the received-waveform. Under this retarded condition, the phase-difference between the two sinewaves at phase detector 304 causes the bit-synchronizing circuit 130 to produce "retard" error signal that — when applied to pulse control circuit 132 — causes circuit 132 to inhibit one of the pulses traversing it to the divide-by-ten counter 126R. This inhibition may be achieved by having the retard error signal momentarily disable a gating circuit through which the pulses are passing. As a result of the inhibition of this pulse, the divide-by-ten counter 126R receives its tenth pulse somewhat later than normally, so its delayed output pulse momentarily delays the clock-pulse and timing-pulse generators, which momentarily delays the pseudo-random code-generator 30R, which momentarily delays the output of the frequency-synthesizer 34R. Therefore, the next frame is momentarily delayed, and thus the receiver-waveform is retarded slightly; i.e., waveform 138 of FIG. 13 is moved slightly to the right.

If the phase-relation is such that bit-synchronization circuit 130 continues to produce a "retard" error signal, the momentary retardation is repeated. This momentary retardation is repeated until the sinewaves in phase detector 304 of bit-synchronization circuit 130 are in phase, at which time the error signal disappears, and the frequency-hopping rate returns to normal. This terminates the retardation of the receiver-waveform, and maintains the bit-interval of the receiver-waveform aligned with the bit-interval of the received-waveform, as indicated in FIG. 13 by waveforms 136 and 138A.

In the case that the bit-interval of the receiver-waveform happens to be advanced (to the left) relative to the bit-interval of the received-waveform, as indicated by the relative positions of received-waveform 136 and receiver-waveform 140 of FIG. 13, the bit-synchronization circuit 130 of FIG. 20 produces an "advance" error signal that causes pulse control circuit 132 to introduce an additional pulse into the series of pulses applied to divide-by-ten counter 126R. This result may be achieved by having the advance error-signal momentarily set a flip-flop whose output signal is applied to an OR circuit through which the pulses are passing. The addition of this pulse causes the divide-by-ten counter to receive its tenth pulse somewhat earlier than normally; so it produces an earlier output signal that causes the clock pulse and timing-pulse generator to produce an earlier pulse, which shifts the pseudo-random code-generator 30R somewhat earlier than normally, and — as a result — the frequency-synthesizer 34R produces the next frequency somewhat earlier. Thus, the entire receiver-waveform is advanced; i.e., waveform 140 of FIG. 13 is moved to the left. This procedure continues until the sinewaves at phase-detector 304 of bit-synchronizing circuit 130 are in phase, at which time the error-signal disappears, and the frequency-hopping rate returns to normal. This terminates the advancement of the receiver-waveform, and maintains the bit-interval of the receiver-waveform aligned with the bit-interval of the received-waveform, as indicated in FIG. 13 by waveforms 136 and 140A.

Alternatively, the "advance" error signal may be used to retard the receiver-waveform, and the "retard" error signal may be used to advance the receiver-waveform. However, as may be seen from FIG. 13, the described procedure assures that the one-third coincidence will not be destroyed. In either case, bit-synchronization has been achieved. Thus, by accelerating and/or decelerating the clock-pulse generator, the receiver operates in a search mode, a coarse-synchronization mode, and in a bit-synchronization mode.

Thus, the receiver's operation as thus far explained, has found a communication addressed to it; and has achieved coarse and bit synchronization.

WORD SYNCHRONIZATION

It has been shown that a free receiver searches for a transmission addressed to it; and that when it finds such a transmission, it proceeds to achieve coarse-synchronization and then bit-synchronization. At that time the coincidence is at least one-third of the live-portion of a frame, and the bit-intervals are aligned, as shown in FIG. 13. The receiver then proceeds to an operation known as "word-synchronization," in order to provide coincidence over the entire frame; the "word," in this case, being the synchronizing-signal contained in the live-time portion of a frame.

It will be recalled that a transmitter precedes its data transmission with a synchronizing signal that is broadcast for a predetermined time-interval, typically 128 frame-times. The receiver performs a search, and uses the coincident portion of the received-waveform for coarse and bit-snychronizationas described above; the foregoing coarse and bit-synchronization operations ignoring the specific content of the incoming signal.

However, for word-synchronization, the specific content of the synchronizing-signal is used; the synchronizing-signal comprising a carefully selected non-redundanced binary coded signal. This synchronizing-signal is divided into thirds — not for the purpose of redundancing, but rather for the purpose of identification. Therefore, the synchronizing-signal has a "start" code occupying the first third of the synchronizing-signal, an "intermediate" code occupying the second third of the synchronizing-signal, and an "end" code occupying the third portion of the synchronizing-signal — as indicated by the letters S, I, and E of received-waveform 200 in FIG. 14A. The synchronizing-signal is carefully selected to minimize confusion between the start and end codes, and to minimize possible confusion caused by de-coding errors and the like.

It was previously pointed out that synchronizing-signals and data-signals were both broadcast as bi-phase modulated information; and as a result, phase-comparator 128 of FIG. 10 produces binary-coded information that corresponded to the broadcast bi-phase-modulated information. It will be realized that as a result of broadcasting, static, amplification, etc., the binary-pulse output of phase-comparator 128 may be somewhat distorted. In order to obtain "clean" binary-pulses, whether synchronizing-signal pulses or data-signal pulses, the output of phase-comparator 128 is applied to a "matched-filter" 142, shown in FIG. 9 and 10; matched filters being discussed in the previously-cited Stanford publication. Broadly stated, a matched-filter has a transmission-characteristic that is matched to the rise-time, amplitude, duration, fall-time, etc., of a desired signal; so that when a desired signal traverses the matched-filter, it produces a predetermined output — whereas when an undesired signal traverses the matched-filter, it does not produce any appreciable output. Thus, matched-filter 142 operates on each incoming bit of information from comparator 128, and produces a positive voltage for the "ones," and a negative voltage for the "zeros;" these positive and negative voltages being applied to a flip-flop to obtain clean positive-going and negative-going binary-pulses that correspond to the received information. The matched-filter operates for a bit-interval, and its contents are then "dumped" by clock-pulses applied to the matched-filter. Alternatively, the matched-filter may be replaced by a Schmitt trigger circuit, which would merely produce an output corresponding to the amplitude of the incoming signal, when such amplitude exceeds the trigger threshold.

In FIG. 9, the clean binary output obtained by the use of matched-filter 142 is applied through phase-resolver 146 (which is used for data recovery, and will be discussed later) to a word-synchronizing circuit 148, and to a data-recovery circuit 150.

To understand the operation of word-synchronizing circuit 148, it should be recalled that the synchronizing-signal comprises a "start" code, an "intermediate" code, and an "end" code; and the word-synchronizing circuit 148 of FIG. 9 comprises a memory register that contains these codes. The received synchronizing-signal from matched-filter 142 is applied to an incoming-signal register in word-synchronizing circuit 148; and, under the control of suitable timing signals, a comparator in word-synchronizing circuit 148 compares the incoming synchronizing-signal with the synchronizing-signal stored in the memory register; the comparison indicating the presence — or the absence — of the start-code or the end-code of the synchronizing signal. An alternative way of achieving this result will be described later.

Referring to FIG. 14A, if it should so happen that after coarse and bit synchronization, the receiver-waveform 202 has been so shifted that it coincides exactly with the received-waveform 200, as illustrated, the two waveforms are properly word-synchronized. This condition is recognized as follows. In word-synchronizing circuit 148 of FIG. 9, a counter counts from $P_{12}$ to $P_{24}$ — during which, ideally, the start code should be received; the contents of the incoming and memory registers being compared. Consider now, the idealized, exactly-coincident condition illustrated in FIG. 14A. Under this condition, the start code (S of waveform 200) would be recognized during the $P_{12} - P_{24}$ time-interval; and word-synchronization circuit 148 of FIG. 9 would produce a recognition output-signal from the comparison of the two registers. This recognition output-signal sets a flip-flop that acts through pulse-control circuit 132 to maintain the normal operation of the timing circuits. Now, for exact coincidence between the received and receiver waveforms, the receiver, under control of its normally-operating timing circuit and pseudo-random code-generator 30R — frequency-hops in precise synchronism with the received waveform; and the circuitry has achieved coarse, bit and word-synchronization for the condition illustrated in FIG. 14A.

However, the accidental occurrence of exact word-synchronization as indicated in FIG. 14A is improbable, so the receiver must generally operate in a word-synchronization mode. Assume now, referring to FIG. 14B, that the receiver receives a received-waveform 200, and is producing a receiver-waveform 204 being advanced (leftward) relative to the received-waveform 200. It will be noted that there is a two-thirds of a frame coincident interval, as indicated by the double-ended arrow. Word-synchronization is achieved as follows. As indicated previously, a counter in word-snychronizing circuit 148 counts during the receiver-waveform's $P_{12} - P_{24}$ time interval, indicated by the horizontally-hatched portion 206 of receiver-waveform 204. At the end of this interval, a comparison of the registers in word-synchronizing circuit 148 would indicate that the start code "S" is not present, and a flip-flop is set to cause a second counter to start to count clock-pulses until the end of the start-code is recognized; this occurring at $P_{36}$ in FIG. 14B — this counting interval being indicated by the vertically-hatched portion 208 of FIG. 14B. At time $P_{36}$ the second counter shows a count of 12; having, in this illustration, counted from $P_{24}$ to $P_{36}$. At time $P_{36}$ the second counter is reversed, and counts backward 12 counts to zero. During the backward twelve-count time interval, indicated by the diagonally hatched portion 210 of waveform 204, the operation of the timing-generator 37R is inhibited; this inhibition also inhibiting the operation of pseudo-random code-generator 36R. Thus, during the backward-count, the receiver-waveform remains at $P_{36}$, and the same frequency is produced. When the counter reaches zero, the timing-generator resumes its count, starting with $P_{36}$. Thus, as shown in waveform 204, this particular frame has been lengthened by twelve timing-intervals — the amount necessary to achieve word-synchronization for the subsequent frames.

It will be noted that during this word-synchronization operation, the clock-pulse generator has not been affected; so that the previously achieved coarse and bit-synchronization has not been disturbed. The effect has been to modify the operation of the receiver's timing-pulse generator, code-generator, and frequency synthesizer, and to selectively adjust the length of one frame.

FIG. 14C illustrates the situation wherein the receiver-waveform 216 is retarded (rightward) relative to the received-waveform 200. In this case too, the counter counts during the receiver-waveform's $P_{12}$-$P_{24}$ interval, 206, and makes a comparison of the registers to determine whether the start code is present in the received-waveform. As indicated in FIG. 14C, the start code is not present during the receiver-waveform's $P_{12}$-$P_{24}$ interval, so the second counter counts clock-pulses until the end of the start-code or the end-code is recognized. In this case, the end of the end-code is recognized, as indicated by the vertically-hatched portion 208. Recognition of the end of the end-code occurs at $P_{36}$, the counter showing a count of 12 at this time. The counter is now reversed, and counts backward to zero. During this backward 12 count, indicated by the diagonally hatched portion 212, the recognition of the end-code sets another flip-flop that — acting through pulse-control circuit 132, divide-by-ten counter 126R, and clock-pulse generator 36R — doubles the rate of the timing-pulse generator 37R, the pseudo-random code-generator 30R, and the frequency-synthesizer 34R; this accelerated operation continuing until time $P_{12}$, at which time the normal operation is resumed. During this interval of accelerated operation, a divide-by-two circuit is activated in the counter, so that it continues to count at its normal rate, rather than at the doubled rate. In this way, the frame is shortened by the amount necessary to achieve word-synchronization for the subsequent frames.

It should be noted that the clock-pulse generator has been accelerated to twice its normal rate, but that when the normal rate is resumed, the bit-synchronization condition is still maintained.

To recapitulate, for word-synchronization, the receiver's word-synchronization circuit compares the incoming synchronization-signal with the synchronization-signal stored in its memory. If the start-code is not recognized, a counter begins to count clock-pulses until either the end of the start-code or the end of the end-code is recognized, whereupon the counter counts backwards to zero. The first state causes the receiver's frame-producing circuitry to mark time, and to thus provide word-synchronization; whereas the second state causes the receiver's frame-producing circuitry to accelerate its operation, and to thus provide word-synchronization. It has been found desirable to maintain the bit-synchronizing circuitry after word-synchronization has been achieved.

An alternative word-synchronization technique is illustrated in FIG. 22. Here, storage-registers 320, 322, and 324 are loaded with the end-code, the intermediate-code, and the start-code of the synchronizing-signal; and, rather than storing the incoming synchronizing-signal, it is passed through a well-known shift-register 326. In this case, shift-register 326 has flip-flop circuits that store twelve-consecutive bits of information; and the shifting operation is such that the shift-register 326 sequentially stores bits one-thru-twelve, two-thru-thirteen, three-thru-fourteen, etc. Each sequential twelve-bit group is continually compared by comparators 328 and 330 with the start-code and the end-code stored in registers 324 and 320.

In the previously-described system, a first counter counted from $P_{12}$ to $P_{24}$, and then initiated the comparison; but in the system of FIG. 22, the comparators 328 and 330 are disabled during the early part of the receiver-waveform, and are enabled by the $P_{13}$ timing-signal. When a twelve-bit group of the incoming synchronizing-signal is recognized as the start-code, a "retard" signal is produced by comparator 328, and this retard-signal is used to lengthen a frame of the receiver-waveform as previously discussed. When, on the other hand, a twelve-bit group of the incoming synchronizing-signal is recognized as the end-code, a "advance" signal is produced by comparator 330; and the advance-signal is used to shorten a frame of the receiver-waveform, as previously described.

VARIABLE-RATE CLOCK-PULSE CIRCUITRY

As may be understood from the preceding explanation, the described system requires that the receiver's timing circuit have the ability to modify the rate of producing clock-pulses. FIG. 15 shows a circuit for producing clock-pulses that can be accelerated or decelerated as required; this circuit being fully disclosed and claimed as the invention of Jack D. Israel in a co-pending patent application, Ser. No. 607,855, entitled DIVIDING CIRCUIT filed Jan. 6, 1967; and assigned to the same assignee as the instant application.

The present circuit operation is based on the fact that a dividing, or counting, circuit can be designed to divide by 2, 5, 9, 10, and 11. Dividing circuitry using a binary chain as a counter is well known, and is described in a number of publications, such as "Pulse and Digital Circuits," by Millman and Taub. Chapter II of this book is entitled "Counting," and points out that a binary device will produce one output signal for every two inputs, thus dividing by two. Moreover, two serially-connected binary devices will produce one output signal for every four input signals; and will thus divide by four — this combination being called a "Mod-4" counter, since every output signal represents four input signals. Similarly, three serially-connected binary devices form a Mod-8 counter, four serially-connected binary devices form a Mod-16 counter, etc. Thus, the usual chain of binary devices, or counters, divides by a factor that is a power of the number, or "base," two.

This particular chapter also teaches how serially connected binary devices may be designed to operate on a base other than two; that is, how a divide-by-sixteen counter can be modified to divide by ten, and how a divide-by-sixty-four counter may be modified to divide by forty-one. The principle involved in these modifications is that of selective feedback, wherein signals from selected binary devices of a binary-chain are fed back to other binary devices of the binary-chain.

For a permanent divide-by-ten or divide-by-forty-one counter, the discussed feedback connections are, of course, permanent; but — where desired — a specific feedback connection may be temporarily disabled or enabled by a signal from an external source. In this way, a counter may be designed to normally divide by ten; but upon the occurrence of a suitable external signal, selected feedback connections may be temporarily modified so that the counter divides by four, five, six, or by another desired number.

This variable-divisor concept is used in the circuit of FIG. 15, wherein dividing circuit 230 comprises a Mod-2 counter 232 connected in series with a counter 234, whose feedback connections may be modified so that it acts as a Mod-4, a Mod-5, or a Mod-6 counter. It will be recalled from the discussion presented above, that a Mod-2 counter produces a single output for every second input; a Mod-4 counter produces an output for every fourth input, a Mod-5 counter produces an output for every fifth input, and a Mod-6 counter produces an output for every sixth input. In dividing circuit 230, counter 234 normally acts as a Mod-5 counter, that is, it produces an output for every fifth trigger signal applied to it. Similarly, Mod-2 counter 232 produces an output for every second input applied to it. In this way, the two serially-connected counters produce one output for every tenth input, thus forming a divide-by-ten counter; and circuit 230 normally divides by ten.

In order for dividing circuit 230 to divide by nine, an external signal is applied to counter 234 so that the counter acts as a Mod-4 counter, producing an output for the fourth trigger signal; and this output is applied to Mod-2 counter 232. The external signal is now removed, and counter 234 now resumes its normal Mod-5 operation, and produces an output for the fifth trigger signal; and this output is applied to Mod-2 counter 232. Since this output is the second input applied to Mod-2 counter 233, Mod-2 counter now produces an output. In this way, the combination produces an output for the ninth trigger signal; that is, circuit 230 acts as a divide-by-nine counter.

In order for dividing circuit 230 to divide by eleven, an external signal is applied to counter 234 so that it acts as a Mod-6 counter, producing an output for the sixth trigger signal. Removal of the external signal causes counter 234 to resume its normal Mod-5 operation, and to produce an output for the fifth trigger signal. As discussed above, these two outputs are applied to Mod-2 counter 232, which produces an output for every two inputs, and — in this case — produces an output for the eleventh trigger signal; thus the combination acts as a divide-by-eleven counter.

In this way, by using suitable external signals to modify the feedback connections, the discussed portion of dividing circuit 230 may divide by nine, by ten, or by eleven; but normally divides by ten.

It was previously pointed out in connection with FIGS. 9, 13, and 20, that bit-synchronizing circuit 130 produces output signals that are required to slightly accelerate or decelerate the production of clock-pulses. Specifically, in order to achieve bit-synchronization, circuit 130 compares a sinewave developed from the incoming signal with a sinewave developed from the master clock trigger-signals; and produces an output signal that depends upon the phase of the two sinewaves — this output signal being used to either accelerate or decelerate the clock-pulse generator, and to thus advance or retard the receiver-waveform.

Referring now to FIG. 15, when the clock-pulse generator 36R is to be accelerated, the "advance" output signal of bit-synchronizing circuit 130 modifies counter 234 so that it operates as a Mod-4 counter. As explained above, under this condition, counter 234 produces an output for the fourth trigger signal. The signal from bit-synchronizing circuit is then removed, and counter 234 now acts in a normal Mod-5 manner. Thus, counter 234 produces a first output for the fourth trigger signal and second output for the fifth trigger signal. These two sequential outputs are applied to counter 232, which therefore produces one output signal at the ninth trigger signal. Thus, the dividing circuit 230 now acts as a divide-by-nine counter, rather than in its normal divide-by-ten manner. In this way, clock-pulse generator 36 is triggered for every ninth trigger signal, rather than for every tenth trigger signal; and as a result, it therefore operates at an accelerated rate, since it provides a clock-pulse for every nine trigger signals — rather than for every ten trigger signals.

When bit-synchronization circuit 130 requires that the clock-pulse generator be decelerated, its "retard" signal causes counter 234 to act as a Mod-6 counter. Under this condition, counter 234 produces an output for the sixth trigger signal, and then returning to normal operation produces an output for the next fifth trigger signal. These two outputs are applied to counter 232 which therefore produces an output signal for every eleventh trigger signal, the output from Mod-2 counter 232 being applied to the clock-pulse generator is decelerated, since it produces an output for every eleventh trigger signal, rather than for every tenth input signal. Thus, bit-synchronizing circuit 130 causes the clock-pulse generator, the timing-pulse generator, and the frequency-synthesizer to be accelerated or decelerated as necessary, so that the receiver-waveform is slightly advanced or retarded to achieve bit-synchronization.

It was previously pointed out that the coarse-synchronization circuit 120 was also used to advance and retard the receiver-waveform. Referring again to FIG. 15, this result is accomplished as follows. The coarse-synchronization circuit 120 applies an "unsatisfactory" synchronization signal to position-control-and-memory circuit 124A. This latter circuit comprises a Mod-4 reversible counter; that is, a counter which will count either forward or backward. This type of counter is also described in the above-cited textbook.

During the searching mode of operation, the coarse-synchronization circuit produces a train of "unsatisfactory" synchronization signals as previously explained. The "unsatisfactory" synchronization signal from coarse-synchronization circuit 120 causes the reversible counter in circuit 124A to count backward from four to three; and also causes the position control and memory circuit 124A to apply an inhibiting signal to timing pulse generator 37R, where the inhibiting signal disables a gate that normally transmits the clock pulses. The inhibiting-signal thus causes continuation of the instantaneous frequency being generated, and in this way, produces the intermittant type of search mode described. At the end of the next ten frames, coarse-synchronizing circuit 120 again determines whether satisfactory coincidence has been obtained. If if has not, an "unsatisfactory" synchronization-signal is again applied to position control and memory circuit 124A, which again applies another inhibit signal to timing pulse generator 37R; the position control and memory circuit now counting backward from three to two. This procedure is repeated for a given number (four) of unsatisfactory synchronization-signals, at which time the reversible counter in position control and memory circuit 124A registers zero.

On the occurrence of the zero count, the counter in position control and memory circuit 124A applies a coarse-synchronization advance-signal to the dividing circuit 230; this signal being applied to an OR gate 238 that enables an AND circuit 240. The enabled AND circuit 240 accepts the output of the normally-operating Mod-5 counter 234, and now applies this output through an OR gate 242 to the clock-pulse generator 36R. This operation has the effect of by-passing the Mod-2 counter 232, i.e., causing dividing-circuit 230 to divide by five; so that the clock-pulse generator 36R receives shifting pulses at double its normal rate, and therefore drives the subsequent circuitry at twice their normal rates. As previously explained, this accelerates the production of the hopping frequencies, and advances the receiver-waveform through its maximum time-uncertainty interval, as previously described. During this accelerated interval of operation, the counter in position control and memory circuit 124A now counts forward, so that the receiver-waveform is advanced four frequencies — at which time the reversible counter in the position control and memory circuit 124A again reads four. At this time, the coarse-synchronization circuit again samples every ten frames and produces either a satisfactory or an unsatisfactory coarse synchronization signal. In this way, the receiver searches for a transmission addressed to it. If there is such a properly addressed transmission, the searching operation produces coincidence between the received and receiver waveforms, and a "satisfactory" coarse-synchronization signal from the coarse-synchronizaton circuit disables the position control and memory circuit 124A; and the previously-described bit-synchronization and work-synchronization operations are performed preparatory to receiving the communication.

Once the communication is terminated, there is no longer any coincidence; the position control and memory circuit 124A resumes its forward-and-backward counting operation, and the receiver thus resumes its search mode of operation.

It should be noted that under the influence of the counter in position control and memory circuit 124A, the receiver-waveform is capable of dropping back and advancing a given number of frequencies. This arrangement provides the ability to compensate for the time uncertainty due to propagation and and apparatus offsets; and may be easily extended by using a larger reversible counter in circuit 124A. Since the actual reading of the circuit 124A reversible-counter indicates the time-wise position of the receiver-waveform, this leads to the designation "position-control-and-memory" circuit.

It was previously pointed out in connection with FIG. 14 that the word-synchronization circuit 148 operated to either lengthen or shorten a given frame in order to provide word-synchronization. As shown in FIG. 15, when the frame is to be lengthened, word-synchronization circuit 148 produces a retard-signal that inhibits the timing pulse generator 37R in the manner previously described. Under those conditions when the word-synchronizing circuit 148 is to shorten a frame of the receiver-waveform, it produces an advance-signal that is applied to OR circuit 238, whose effect is to bypass the Mod-2 counter 232, and thus accelerate the operation of clock-pulse generator 236 as previously described. In this way, the circuit of FIG. 15 also achieves word-synchronization.

THE RECEIVED SIGNAL

A digression becomes necessary at this point. It was previously pointed out that the frequency-synthesizer, which produced the various frequencies for frequency-hopping, was comprised of a plurality of different-frequency sources and frequency-combining circuits. It will be further recalled that each frame is broadcast at a different frequency, which frequency is obtained by selectively combining the outputs of the various frequency-generating sources and/or combining circuits of the frequency-synthesizer. Therefore, the phases of the various frequency-signals are uncontrolled, due to the selective combination from the various sources, compounded by the various frequencies that are selectively combined. The uncontrolled phase produces a data-recovery problem. Moreover the frequencies cannot be changed instantaneously, so — during the frequency-changes — a dead-time interval occurs. Therefore, the transmitted signal comprises the following sequence: (1) a live-time interval having bits of reversing bi-phase modulation on a given carrier-frequency, (2) a dead-time interval, (3) another live-time interval having bits of reversing bi-phase modulation on another carrier frequency (4) followed by another dead-time interval, etc.

Referring back to FIG. 10, the useful input to mixer 96 comprises (1) an antenna signal of a given frequency and of an uncontrolled phase, and (2) a frequency-synthesizer signal of the same frequency (offset by 30 MC), and of an uncontrolled phase. Moreover, every individual information-bit of the incoming antenna signal has one of two possible phases. Therefore, the output of IF amplifier 98 comprises bursts of reversing bi-phase modulated IF frequency, separated by dead-time intervals; and each burst may have different phase than previous bursts. As a result, oscillator 112 of FIG. 10 is phase-locked for one burst during one live-time-interval; is unlocked and oscillates in a free-running manner during the dead-time interval; and is then phase-locked for the next burst during the next live-time interval. The resultant oscillator signal is therefore phase-locked only for each burst, and may assume a new phase-lock condition on the occurrence of the next burst. The result — due to the frequency-doubling concept — is that, for every new burst, oscillator 112 may lock to the phase corresponding to a "one," or to the phase corresponding to a "zero."

Referring back to the operation of the in-lock phase-comparator 118 of FIG. 10, it will be recalled that this comparator compared two doubled-frequency signals that were at substantially the same phase, due to the frequency doubling and phase-locking features. However, phase-comparator 128 of FIG. 10 compares (1) an incoming signal — from IF amplifier 98 — that may be of either of two phases, and (2) an oscillator signal that may be of either of two phases. Therefore, there is a phase-ambiguity; i.e., phase-comparator 128 produces "one" and "zero" information-bits that may actually be reversed; and matched-filter 142 produces cleaned-up "ones" and "zeros" that also have a phase-ambiguity. Since the coarse and bit-synchronization operations did not use the contents of the received waveform, these operations were not concerned with the phase-ambiguity; but the word-synchronization and data-recovery operations (to be described later) do use the contents of the received waveforms; and the phase-ambiguity must therefore be resolved.

In the case of word-synchronization, the phase-ambiguity is resolved as follows. It will be recalled that in FIG. 9, the now-binary synchronizing signal from matched-filter 142 is applied to word-synchronizing circuit 148; but that the applied "ones" and "zeros" may actually be "zeros" and "ones," due to the phase-ambiguity. However, the synchronizing signal has been carefully chosen; and the word-recognition circuitry of circuit 148 is designed to recognize — by means of storage registers — not only the start-code and the end-code, but to also recognize the complement ("ones" and "zeros" are interchanged) of the start and end codes. Thus, because the synchronizing signal is known, phase-ambiguity of the synchronizing-signal is easily resolved.

On the other hand, once the synchronizing-signal has been broadcast for its allotted 128 frames, and the data is being broadcast, there is no way of knowing whether the "one" and "zero" data-bits produced by matched filter 142 are true or reversed. This phase-ambiguity is most easily resolved as follows.

It will be recalled that the data bits are broadcast in a triple redundancy form; the first sub-word of each frame being produced by register 40 of FIG. 3. Register 40 is so constructed that the first bit of output data is always a "one." Knowing this, the phase-resolver 146 of FIG. 9 analyzes the first data-bit of each frame of received data. Since this data-bit is coincident with the P12 timing-pulse, an AND circuit is used, and if the first bit is a "one," the data passes through the AND circuit in its received form. However, if the first data-bit of a frame is a "zero," the AND circuit does not pass the data, but routes the data through an inverter circuit, so that every data-bit of that frame is changed to its complement; and these inverted bits are applied to the data-recovery circuitry 150. In this way, the phase-ambiguity is overcome.

DATA RECOVERY

It has been shown that a free receiver will search for a broadcast addressed to it, and will synchronize its operation to the synchronizing-signal that is being broadcast. Since the synchronizing-signal is broadcast for a finite interval of time, typically 128 frames, the receiver has ample time to synchronize its operation; and is soon ready to receive and recover the broadcast data.

Referring to the block diagram of the receiver shown in FIG. 9, data recovery is achieved as follows. The now-binary-coded and phase-resolved bits of data at phase-resolver 146 are applied to data-recovery circuit 150.

It will be recalled that in the transmitter a triple-redundancy circuit caused a given sub-word to appear in the last third of one frame, in the second-third of a second frame, and in the first-third of a third frame. At the receiver, circuitry in data-recovery circuit 150, under the control of clock and timing pulses, directs the sub-word (A1) from the last-third of the one frame to a first storage register; directs the same sub-word (A2) from the second-third of the next frame to a second storage register; and directs the same sub-word (A3) from the first-third of the next frame to a third storage register. Thus, each triple-redundanced incoming sub-word (A) is directed to its own input storage register of circuit 152. The three storage registers that feed their stored sub-words, A1, A2, and A3 to a comparator 154.

Alternatively, the data may be applied to comparator 154 as follows. Referring to FIG. 21, the data signal (of FIG. 5b) is received, and directed through a shift register 310. The sequential lines of FIG. 21 show the sequential positions of each sub-word, as they progress through the shift register. It will be noted that at given times of the shifting sequence, the third, sixth, and ninth positions of shift register 310 will contain the same sub-words — identified as encircled A, A, A; B, B, B; C, C, C, etc. in the illustration — but actually A1, A2, A3; B1, B2, B3; C1, C2, C3; etc. Moreover, these sequential sub-words occupy these positions of the shift register at every fourth shifting signal. Therefore, by taking the output from these shift register positions at every fourth clock-pulse, the data-rate is automatically divided by four — and thus matches the input data-rate at the transmitter — and the desired data is provided to comparator 154.

Since each sub-word comprises twelve data-bits, shift-register 310 may comprise three twelve-bit registers. It will be recalled that the word-synchronization circuit 148A of FIG. 22 also comprises three twelve-bit registers 320, 322, and 324. Therefore, in the interests of economy of hardware, these registers may be used as the storage registers during the word-synchronizing operation, and may be used as the data-recovery shift-register 310 during the data-recovery operation.

It will be noted that during the searching mode of operation, the receiver is not receiving any meaningful information. Therefore, neither the bit-synchronizing circuitry 130 nor the word-synchronizing circuitry 148 is operating — and the same is true of other circuits such as the data-recovery circuit 150, etc. However, these circuits may tend to operate on spurious signals; and, if this is objectionable, a disabling signal may be obtained from the coarse-synchronization circuit 120. Once coarse-synchronization is achieved, the signal from coarse-synchronization circuit 120 enables these circuits, so that bit-synchronization and word-synchronization is obtained.

After the achievement of word-synchronization, no advance-signal or retard-signal is produced; rather start-code and end-code recognition signals are available at predetermined times. Moreover, the subsequently-received data-signals will not produce start-code or end-code recognition signals. Any of the above features may be used to disable the word-synchronizing circuit; present equipment using the following features: (1) The use of code-recognition signals of predetermined times to disable the output of the word-synchronizing circuit, and (2) switching the registers from word-synchronizing usage to data-recovery usage. As mentioned above, it has been found desirable to permit the bit-synchronization circuit to operate during the data-recovery operation.

Simultaneously, comparator 154 receives a signal-to-noise (S/N) signal from word-evaluator 122, which operates as follows. It will be recalled from FIG. 10, that the in-lock phase-comparator 118 compared the phase of the double-frequency incoming signal with the phase of the doubled-frequency reference signal; and, when the phases were the same, produced an output signal. This output signal was applied to the coarse-synchronization circuit 120 — which provided a coarse-synchronization circuit 120 — which provided a coarse-synchronization signal, and to word-evaluator 122 — which operates in a manner similar to that of the coarse synchronization circuit, that is, it integrates the output of in-lock phase-comparator 118; but produces a so-called signal-to-noise (S/N) ratio signal.

The differences between the operation of coarse-synchronization circuit 120 and word evaluator 122 is as follows. Assume that a clean modulated IF signal is produced by IF amplifier 98. This signal is frequency-doubled and compared in circuit 118 with the frequency-doubled reference signal from oscillator 112. If the comparison is favorable, circuit 118 produces a large output signal that is applied to circuits 120 and 122. The coarse-synchronization circuit 120 integrates the output from circuit 118 over a frame interval, uses the result for its seven-out-of-ten coincidence count, and produces a coarse-synchronization signal, as previously explained. Word-evaluation circuit 122, however, integrates the large output over a sub-word interval, converts the result to a large S/N ratio signal, and applies this S/N signal to comparator 154 of FIG. 9.

Now assume that the next signal received by the receiver has been distorted by static, and is a fuzzy modulated IF signal from IF amplifier 98. Due to its fuzziness, which means that it has many spurious frequencies, the frequency-doubling is poor; and therefore its comparison in circuit 118, with the frequency-doubled reference signal from oscillator 112 is poor; and in-lock comparator produces a relatively small output signal. Since coarse -synchronization circuit integrates over a frame interval, the relatively small signal has only a minor effect; but since the word-evaluator circuit integrates (typically) over a sub-word interval, its output is small. Thus, the output of circuit 122 is a signal-to-noise ratio signal for that sub-word, being high for a clean received signal, and being low for a fuzzy received signal.

Under control of clock and timing pulses, the S/N signals for each sub-word is directed to its own storage register. Thus, under the control of suitable timing signals, comparator 154 of FIG. 9 receives — from storage registers 152 — the redundant sub-words, and — from word evaluator 122 — the S/N ratio for each sub-word. Comparator 154 evaluates the S/N ratios, selects the sub-word having the highest S/N ratio; and feeds the optimum sub-word to output storage register 156.

Rather than using the sub-word having the highest S/N ratio, a "weighted decision" technique — such as is shown in the following table — may be used.

| Case | Number of Good S/N Ratios | Use |
|------|---------------------------|-----|
| 1 | 1 | Good Sub-Word |
| 2 | 2 | 2 out of 3 |
| 3 | 3 | 2 out of 3 |
| 4 | 0 | 2 out of 3 |

The circuit of FIG. 16 shows a word-evaluator circuit for selecting information corresponding to four such different S/N cases. Here, the output signal from in-lock detector 118 is integrated in circuit 250 to provide a sub-word S/N signal, which is then applied to a threshold switch 252, which converts the S/N ratio signal to a "one," if it exceeds the threshold; and converts the S/N ratio signal to a "zero," if it does not exceed the threshold. Thus, a "one" indicates a good S/N ratio. The S/N ratios for the various sub-words are stored in S/N storage register 253.

Under control of suitable timing signals, S/N storage register 253 produces "good" or "poor" binary S/N ratio signals for each of the three redundanced sub-words having the same data; these S/N signals setting flip-flops 260, 262, and 264 in accordance with the value of the S/N signals for the sub-words. Thus, these flip-flops are set for the S/N ratio signals for their respective sub-word intervals. For convenience, the flip-flops are identified by NI, NII, and NIII to indicate that their outputs indicate the S/N ratio for corresponding sub-words of sequential frames, I, II, and III; the sub-words, of course, being the same information in redundant form.

The circuit of FIG. 16 uses the S/N signals as follows, the notation N1, N2, and N3 meaning that the corresponding flip-flop is in its "true" state, and is producing a "one" (good) S/N ratio output signal; and the notation $\overline{N1}$, $\overline{N2}$, and $\overline{N3}$ meaning that the corresponding flip-flop is in its "false" state, and is producing a "zero" (poor) S/N ratio output signal.

In case 1, only one sub-word has a good ("one") S/N ratio, thus indicating that only the information associated with this sub-word is reliable. Assume that the good S/N signal is associated with the sub-word in frame I. Flip-flop 260 is therefore in its true state, producing output signal N1; this being applied — among other places — to AND circuit 266. Since the S/N ratios of the other sub-words are low ("zeros"), flip-flops 262 and 264 produce signals $\overline{N2}$ and $\overline{N3}$ respectively; and these signals are also applied — among other places — to AND circuit 266. AND circuit 266 is the only one that responds to the combination N1, $\overline{N2}$, and $\overline{N3}$; and it produces an output signal that enables AND circuits 268 and 269.

It will be recalled that the input storage registers 152 of FIG. 9 contain the received information-bits of frames I, II, and III; these information-bits being in binary form. For convenience, the first information-bits of the redundanced sub-words of frames I, II, and III will be designated as A1, A2, and A3 to represent "ones," and as $\overline{A1}$, $\overline{A2}$, and $\overline{A3}$ to represent "zeros." The enabled AND circuits 268 and 269 can now accept the A1 or the $\overline{A1}$ information-bit from the sub-word of the first frame. If the information is a "zero" ($\overline{A1}$), the $\overline{A1}$ information traverses AND circuit 268, and OR circuit 272 — to be applied to output storage register 156, which produces a "zero," corresponding to $\overline{A1}$. Had the information in the sub-word been a "one" (A1), the A1 information would have traversed AND circuit 269 and OR circuit 270; and issued as a "one" from storage register 156. In summation, if only one sub-word has a satisfactory S/N ratio, only the information of that sub-word appears at the output of storage register 156.

It will be apparent, from a similar analysis, that if the single satisfactory S/N signal was obtained for the sub-word of frame II or III, only the information A2, $\overline{A2}$, A3, or $\overline{A3}$ of that sub-word would be used.

In case 2, two of the S/N signals are high, and the decision should be to use the information (the "ones" or "zeros") that occur twice of the triple redundancy. This is accomplished as follows in the circuit of FIG. 16. For case 2, where two S/N ratios are high, two of the flip-flops 260, 262, and 264 will produce "one" outputs; and, for the purpose of explanation, assume that the flip-flops produce outputs N1, N2, and $\overline{N3}$. It will be noted that only AND circuit 286 is enabled by this combination of signals; and this AND circuit in turn enables OR circuit 276, whose output enables AND circuits 278 and 280. Since the sub-words of frames I and II have high S/N ratios, the data of these two frames has been well-received; and since it is actually the same data, will be A1, A2, $\overline{A1}$, $\overline{A2}$, respectively for each bit considered. If it is A1, A2, this data will traverse OR circuit 284; whose output traverses enabled AND circuit 280, the output from this circuit being applied to OR circuit 270, which causes output register 156 to produce a "one," corresponding to the A, B data. A similar analysis will show that if the data was $\overline{A1}$, $\overline{A2}$, output register 156 would produce a "zero." Similar analysis will show that if two other sub-words had the high S/N signals, their information content would activate output register 156. Thus, under case 2, where two of the S/N signals are good, the circuit would use the two information-bits that agreed.

For case 3, where all the S/N signals are high, the combination of N1, N2, and N3 will enable AND circuit 292; and an analysis of the circuit of FIG. 16 will show that the decision will be to use two of the three information bits. Since all of the S/N signals are high, this indicates good signal-reception, and all of the information-bits will be the same. Therefore, it doesn't make any difference which two are used.

Under case 4, where none of the S/N signals are high, flip-flops 260, 262, and 264 will produce outputs $\overline{N1}$, $\overline{N2}$, and $\overline{N3}$; and only AND circuit 274 will react to this combination of inputs, its output enabling OR circuit 276, which in turn enables AND circuits 278 and 280. Assume further, that the information of the first sub-word looks like a "one" (A1), the corresponding information of the second sub-word looks like a "zero" ($\overline{A2}$), and the corresponding information of the third sub-word looks like a "zero" ($\overline{A3}$). The decision should be to use "zero," since it occurs twice out of three times.

The circuit of FIG. 16 makes this choice as follows. OR circuit 282 will produce an output under the following inputs: $\overline{A1}$, $\overline{A2}$; $\overline{A2}$, $\overline{A3}$; or $\overline{A1}$, $\overline{A3}$. The second combination, $\overline{A2}$, $\overline{A3}$ is present in assumed case; and OR circuit 282 produces an output that is transmitted through the enabled AND circuit 278, to OR circuit 272, and to output storage register 156; which thereupon produces a "zero" output signal. It will be noted that the inputs to OR circuit 284 require two "one" signals, which are not present in the assumed case; so OR circuit 284 does not produce any output.

If, under the assumed poor S/N signal case, the information-bits happened to be $\overline{A1}$, A2, and A3, OR circuit 282 would not produce any output — since none of its inputs meet its requirements; but the A2, A3 combination would cause OR circuit 284 to produce an output signal. Following the above analysis, circuits 280, and 270 would cause circuit 156 to produce a "one" signal.

In summation, the circuit of FIG. 16 shows a weighted-decision way to select the optimum information-bits, as indicated by their respective S/N ratios. It should be noted that in the above explanation, S/N signal is obtained for each sub-word, and all of the information-bits of that sub-word are considered to have the same S/N ratio. Alternatively, a S/N signal can be obtained for an entire word, or for each information-bit.

It will be recalled that information is received at a 120 KC bit-rate, and is applied to storage registers 152 of FIG. 9 at this rate. However, as a result of the information selection operation, the information is withdrawn from output storage register 156 at a rate of 30 kilo-bit/-second, under the control of suitable timing-pulses from timing-pulse generator 37R.

In this way, the redundancy elements associated with the best information-bits are used; and the bits are fed out at one-fourth the reception rate, so that the feed-out of the output-storage register 156 is at the same 30MC bit-rate as the information was originally encoded by the delta encoder of the transmitter.

The signals from output storage register 156 are a train of binary bits of information; and these are applied to a data-decoder, 158 of FIG. 9, that converts them to an analog signal corresponding to the input signal at the transmitter. Data-decoder 158 is actually a decoder that converts the delta-modulated signal to an analog signal, and is the inverse operation of the delta-encoding circuit 10 of the transmitter; the operating principle and circuitry therefor being presented in the previously-cited Electronics publication.

It was previously indicated that a danger exists in that a station may fall into the hands of undesired personnel, who would then be able to communicate and/or eavesdrop on the communications. To avoid this, the operation of the pseudo-random code-generator is changed at frequent intervals. It will be recalled that every station has an identical pseudo-random code-generator. In order to modify their operation, their internal feedback connections are changed — this being most readily achieved by the substitution of a different printed-wire feedback-circuit card, or — alternatively — by means of switches that change the feedback connections. As a result of this change, every station then operates on a new pseudo-random code; although all the other circuits act in the previously-described manner. However, a captured station would not have the new code, or know when it was to be changed, so that the captured station is — to all effects — substantially useless.

COMMAND - OVERRIDE

It has been pointed out that there are times when a high-official desires to communicate with all of the stations, regardless of what the individual stations are doing; this being called a command-override, which may be achieved as follows. It will be recalled that the pseudo-random code-generator controls the frequency and frequency-hopping sequence of the station during the station's transmitting, searching, and reception periods; that the pseudo-random code-generator's operation is controlled primarily by its feedback connections; and that these feedback connections may be changed at will for addressing selected stations. At the command-override station, the pseudo-random code-generator is preset to transmit the synchronizing-signal on a chosen "command" frequency-hopping sequence, and not at an addressed station's frequency-hopping sequence as discussed previously.

Consider the case of a station that is in a receive-mode of operation, and is receiving a message addressed to it. Periodically, say at every thirty-second frame, a counter switches the receiving station's matrix so that the receiver is receptive to the command channel. If there is no command-signal being broadcast, the receiving station will resume its interrupted communication. During this one-frame absence, the receiver-station's circuits have retained synchronization with the station that was broadcasting to it, so when the reception is resumed, no additional synchronization is necessary. Moreover, because of the previously-described redundancy feature, the "lost" information is still available in the frame previous-to and subsequent-to the lost frame. At the next thirty-second frame, the receiver again looks for a command-signal; and it continues to monitor the command channel in this manner.

If the command-station had been broadcasting at the instant that the receiver looked for a command-signal, in all probability the previously-described propagation-time interval would have prevented reception of the command signal; so the receiver returns to its reception-mode. In order to overcome the problem introduced by the propagation-time interval, the command-station broadcasts its command-signal for a given number of frames, say three hundred and twenty, so that each receiver looks ten times for a command-signal. Assume that, by some chance, a particular receiver — because of a particular distance from the command station — receives seven frames of the command signal. The coarse-synchronizing circuit of that particular receiver now disconnects the receiver from its previous communication, and locks it to the hopping-frequency sequence of the command station. This particular receiver performs coarse, bit, and word synchronization on the command-station's synchronizing-signal.

As indicated above, most of the receivers do not receive the command-station's signal, so the command-station retards its transmitted-waveform in the manner previously discussed under searching. As a result, additional receivers now receive seven frames of the synchronizing-signals from the command station; and these receivers undergo coarse, bit, and word synchronization. It will be recalled that the first receiver maintained the command-station's frequency-hopping sequence; and this receiver would in all probability have lost its incoming signal when the command station retarded its frequency-hopping sequence. However, this first receiver resumed its search mode on the command station's frequency-hopping sequence, and eventually found and locked onto the retarded waveform from the command station when the command station stopped retarding its frequency hopping schedule.

The command station now retards its waveform again, thus picking up new receivers; the previously tuned-in receivers again searching for the command-signal. As a result of this procedure, every station in the network is eventually alerted, and then synchronized; and is ready to receive the broadcast data.

It should be noted that a station in the transmit-mode looks for a command signal in the same manner, except that for each thirty-second frame it must convert to the receive-mode.

CONFERENCE CALL

The converence-call technique is similar to the command-override, with minor differences; the conference-call stations following the same broadcasting procedure as the command override technique. If the receiver finds a conference-call signal, rather than switching to that channel automatically, it lights an indicator-lamp, so that the operator can decide whether the conference is more important than his immediate communication. If it is, he addresses the indicated conference-call frequency-hopping sequence, and listens in along with the other conferees.

Provision is made for two conference channels, so that for one minute the receiver takes every sixteenth frame-time to look for a conference-call signal on one channel, and takes every thirty-second frame to look for command-override signal; and for the next minute the receiver takes every sixteenth frame-time to look for a second conference-call signal on the second channel, and takes every thirty-second frame-time to look for a command-override signal. It will be noted that every station thus sacrifices every sixteenth frame for the command-override and conference-call capability; but due to the redundancy feature, no information is lost.

THE BUSY-SIGNAL

It has been explained how any station in the network can communicate with any other selected station in the network, by merely addressing the selected station, transmitting a synchronizing signal to which the selected station locks its operation, and then transmitting the desired data. However, it may happen that the selected station is already receiving a communication from another station, and can not search for the communication from this station. It is therefore necessary to inform all incipient transmitting stations that the selected station is engaged in a communication.

Consider the case when a third station desires to communicate with the selected station — which is already engaged in a communication, and is in its listening mode. The third station addresses the selected station, and listens. The receiver of the third station automatically performs the previously described search; finds the transmission from the transmitting station; and achieves coarse-synchronization and bit-synchronization as described above — but cannot achieve word-synchronization because it is receiving data, and not a synchronizing signal. Therefore, at the third station, suitable AND circuitry receives a signal from its coarse-synchronizing circuit 120, and from its bit-synchronizing circuitry 130; but does not receive a signal from its synchronizing-signal-recognition portion of word-synchronizing circuitry 148. This circuitry therefore recognizes that the addressed station is busy; and produces a visual or an auditory "busy" signal.

Of course, if the selected station is not busy, the suitably-addressed third station would not receive any communication from a transmitting station, and would not produce any busy signal. After a predetermined interval of time, the third station transmits a synchronizing signal at the frequency-hopping sequence of the selected station, which searches for, locks on, and synchronizes itself to this signal as explained above.

There will of course be times when a third station desires to transmit to a first station that is busy transmitting to a second station. If the third station were to start transmitting, the first station — being in a transmitting mode — would not receive the transmission. This situation may be resolved as follows. It will be recalled that the speaking station is frequency-hopping in the same sequence as the listening station, and that the listening station has synchronized its operation to the signals received from the speaking station. After given interval or a given number of frames after the start of data-transmission, as determined by the frame-counter 64, or a timer, the two communicating stations switch to the frequency-hopping sequence of the speaking station. Thus, the speaking station continues to be the speaking station, and the listening station continues to be the listening station; but periodically, both stations switch their frequency-hopping sequences from that of one of the stations to that of the other of the stations.

This concept will be clarified by FIG. 17. Here waveform 70 represents the waveform transmitted by the speaking station, waveform 72 represents the received-waveform, and waveform 76 represents the coarse, bit, and word-synchronized receiver-waveform. At a given time, as indicated by the vertical arrows, the transmitting station switches the frequency-hopping sequence from that of the addressed station to its own; and at a corresponding time the listening station does the same. Thus, there is no break in the communication, and the receiver-waveform 76 remains in synchronism with the received waveform 72. As indicated previously, the frequency-hopping sequence is controlled by the matrices, and the switching of the frequency-hopping sequence is achieved by having electronic switches re-set the matrices at the transmitting station and at the receiving station in order to produce the alternating frequency-hopping sequences.

If the third station now desires to broadcast to the transmitting station, it addresses that station, and listens. Every time that the first two stations switch to the transmitting station's frequency-hopping sequence, the third station receives a short burst of data. The receiver of the third station automatically performs search, coarse, and bit-synchronization; but cannot achieve word-synchronization because it is receiving data, and not a synchronizing signal. Therefore, as described above, the circuitry of the third station produces a visual or an auditory busy signal.

As soon as the frequency-hopping sequence changes, the receiver of the third station loses coarse and bit-synchronization, and its busy-signal ceases operation. However, when the frequency-hopping sequence returns to that to which the third station is addressed, the busy-signal again becomes operative. In this way, a station is advised whether its addressed station is busy.

AMBIGUITY RESOLUTION

It was pointed out, in connection with FIGS. 9 and 10, that a phase-ambiguity existed; that the word-synchronization circuitry 148 had to recognize the complement of the synchronizing-signal; that the phase-resolver 146 looked for a "one" as the first data-bit, and used this "one" as a reference. This situation existed because of the use of the so-called "NRZL" (Non Return to Zero Level) system of bi-phase modulation. As is well known, this system has a given signal-level for a "one" data-bit, and another given signal-level for a "zero" data-bit. As shown in FIG. 18, a 1, 0, 1, 0, 1, 1, 0, 0 signal is converted to a NRZL waveform 160, wherein the "ones" are converted to a positive voltage, and the "zeros" are converted to a negative voltage; the different voltages being subsequently converted to a different phase, as previously described. The disadvantages of this system is that if the wave-train 160 is broken, the phase-lock loop may revert to the phase-ambiguity condition; and the phase-resolver 146 of FIG. 9 cannot reestablish its necessary reference until reception of the next word.

This condition is overcome by the use of the so-called "NRZM" (Non Return to Zero Mark) system, wherein the signal-level changes only at the occurrence of a "one;" this being shown in waveform 162 of FIG. 18. In waveform 162, each "one" data-bit is identified by a change of signal-level, and each "zero" data-bit is identified by no-change of signal-level. Thus in waveform 162, even if the wave-train is broken, re-establishment of the wave-train permits detection of signal-level changes; and thus automatically re-establishes recognition of the level-changing "ones." Moreover, it is unnecessary to precede the broadcast of each word with a "one" for recognition purposes.

It should be noted that in order to use the NRZM system, a "toggle" flip-flop 163 is inserted into the transmitter circuit of FIG. 3 between OR circuit 66 and the phase-shift modulator 68. Every time that a "one" information-bit occurs, flip-flop 163 changes its state; whereas when a "zero" information-bit occurs, flip-flop 163 maintains its current state. In this way, the phase-shift modulator 68 changes the phase of the bi-phase modulation for every "one" information-bit, in accordance with the NRZM technique.

The NRZM system operates as follows at the receiver. Digressing for a moment, the dead-time interval does not appear as idealized at 164 of FIG. 19, for the following reason. It will be recalled that the broadcast information appears as a 30 MC signal that is modulated onto the particular frequency-carrier-wave that happens to be generated at a given instant. Thus, as indicated by waveform 166 of FIG. 19, the last information-bit of a frame comprises an instant frequency, F1, having modulated thereon a 30 MC signal of a particular phase; being broadcast as a (F1 + 30 MC) signal. During the dead-time interval, the frequency-synthesizer is switching from one frequency to another, and the modulating signal is also being cut off. Thus, the (F1 + 30 MC) broadcast-signal decreases to zero amplitude, as indicated in waveform 166 of FIG. 19. During the build-up interval, the frequency-synthesizer is beginning to produce a new frequency and the modulating signal is also increasing. Thus, the new (F2 + 30 MC) broadcast-signal increases to its design amplitude, as indicated in waveform 166 of FIG. 19. Under the NRZM system, the phase of the 30 MC modulating signal remains the same, since no new information-bit has been generated during this dead-time interval.

In accordance with the hetrodyning principle, the (F1 + 30 MC), (F2 + 30 MC), (F3 + 30 MC), etc. broadcast-signals appear at the output of receptor circuitry 92 (FIGS. 9 and 10) as an IF signal, having a 30 MC modulation of a particular phase that depends upon the broadcast information.

In the first-described NRZL system, the initial 30 MC IF signal of each frame had to have its phase detected by the phase-lock circuitry, since the specific phase carried information. However, in the NRZM later-described system, the initial 30 MC IF signal of the build-up interval acts as a basic phase; i.e., if the phase changes from the build-up interval to the first information-bit, the change indicates the presence of a "one" information-bit — whereas if the phase does not change, it indicates the presence of a "zero" information-bit. Thus, even the very first information-bit of each frame is identified immediately as either a "one" or a "zero" data-bit.

The use of the NRZM system also simplifies the problem of the word-synchronizing circuitry circuit, 148 of FIG. 9, since this circuit no longer has to look for a complement of the synchronizing signal. Now, this circuit merely compares each subsequent six-bits of the incoming signal with the stored-code.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. A communication system comprising:
   A. a plurality of stations, selected said stations comprising a receiver, and at least one station comprising a transmitter;
   B. means for varying the frequency of each receiver so that each receiver frequency-hops in an individual frequency-hopping sequence, said individual frequency-hopping sequence defining each individual receiver's address;
   C. means for generating a transmitter carrier-wave that frequency-hops in the individual frequency-hopping sequence of any selected receiver, said means defining the transmitter's ability to address a transmission to any selected receiver;
   D. means for varying the receiver-frequency, so that the receiver searches for a transmission addressed to said receiver;
   E. means for stabilizing the receiver-frequency of said receiver, when said receiver finds a transmission addressed to it, to synchronize said receiver operation to said transmission;
   F. means for producing a synchronizing-signal at said transmitter and for impressing said synchronizing-signal onto said addressed frequency-hopping carrier wave; and
   G. means, activated at the receiver by said synchronizing-signal, for producing an activating-signal that synchronizes the receiver's operation to said synchronizing-signal.

2. The combination of claim 1 including
   means for varying the frequency-hopping sequence of each station to periodically monitor a chosen frequency-hopping sequence to determine whether a special signal is being broadcast.

3. The combination of claim 1 including
   means for terminating, at said receiver, the impressing of said synchronizing signals onto said frequency-hopping carrier-wave;
   means, at said transmitter, for generating and impressing a data-signal onto said addressed frequency-hopping carrier wave; and
   means, at said receiver, for recovering the data in said data-signal.

4. The combination of claim 3 including
   means for impressing said data-signal onto said addressed frequency-hopping carrier-wave in a redundancy manner; and
   means, at said receiver, for recovering the data in said redundanced data-signal.

5. The combination of claim 4 including
   means, at said receiver, for producing signal-to-noise ratio signals for selected portions of said redundanced data-signal; and
   means, at said receiver, for selecting optimal portions of said redundanced data-signal in accordance with said signal-to-noise ratio signals.

6. The combination of claim 3 including
   means, at said transmitter, for impressing said synchronizing-signal and said data-signal onto said addressed frequency-hopping carrier-wave in the form of bi-phase modulation; and
   means, at said receiver, for demodulating said bi-phase modulation.

7. The combination of claim 1 including
   means for producing a chosen frequency-hopping sequence to indicate that a special transmission is to be broadcast.

8. The combination of claim 1 including
   means for converting said synchronizing-signal into a biphase synchronizing-signal;
   means for impressing said biphase synchronizing-signal onto said frequency-hopping carrier-wave for a finite interval;
   means for producing a data-signal;
   means for converting said data-signal into a biphase data-signal; and
   means for impressing said biphase data-signal onto said frequency-hopping carrier-wave after the termination of said finite interval.

9. The combination of claim 1 including means for converting said synchronizing-signal and said data-signal to a Non Return To Zero Mark system.

10. The combination of claim 1 wherein said synchronizing-signal comprises a start-code, an intermediate-code, and an end-code, said synchronizing-signal occupies the live-portion of said frame-period; means for transmitting said synchronizing-signal a given number of times, defining a synchronizing-signal interval;
    means for producing data-signals;
    means for redundancing said data-signals, said redundancing means comprising means for dividing said data-signals into sub-words, and interlacing said sub-words into the live-portion of successive frames;
    means for transmitting said redundanced data-signals after the termination of said synchronizing-signal interval.

11. The combination of claim 10, wherein said redundancing means comprises a plurality of registers;
    means for storing one sub-word in one register;
    means for transmitting said sub-word as a portion of one frame, and circulating said sub-word to a subsequent register; and
    means for transmitting said sub-word as a different portion of a subsequent frame.

12. A communication system comprising:
    A. a plurality of stations, selected said stations comprising a receiver, and at least one station comprising a transmitter;
    B. means for varying the frequency of each receiver so that each receiver frequency-hops in an individual frequency-hopping sequence, said individual frequency-hopping sequence defining each individual receiver's address;
    C. means for generating a transmitter carrier-wave that frequency-hops in the individual frequency-hopping sequence of any selected receiver, said means defining the transmitter's ability to address a transmission to any selected receiver;
    D. means for varying the receiver-frequency, so that the receiver searches for a transmission addressed to said receiver;
    E. means for stabilizing the receiver-frequency of said receiver, when said receiver finds a transmission addressed to it, to synchronize said receiver operation to said transmission;
    F. means for producing a synchronizing-signal at said transmitter and for impressing said synchronizing-signal onto said addressed frequency-hopping carrier wave;
    G. means, activated at the receiver by said synchronizing-signal, for producing an activating-signal that synchronizes the receiver's operation to said synchronizing-signal;
a. means, energized by said activating-signal for producing a coarse-synchronizing signal for coarse-synchronizing said receiver's operation to said synchronizing-signal;
b. means, energized by said activating-signal for producing a bit-synchronizing signal that bit-synchronizes said receiver's operation to said synchronizing signal; and
c. means, energized by said activating-signal, for producing a word-synchronizing signal that word-synchronizes said receiver's operation to said synchronizing-signal.

13. In a communications system wherein information is transmitted in the form of digitally coded bits of modulated carrier, said bits generated at a bit rate, said information being transmitted in a number of successive frames including a plurality of synchronizing frames, each said synchronizing frame comprising a start-code portion and an end-code portion, and wherein the frequency of the transmitted carrier is shifted from frame to frame in a selected predetermined frequency shifting sequence that identified a unique receiver address; receiver searching and synchronization circuitry comprising
   means for generating a receiver-waveform having a frequency shifting sequence identifying the receiver,
   means for effecting a predetermined phase difference of a first sense of the receiver-waveform with respect to the received-waveform,
   receiver searching means for progressively varying the receiver frequency to shift said receiver-waveform phase in a second sense with respect to said received waveform for achieving partial coincidence of said received and receiver-waveforms,
   coarse synchronization means for determining partial coincidence of said received and receiver-waveforms for at least portions of a group of frames,
   means responsive to detection of said coarse synchronization for terminating the receiver searching,
   means responsive to the detection of coarse synchronization for achieving bit-synchronization of individual bits, said bit synchronization means comprising means for generating a train of receiver clock-pulse bits, means for comparing the phase of the train of bits of the transmitted information signal with the phase of the train of receiver bits, and
   means responsive to the phase comparison for varying the phase of the receiver clock-pulse bit generator in a sense to minimize the detected phase difference between transmitted and receiver bit trains, and
   means responsive to bit synchronization for effecting word synchronization to fully align transmitted frames with receiver frames, said word-synchronizing means comprising
   means for storing a start-code and an end-code in the receiver, each code uniquely identifying the start-code portion and end-code portion of each transmitted synchronizing signal frame,
   means for comparing incoming signals with the stored codes to detect occurrence of the start-code portion, and means for indicating word synchronization upon detection of such occurrence, means responsive to detection of lack of occurrence of the start code portion for subsequently comparing the incoming signal with both start and end codes stored in the receiver,
   means responsive to detection of a start-code portion in the second mentioned comparison for retarding receiver frame shifting sequence for a predetermined interval substantially equal to the interval of the start-code portion, and
   means responsive to detection of the end-code portion in the incoming signal during the second mentioned comparison for advancing the receiver frame shifting sequence by a predetermined interval substantially equal to the duration of the end-code portion.

14. In a communication system wherein information is transmitted and received as a waveform having a number of successive frames, said frames each comprising a unique frequency, with the frequency of the transmitted waveform being shifted from frame to frame in a selected predetermined frequency shifting sequence that identifies a unique receiver address, a receiver comprising:
   A. means for generating a receiver-waveform that comprises a series of frequency-sensitive receiving-frames that are frequency shifted in the selected frequency shifting sequence that identifies a receiver;
   B. means for determining partial coincidence of said received waveform and said receiver-waveform for at least a part of one frame;
   C. means for determining the number of such partial coincidences in a group of frames;
   D. means for generating a signal indicating coarse-synchronization when a predetermined number of partial coincidences has been detected in said group; and
   E. means, comprising said coarse-synchronization signal, for time-wise shifting, said receiver-waveform.

15. The combination of claim 14 wherein limitation A comprises
   means for generating clock pulses at a clock rate;
   a timing generator, responsive to the clock pulses, for generating timing signals; and
   means, comprising a code generator responsive to the time signals, for generating said receiver-waveform;
   D. means for controlling the code-generator to effect searching and coarse-synchronization of the received-waveform and the receiver-waveform;
   E. means for controlling the code-generator to achieve bit-synchronization of the train of bits of the receiver-waveform and the received-waveform.
   F. means for controlling the code-generator to achieve word-synchronization of the receiver-waveform and the synchronization-signal portion of the received-waveform.

16. A transmitter for use in a communication system, comprising:
   means for broadcasting a coded synchronizing signal having a duration of one frame period, and repetitive over a number of consecutive frame periods;
   means for sending a data-signal during frame periods following said number of frame periods of said synchronizing signal;

means for generating said data-signal in sub-words, each having a duration of less than one-half of said frame period;

means for broadcasting each data-signal sub-word at least two times during each data-signal frame period; and means for varying the transmitter-frequency, for frequency-shifting both said synchronizing signal and said data-signal in a selected predetermined frequency-shifting sequence that identifies a unique receiver address, each said frequency shift occurring at the end of a frame period.

17. In association with a communication system wherein a plurality of receivers frequency-hop in individual frequency-hopping sequences, the individual frequency-hopping sequence of each individual receiver defining each individual receiver's address, a transmitter comprising:

means for varying the transmitter-frequency to produce a carrier-wave that frequency hops in the individual frequency-hopping sequence of any desired receiver, said means defining the transmitter's ability to address a desired receiver, said means comprising:

a code generator;

a frequency-synthesizer;

means for applying the output of said code-generator to said frequency-synthesizer to change the output frequencies of said frequency-synthesizer in accordance with the output of said code-generator — whereby the output of the frequency-synthesizer produces a frequency-hopping carrier wave series of successive frames with a frame-period duration;

a matrix having adjustable input-output paths;

means for applying the output of said code-generator to said matrix;

means for applying the output of said matrix to said frequency-synthesizer — whereby adjusting said matrix causes the output frequencies of said frequency-synthesizer to produce a carrier-wave that frequency-hops in a different sequence, for addressing different receivers;

means for producing a synchronizing signal;

means for impressing said synchronizing signal onto said addressed frequency-hopping carrier-wave;

means for terminating said synchronizing signal;

means for producing a data-signal; and means for impressing said data-signal onto said addressed frequency-hopping carrier-wave.

18. The transmitter of claim 17, including:

means for redundancing said data-signal — whereby said addressed frequency-hopping carrier-wave has said redundanced data-signal impressed thereon.

19. The transmitter of claim 17, including:

means for converting said synchronizing-signal and said data-signal into a biphase signal — whereby said biphase synchronizing and data-signals are impressed onto said frequency-hopping carrier-wave.

20. The combination including means for broadcasting a coded synchronizing-signal having a duration of one frame period and repetitive over a synchronizing-signal interval having a given number of consecutive frame periods;

means for broadcasting a data-signal during frame periods following said synchronizing signal interval;

means for generating said data-signal in sub-words each having a duration of less than one-half of said frame period;

means for broadcasting at least two different data-signal sub-words during each data-signal frame period, and for broadcasting each sub-word in at least two different frame periods.

21. The combination of claim 20, including means for varying the broadcast-frequency, for frequency-shifting both said synchronizing-signal and said data-signal in a selected predetermined frequency shifting sequence that identifies a unique receiver address, each said frequency shift occurring at the end of a frame period.

22. A transmitter comprising:

A. a timing circuit having
  1. master clock means for producing pulse-signals at a given frequency;
  2. means for converting said pulse-signals to a desired clock frequency;
  3. means, energized by said frequency-converted pulse-signals, for producing timing-signals;
  4. means for converting said pulse-signals to a modulating-signal;

B. a frequency-hopping circuit having
  1. code-generator means, energized by specific timing-signals, for producing a code;
  2. a matrix, having selectable input-output paths;
  3. means for applying said code from said code-generator to said matrix — whereby the output from said matrix depends upon the input signal and upon the selected input-output path;
  4. frequency-synthesizing means for producing frequencies that depend upon the input signals;
  5. means for applying the output of said matrix to said frequency-synthesizer — whereby the instantaneous output frequency of said frequency-synthesizer depends upon the instantaneous code and the selected input-output path of said matrix, and said frequency-synthesizer produces a carrier-wave having successive frames at different frequencies, a selected set of matrix input-output paths causing said frequency-synthesizer to produce an output that frequency-hops in the same sequence as an addressed station;

C. means for converting input data to a data-signal;

D. redundancing means for forming said data-signal into sub-words, and causing each sub-word to be repeated a number of times, said redundancing means having
  1. a first register;
  2. means, associated with signals from said timing circuit for loading said data-signal into said first register;
  3. an OR circuit;
  4. means, associated with signals from said timing-circuit, for unloading the contents of said first register to said OR circuit, to cause a group of data-signals to form a sub-word of a frame;
  5. a second register;
  6. means, associated with signals from said timing-circuit, for shifting the data-signal at said OR circuit to said second register;
  7. means, associated with signals from said timing-circuit, for unloading the contents of said second register to said OR circuit, to cause said group of data-signals to form a sub-word of another frame;

8. a third register;
9. means, associated with signals from said timing circuit, for shifting the data-signal at said OR circuit to said third register;
10. means, associated with signals from said timing circuit, for unloading the contents of said third register to said OR circuit to cause said group of data-signals to form a sub-word of still another frame — whereby groups of data-signals are redundanced so that they form sub-words that appear in a plurality of frames;

E. means for producing a synchronizing-signal for a synchronizing-signal interval, having
1. generator means for producing a synchronizing-signal;
2. frame-counting means, associated with signals from said timing-circuit, for producing a first signal for the duration of said synchronizing-signal interval, and for producing a second signal at the termination of said synchronizing-signal interval;

F. means for combining the output of said synchronizing-signal producing means and the output of said redundancing means, comprising;
1. a synchronizing-signal gate-circuit;
2. a data-signal gate-circuit;
3. a combining OR circuit;
4. means for applying the synchronizing-signal to said synchronizing-signal gate-circuit;
5. means for applying the data-signal from the redundancing-means OR circuit to the data-signal gate-circuit;
6. means for applying said first signal from said frame-counting means to said synchronizing-signal gate-circuit, for enabling said synchronizing-signal gate-circuit, and for applying said synchronizing-signal to said combining OR circuit for the duration of said synchronizing-signal interval;
7. means for applying the first signal from said frame-counting means to said data-signal gate circuit, for disabling said data-signal gate circuit, and preventing application of said data-signal to said combining OR circuit for the duration of said synchronizing-signal interval;
8. means for applying said second signal from said frame-counting means to said synchronizing-signal gate circuit, and preventing application of said synchronization-signal to said combining OR circuit after the termination of said synchronizing-signal interval;
9. means for applying second signal from said frame counting means to said data-signal gate circuit, for enabling said data-signal gate, and applying said data-signal to said combining means OR circuit after the termination of said synchronizing-signal interval — whereby said combining OR circuit receives, from the synchronizing-signal gate circuit, the synchronizing-signal for the duration of the synchronizing-signal interval, and then receives, from the data-signal gate circuit, the redundanced sub-words for the duration of the communication interval.

23. The combination of claim 22, including
means, positioned between the combining OR circuit and the mixer, for converting a binary signal to a biphase signal, having
1. a phase-shift-key circuit;
2. means for applying the binary signal to said phase-shift-key circuit;
3. means for applying said modulating-signal from said timing-circuit to said phase-shift-key circuit for causing one state of the binary signal to be converted to a given phase of said modulating-signal, and causing the other state of the binary signal to be converted to the opposite phase of said modulating-signal.

24. In a communication system wherein a plurality of receivers frequency-hop in individual frequency-hopping sequences, the individual frequency-hopping sequence of each individual receiver defining each individual receiver's address, a transmitter comprising:
means for producing a frequency-hopping carrier-wave,
means for producing a data-signal;
redundancing means for forming said data-signal into sub-words, and repeating each sub-word a given number of times;
means for producing a synchronizing signal;
means for broadcasting said synchronizing-signal for a given synchronizing-signal interval; and
means for broadcasting said redundanced data-signal sub-words after termination of said synchronizing-signal interval.

25. The combination of claim 24 wherein said means for producing a frequency-hopping carrier-wave comprises
A. a timing circuit having
1. master clock means for producing pulse-signals at a given frequency;
2. means for converting said pulse-signals to a desired clock frequency;
3. clock-pulse generator means, energized by said frequency-converted pulse-signals, for producing trigger-like clock-pulses at a clock-frequency;
4. timing generator means, energized by said clock-pulses, for producing timing-signals;
B. a frequency-hopping circuit comprising:
1. code-generator means, energized by specific said timing-signals, for producing a pseudo-random code;
2. a matrix, having selectable input-output paths;
3. means for applying said pseudo-random code from said code-generator to said matrix — whereby the output from said matrix depends upon the input signal and upon the selected input-output path;
4. frequency-synthesizing means for producing frequencies that depend upon the input signals;
5. means for applying the output of said matrix to said frequency-synthesizer.

26. The combination of claim 24, wherein said redundancy means comprises:
1. a first register;
2. means for loading said encoded data-signals into said first register;
3. a first OR circuit;
4. means for unloading the contents of said first register to said first OR circuit, to combine a group of data-signals to form a sub-word of a frame;
5. a second register;
6. means for shifting the data-signal at said first OR circuit to said second register;
7. means for unloading the contents of said second register to said first OR circuit to combine said group of data-signals to form a subword of another frame;
8. a third register;
9. means for shifting the data-signal at said first OR circuit to said third register;
10. means for unloading the contents of said third register to said first OR circuit to combine said group of data-signals to form a sub-word of still another frame — whereby groups of data-signals are redundanced so that they form sub-words that appear in a plurality of frames.

27. The combination of claim 24 wherein said synchronizing-signal-producing-means comprises:
 1. generator means for producing a synchronizing signal having a start-code, an intermediate-code, and an end-code;
 2. frame-counting means, associated with signals from said timing-circuit, for producing a first signal for the duration of said synchronizing-signal interval, and for producing a second signal at the termination of said synchronizing-signal interval.

28. The combination of claim 24 wherein said last two means comprise:
 1. a synchronizing-signal gate-circuit;
 2. a data-signal gate-circuit;
 3. a combining OR circuit;
 4. means for applying the synchronizing-signal to said synchronizing-signal gate-circuit;
 5. means for applying the data-signal from the redundancing-means to the data-signal gate-circuit;
 6. means for enabling said synchronizing-signal gate-circuit, and applying said synchronizing-signal to said combining OR circuit for the duration of a synchronizing-signal interval;
 7. means for disabling said data-signal gate-circuit, and preventing application of said data-signal to said combining OR circuit for the duration of said synchronizing-signal interval;
 8. means for preventing application of said synchronizing-signal to said combining OR circuit after the termination of said synchronizing-signal interval;
 9. means for enabling said data-signal gate, and applying said data-signal to said combining OR circuit after the termination of said synchronizing-signal interval — whereby said combining OR circuit receives, from the synchronizing-signal gate-circuit, the synchronizing-signal for the duration of the synchronizing-signal interval, and then receives, from the data-signal gate circuit, the redundanced sub-words for the duration of the communication interval.

29. A transmitter comprising:
A. a timing-circuit having
 1. master clock means for producing pulse-signals at a given frequency;
 2. means for converting said pulse-signals to a desired clock frequency;
 3. clock-pulse generator means, energized by said frequency-converted pulse-signals, for producing trigger-like clock-pulses at a clock-frequency, said clock pulses appearing on a common output;
 4. timing generator means, energized by said clock-pulses, for producing timing-pulses, said timing-pulses appearing at individual outputs;
 5. means for converting said pulse-signals to a modulating-signal;
B. a frequency hopping circuit having
 1. code-generator means, energized by specific timing-signals, for producing a pseudo-random code;
 2. a matrix, having selectable input-output paths;
 3. means for applying said pseudo-random code from said code-generator to said matrix — whereby the output from said matrix depends upon the input signal and upon the selected input-output path;
 4. frequency-synthesizing means for producing frequencies that depend upon the input signals;
 5. means for applying the output of said matrix to said frequency-synthesizer — whereby the instantaneous output frequency of said frequency-synthesizer depends upon the instantaneous pseudo-random code and the selected input-output path of said matrix, and said frequency-synthesizer produces a carrier-wave having successive frames at different frequencies, a selected set of matrix input-output paths causing said frequency-synthesizer to produce an output that frequency-hops in the same sequence as an addressed station;
C. encoder means for converting input data to encoded data-signals;
D. redundancing means for forming data-signal into sub-words, and causing each sub-word to be repeated a number of times; each repetition being in a different frame, said redundancing means having
 1. a first register;
 2. means, associated with signals from said timing circuit for loading said encoded data-signal into said first register;
 3. an OR circuit;
 4. means, associated with signals from said timing-circuit, for unloading the contents of said first register to said OR circuit, to cause a group of encoded data-signals to form a sub-word of a frame;
 5. a second register;
 6. means, associated with signals from said timing-circuit, for shifting the data-signal at said OR circuit to said second register;
 7. means, associated with signals from said timing-circuit, for unloading the contents of said second register to said OR circuit to cause said group of encoded data-signals to form a sub-word of another frame;
 8. a third register;
 9. means, associated with signals from said timing circuit, for shifting the data-signal at said OR circuit to said third register;
 10. means, associated with signals from said timing circuit, for unloading the contents of said third register to said first OR circuit to cause said group of encoded data-signals to form a sub-word of still another frame — whereby groups of encoded data-signals are redundanced so that they form sub-words that appear in a plurality of frames;
E. means for producing a synchronizing-signal for a synchronizing-signal interval, having
 1. generator means for producing a synchronizing-signal having a start-code, an intermediate-code, and an end-code;
 2. frame-counting means, associated with signals from said timing-circuit, for producing a first signal for the duration of said synchronizing-signal interval, and for producing a second signal at the termination of said synchronizing-signal interval;
F. means for combining the output of said synchronizing-signal producing means and the output of said redundancing means, comprising:
 1. a synchronizing-signal gate circuit;
 2. a data-signal gate circuit;
 3. a combining OR circuit;
 4. means for applying the synchronizing-signal to said synchronizing-signal gate circuit;
 5. means for applying the data-signal from the redundancing-means OR circuit to the data-signal gate-circuit;
 6. means for applying said first signal from said frame-counting means to said synchronizing-signal gate-circuit, for enabling said synchronizing-signal gate circuit, and for applying said synchronizing-signal to said combining OR circuit for the duration of said synchronizing-signal interval;
 7. means for applying the first signal from said frame-counting means to said data-signal gate circuit, for disabling said data-signal gate-circuit, and preventing application of said data-signal to said combining OR circuit for the duration of said synchronizing-signal interval;
 8. means for applying said second signal from said frame-counting means to said synchronizing-signal gate circuit, and preventing application of said synchronizing-signal to said combining OR circuit after the termination of said synchronizing-signal interval;
 9. means for applying second signal from said frame-counting means to said data-signal gate circuit, for enabling said data-signal gate, and applying said data-signal to said combining OR circuit after the termination of said synchronizing-signal gate circuit, the synchronizing-signal for the duration of the synchronizing-signal interval, and then receives, from the data-signal gate circuit, the redundanced sub-words for the duration of the communication interval;
F. means for modulating the output of the combining OR circuit onto the frequency-hopping carrier-wave from the frequency-hopping circuit, having
 1. a mixer;
 2. means for applying the output of said combining OR circuit to said mixer, for producing a waveform having frequency-hopping frames — during the synchronizing-signal interval said frames containing the synchronizing-signal, and after termination of said synchronizing-signal interval, said frames containing redundanced data sub-words;
G. means for transmitting the waveform produced by the modulating means.

30. For use with a frequency-hopping communication system wherein a transmitter may address a transmission to any selected receiver by (1) producing a carrier wave that frequency hops in the frequency-hopping sequence of the addressed receiver, (2) impressing a synchronizing-signal onto said addressed frequency-hopping carrier wave, and then (3) impressing a data-signal onto said addressed carrier wave, a receiver comprising:
A. means for producing a receiver-frequency that provides said receiver with a given frequency-hopping sequence, said given frequency-hopping sequence defining the address of said receiver, and producing a receiver-waveform;
B. means for varying said receiver-frequency in a search-pattern, resulting in reception of a transmission addressed to it, and further resulting in a received-waveform;
C. means for stabilizing said receiver-frequency to synchronize its operation to said received-waveform;
D. means for recovering the data in said received-waveform.

31. The receiver of claim 30 wherein limitation A comprises
a code-generator;
a matrix having given input-output paths;
means for applying the output signal of said code-generator to said matrix — whereby the output of said matrix depends upon said output signal from said code-generator and the input-output paths of said matrix;
a frequency synthesizer;
means for applying the output of said matrix to said frequency-synthesizer — whereby the receiver produces a frequency-hopping receiver-waveform having a given frequency-hopping sequence.

32. The combination of claim 31, including
timing-circuit means for producing trigger-pulses for triggering said code-generator;
means for applying said trigger-pulses to said code-generator;
means, at said timing-circuit means, for varying the rate at which said trigger-pulses are applied to said code-generator.

33. The combination of claim 30 wherein said data is in a redundanced form, and said receiver comprises means for receiving the data in said redundanced data-signal.

34. The combination of claim 33, including
means in said receiver for producing signal-to-noise ratio signals for selected portions of said received redundanced data-signal; and
means in said receiver for selecting optimal portions of said redundanced data-signal in accordance with said signal-to-noise ratio signals.

35. The combination of claim 30, including
means for varying the receiver-frequency of each receiver to periodically monitor a chosen frequency-hopping sequence to determine whether a special signal is being broadcast.

36. For use with a frequency-hopping communication system wherein a transmitter may address a transmission to any selected receiver by (1) producing a carrier wave that frequency hops in the frequency-hopping sequence of the addressed receiver, (2) impressing a synchronizing-signal onto said addressed frequency-hopping carrier wave, and then (3) impressing a data-signal onto said addressed carrier wave, a receiver comprising:
A. means for producing a receiver-frequency that provides said receiver with a given frequency-hopping sequence, said given frequency-hopping sequence defining the address of said receiver, and producing a receiver-waveform;
B. means for varying said receiver-frequency in a search-pattern, resulting in reception of a transmission addressed to it, and further resulting in a received-waveform;

C. means for stabilizing said receiver-frequency to synchronize its operation to said received-waveform;
D. means for recovering the data in said received-waveform; limitation B comprising
means for determining the extent of coincidence between said receiver-waveform and said received-waveform;
means — when said extent of coincidence is below a predetermined value — for producing an unsatisfactory coarse-synchronization signal, and — when said extent of coincidence is above said predetermined value — for producing a satisfactory coarse-synchronization signal;
means, comprising said unsatisfactory coarse-synchronization signal, for varying said receiver-frequency to shift said receiver-waveform to produce a search mode of operation;
means, comprising said satisfactory coarse-synchronization signal modifying said receiver-frequency to terminate said search mode of operation.

37. For use with a frequency-hopping communication system wherein a transmitter may address a transmission to any selected receiver by (1) producing a carrier wave that frequency hops in the frequency-hopping sequence of the addressed receiver, (2) impressing a synchronizing-signal onto said addressed frequency-hopping carrier wave, and then (3) impressing a data-signal onto said addressed carrier wave, a receiver comprising:
A. means for producing a receiver-frequency that provides said receiver with a given frequency-hopping sequence, said given frequency-hopping sequence defining the address of said receiver, and producing a receiver-waveform;
B. means for varying said receiver-frequency in a search-pattern, resulting in reception of a transmission addressed to it, and further resulting in a received-waveform;
C. means for stabilizing said receiver-frequency to synchronize its operation to said received-waveform;
D. means for recovering the data in said received-waveform; limitation C including
means for time-wise comparison of the bit intervals of said receiver-waveform with the bit-intervals of said received-waveform;
means for producing a bit-synchronization error-signal in accordance with said comparison;
means, comprising said bit-synchronization error-signal, for varying said receiver-frequency to shift said receiver-waveform for producing a bit-synchronization mode of operation.

38. For use with a frequency-hopping communication system wherein a transmitter may address a transmission to any selected receiver by (1) producing a carrier wave that frequency hops in the frequency-hopping sequence of the addressed receiver, (2) impressing s synchronizing-signal onto said addressed frequency-hopping carrier wave, and then (3) impressing a data-signal onto said addressed carrier wave, a receiver comprising:
A. means for producing a receiver-frequency that provides said receiver with a given frequency-hopping sequence, said given frequency-hopping sequence defining the address of said receiver, and producing a receiver-waveform;
B. means for varying said receiver-frequency in a search-pattern, resulting in reception of a transmission addressed to it, and further resulting in a received-waveform;
C. means for stabilizing said receiver-frequency to synchronize its operation to said received-waveform;
D. means for recovering the data in said received-waveform; limitation C including
means for time-wise comparison of said synchronizing-signal of said received-waveform with a corresponding synchronizing-signal in said receiver;
means for producing a word-synchronization error-signal in accordance with said comparison;
means, comprising said word-synchronization error-signal for varying said receiver-frequency to shift said receiver-waveform for producing a word synchronization mode of operation.

39. For use with a frequency-hopping communication system wherein a transmitter may address a transmission to any selected receiver by (1) producing a carrier wave that frequency hops in the frequency-hopping sequence of the addressed receiver, (2) impressing a synchronizing-signal onto said addressed frequency-hopping carrier wave, and then (3) impressing a data-signal onto said addressed carrier wave, a receiver comprising:
A. means for producing a receiver-frequency that provides said receiver with a given frequency-hopping sequence, said given frequency-hopping sequence defining the address of said receiver, and producing a receiver-waveform;
B. means for varying said receiver-frequency in a search-pattern, resulting in reception of a transmission addressed to it, and further resulting in a received waveform;
C. means for stabilizing said receiver-frequency to synchronize its operation to said received-waveform;
D. means for recovering the data received-waveform;
a code-generator;
a frequency-synthesizer;
means for applying the output of said code-generator to said frequency-synthesizer — whereby the receiver produces said frequency-hopping receiver-waveform having said given frequency-hopping sequence;
means for determining the extent of coincidence between said receiver-waveform and said received-waveform;
means — when said extent of coincidence is below a predetermined value — for producing an unsatisfactory coarse-synchronization signal, and — when said extent of coincidence is above said predetermined value — for producing a satisfactory coarse-synchronization signal;
means, comprising said unsatisfactory coarse-synchronization signal, for varying said receiver-frequency to shift said receiver-waveform to produce a search mode of operation;
means for time-wise comparison of the bit-intervals of said receiver-waveform with the bit-intervals of said received-waveform;
means for producing a bit-synchronization error-signal in accordance with said comparison;
means, comprising said bit-synchronization error-signal for varying said receiver-frequency to shift and said receiver-waveform to produce a bit-synchronization mode of operation;

means for time-wise comparison of said synchronizing-signal of said received-waveform with a corresponding synchronizing-signal in said receiver;

means for producing a word-synchronization error-signal in accordance with said comparison;

means, comprising said word-synchronization error-signal for varying said receiver-frequency to shift said receiver-waveform to produce a word-synchronization mode of operation.

40. The combination of claim 39, wherein data is available in a redundanced form, a data-recovery circuit comprising:

means for obtaining each redundanced portion of said data;

means for obtaining the signal-to-noise ratio for each redundanced portion of said data;

means for utilizing the portion of said redundanced data having optimal signal-to-noise conditions.

41. A frequency-hopping circuit for producing a carrier-wave that hops from one frequency to another in a desired sequence, comprising:

A. a code-generator having
a shift-signal terminal;
a plurality of binary stages;
a plurality of feedback connections interconnecting given said binary stages;
a pair of output terminals from each said binary-state;
whereby sequential shifting-signals applied to said shift-signal terminal cause said binary stages to assume particular sequential states controlled by the input signal and the feedback connections, the output signals from said binary stages forming the output code from said generator;

B. a matrix having
a plurality of input terminals — whereby said output code from said code-generator may be applied to said input terminals;
a plurality of input-output paths connected to said input terminals said paths having switch means for receiving an output from said binary -stage output-terminals;
a plurality of AND circuits, each adapted to produce an output signal upon the application of given input signals;
means for applying the output of said switches to said AND circuits — whereby an instantaneous output code from said code-generator and a given setting of said switches causes a given combination of said AND circuits to produce output signals — a change in the instantaneous code, or a change of said switch settings causing a different combination of said AND circuits to produce output signals;

C. a frequency-synthesizer comprising
means for receiving synthesizer-input signals;
means for producing a plurality of frequencies;
means for causing synthesizer-input-signals to determine the frequency of the synthesizer-output-signal;

D. means for applying the output of said AND circuits to said synthesizer input-signal-receiving means, an instantaneous code-signal and a given setting of said switches causing said frequency-synthesizer to produce an output of a given frequency, and a change of code-signal or a change of switch settings causing said frequency-synthesizer to produce an output of a different frequency — whereby a given sequence of code-signals and a given setting of said switches produces frequency-synthesizer output signals having a given frequency-hopping sequency, and the same sequence of code-signals and a different setting of said switches produces frequency-synthesizer output signals having a different frequency-hopping sequence.

42. In a system wherein an information signal appears as a bi-phase modulation on a given waveform of a given frequency, the combination comprising:

means for doubling the frequency of said given waveform;

means, comprising an oscillator, for producing a reference-waveform of the same frequency as said given waveform;

means for doubling the frequency of said reference-waveform;

means, comprising a mixer, for producing an error-signal corresponding to the phase-difference between said frequency-doubled given-waveform and said frequency-doubled reference-waveform;

means for applying said error-signal to said oscillator for phase correcting said reference waveform from said oscillator to have the same phase as said given waveform;

means, comprising an in-lock phase-comparator, for monitoring the phase-coincidence of said frequency-doubled given-waveforms and said frequency-doubled reference-waveform.

43. The combination of claim 42, including means, comprising a data-signal phase-comparator, for producing a data-signal phase indication;

means for applying said phase-corrected reference-waveform to said data-signal phase-comparator;

means for applying said given-waveform to said data-signal phase-comparator — whereby the output of said data-signal phase-comparator is a signal that indicates the instantaneous phase of said bi-phase modulation relative to said phase-corrected reference waveform.

44. In a communication system wherein data is available in a redundanced form, a data-recovery circuit comprising:

means for obtaining each redundanced portion of said data;

means for obtaining the signal-to-noise ratio for each redundanced portion of said data;

means for utilizing the portion of said redundanced data having optimal signal-to-noise conditions.

45. In connection with a frequency-hopping communication system wherein a transmitter may address a transmission to any selected receiver by (1) producing a carrier wave that frequency hops in the frequency-hopping sequence of the addressed receiver, (2) impressing a synchronizing-signal onto said addressed frequency-hopping carrier wave, and then (3) impressing a data-signal onto said addressed carrier wave, a receiver comprising:

A. means for causing said receiver to have a given frequency-hopping sequence, said given frequency-hopping sequence defining the address of said receiver and producing a receiver-waveform, having
a code-generator;
a matrix having given input-output paths;
means for applying the output signal of said code-generator to said matrix — whereby the output of said matrix depends upon said output signal from said code-generator and the input-output paths of said matrix;
a frequency-synthesizer;
means for applying the output of said matrix to said frequency synthesizer — whereby the receiver produces said frequency-hopping receiver-waveform having said given frequency-hopping sequence;
timing-circuit means for producing trigger-pulses for triggering said code-generator;
means for applying said trigger-pulses to said code-generator;
means for causing said timing-circuit means to vary the rate at which said trigger pulses are applied to said code-generator — whereby said receiver-waveform may be shifted;

B. means for causing said receiver to search for a transmission addressed to it, resulting in a received-waveform, having
means for determining the extent of coincidence between said receiver-waveform and the said received-waveform;
means — when said extent of coincidence is below a predetermined value — for producing an unsatisfactory coarse-synchronization signal, and — when said extent of coincidence is above said predetermined value — for producing a satisfactory coarse-synchronization signal;
means for causing said unsatisfactory coarse-synchronization signal to vary the frequency of said trigger-pulses applied to said code-generator for shifting said receiver-waveform to produce a search mode of operation;

C. means for causing said receiver to synchronize its operation to said received-waveform, having
means for time-wise comparison of the bit-intervals of said receiver-waveform with the bit-intervals of said received-waveform;
means for producing a bit-synchronization error-signal in accordance with said comparison;
means for causing said bit-synchronization error-signal to vary the frequency of said trigger-pulses applied to said code-generator to produce a bit-synchronization mode of operation;
means for time-wise comparison of said synchronizing-signal of said received-waveform with a corresponding synchronizing-signal in said receiver;
means for causing said word-synchronization error-signal to vary the frequency of said trigger pulses applied to said code-generator to produce a word-synchronization mode of operation.

46. The combination of claim 45, wherein said code-generator comprises
a shift-signal terminal;
a plurality of binary stages;
a plurality of feedback connections interconnecting given said binary stages;
a pair of output terminals from each said binary-state;
whereby sequential shifting-signals applied to said shift-signal terminal cause said binary stages to assume particular sequential states controlled by the input signal and the feedback connections, the output signals from said binary stages forming the output code from said generator; said matrix comprises
a plurality of input-output paths, said paths having switch means for receiving a selected output from one of said binary-stage output-terminals;
a plurality of AND circuits, each adapted to produce an output signal upon the application of given input signals;
means for applying the output of said switches to said AND circuits;
whereby an instantaneous code and a given setting of said switches causes a given combination of said AND circuits to produce output signals — a change in the instantaneous code, or a change of said switch settings causing a different combination of said AND circuits to produce output signals; said frequency-synthesizer comprises
means for receiving synthesizer-input signals;
means for producing a plurality of frequencies;
means for causing synthesizer-input-signals to determine the frequency of the synthesizer-output signal;
means for applying the output of said AND circuits to said synthesizer input-signal-receiving means, and instantaneous code-signal and a given setting of said switches causing said frequency-synthesizer to produce an output of a given frequency, and a change of code-signal or a change of switch swttings causing said frequency-synthesizer to produce an output of a different frequency — whereby a given sequence of code-signals and a given setting of said switches produces frequency-synthesizer output signals having a given frequency-hopping sequence, and the same sequence of code-signals and a different setting of said switches produces frequency-synthesizer output signals having a different frequency-hopping sequence.

47. The combination of claim 46 wherein an information signal appears as a bi-phase modulation on a given waveform of a given frequency, the combination comprising:
means for doubling the frequency of said given waveform;
means, comprising an oscillator, for producing a reference waveform of the same frequency as said given waveform.
means for doubling the frequency of said reference waveform;
means, comprising a mixer, for producing an error-signal corresponding to the phase-difference between said frequency-doubled given-waveform and said frequency-doubled reference-waveform;
means for applying said error-signal to said oscillator for phase correcting said reference waveform from said oscillator to have the same phase as said given waveform.

48. The combination of claim 47, including
means, comprising a data-signal phase-comparator, for producing a data-signal phase indication;
means for applying said phase-corrected reference waveform to said data-signal phase-comparator;
means for applying said given-waveform to said data-signal phase-comparator — whereby the output of said data-signal phase-comparator is a signal that indicates the instantaneous phase of said bi-phase modulation relative to said phase-corrected reference waveform.

49. The combination of claim 47, wherein said data is available in a redundanced form and said data-recovery means comprises
means for obtaining each redundanced portion of said data;

means for obtaining the signal-to-noise ratio for each redundanced portion of said data;

means for utilizing the portion of said redundanced data having optimal signal-to-noise conditions.

50. Circuitry for redundancing data-signals, said redundancing means comprising:

means for dividing said data-signals into a plurality of individual sub-words; and means for interlacing said individual sub-words into the live-portion of successive frames for providing said individual sub-words a plurality of times so that the data of said individual sub-words is available a plurality of times for redundancy.

51. Circuitry for redundancing data-signals, said redundancing means comprising:

means for dividing said data-signals into sub-words;

means for interlacing said sub-words into the live-portion of successive frames;

a plurality of registers;

means for storing one sub-word in one register;

means for transmitting said sub-word as a portion of one frame, and circulating said sub-word to a subsequent register; and means for transmitting said sub-word from said subsequent register as a different portion of a subsequent frame.

52. Circuitry for redundancing data-signals, said redundancing means comprising:

means for dividing said data-signals into sub-words;

means for interlacing said sub-words into the live-portion of successive frames;

a first register;

means for loading said data-signal into said first register;

an OR circuit;

means for unloading the contents of said first register to said OR circuit, for multiplexing a group of data-signals to form a sub-word of a frame;

a second register;

means for shifting the data-signal at said first OR circuit to said second register;

means for unloading the contents of said second register to said first OR circuit for multiplexing said group of data-signals to form a sub-word of another frame;

a third register;

means for shifting the data-signal at said first OR circuit to said third register;

means for unloading the contents of said third register to said first OR circuit for multiplexing said group of data-signals to a sub-word of still another frame — whereby groups of data-signals are redundanced so that they form sub-words that apppear in plurality of frames.

53. A frequency-hopping circuit for producing a carrier-wave that hops from one frequency to another in a desired sequence, comprising:

A. a code generator having a shift-signal terminal;

a plurality of binary stages;

a plurality of feedback connections interconnecting given said binary stages;

a pair of output terminals from each said binary-state;

whereby, under the influence of sequential shifting-signals applied to said shift-signal terminal, said binary stages assume particular sequential states controlled by the input signal and the feedback connections, the output signals from said binary stages forming the output code from said generator;

B. an adjustable matrix having a plurality of input terminals — whereby said output code from said code-generator may be applied to said input terminals;

a plurality of input-output paths connected to said input terminals said paths having switch means for receiving an output from said binary-stage output-terminals;

a plurality of AND circuits, each adapted to produce an output signal upon the application of given input signals;

means for applying the output of said switches to said AND circuits — whereby, under the influence of an instantaneous output code from said code-generator and a given setting of said switches, a given combination of AND circuits produces output signals — a change in the instantaneous code, or a change of said switch settings providing a different combination of said AND circuits that produce output signals;

C. a frequency-synthesizer comprising means for receiving synthesizer-input signals;

means for producing a plurality of frequencies;

means, comprising said synthesizer-input-signals, for energizing selected ones of the frequency-producers, to determine the frequency of the synthesizer-output-signal;

D. means for applying the output of said AND circuits to said synthesizer input-signal-receiving means, an instantaneous code-signal and a given setting of said switches energizing selected frequency-producers of said frequency-synthesizer to produce an output of a given frequency, and a change of code-signal or a change of switch settings energizing other frequency-producers of said frequency-synthesizer to produce an output of a different frequency — whereby given sequence of code-signals and a given setting of said switches produces frequency-synthesizer output signals having a given frequency-hopping seqency, and the same sequence of code-signals and a different setting of said switches produces frequency-synthesizer output signals having a different frequency-hopping sequence.

54. The combination of claim 53, including

A. a timing-circuit having 1. master clock means for producing pulse-signals at a given frequency;
2. means for converting said pulse-signals to a desired clock frequency;
3. clock-pulse generator means, energized by said frequency-converted pulse-signals, for producing trigger-like clock-pulses at a clock-frequency, said clock-pulses appearing on a common output;
4. timing generator means, energized by said clock-pulses, for producing timing-pulses, said timing-pulses appearing at individual outputs;
5. means for applying said specific timing-signals to said shift-signal terminal of said code-generator.

* * * * *